US006601042B1

(12) United States Patent
Lyden

(10) Patent No.: US 6,601,042 B1
(45) Date of Patent: *Jul. 29, 2003

(54) CUSTOMIZED ARTICLE OF FOOTWEAR AND METHOD OF CONDUCTING RETAIL AND INTERNET BUSINESS

(75) Inventor: Robert M. Lyden, 18261 SW. Fallatin Loop, Aloha, OR (US) 97007

(73) Assignee: Robert M. Lyden, Aloha, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/573,121

(22) Filed: May 17, 2000

Related U.S. Application Data

(63) Continuation-in-part of application No. 09/523,341, filed on Mar. 10, 2000, now Pat. No. 6,449,878.

(51) Int. Cl.$^7$ ............................................. G06F 17/60
(52) U.S. Cl. ................................ 705/26; 36/27; 36/38
(58) Field of Search ........................... 705/26, 28, 27, 705/1; 36/1, 27, 38, 28, 78

(56) References Cited

U.S. PATENT DOCUMENTS

| 75,900 | A | 3/1868 | Hale et al. .................. 36/28 |
| RE9,618 | E | 3/1881 | Nichols ........................ 36/27 |
| 298,844 | A | 6/1884 | Glanville | |
| 318,366 | A | 5/1885 | Fitch | |
| 324,065 | A | 8/1885 | Andrews .................... 36/37 |
| 337,146 | A | 3/1886 | Glueksmann ............. 36/7.8 |

(List continued on next page.)

FOREIGN PATENT DOCUMENTS

| AT | 33492 | 6/1908 | |
| CA | 1115950 | 1/1982 | ............ 36/6 |
| CH | 425537 | 5/1967 | |
| DE | 59317 | 3/1891 | |
| DE | 620963 | 10/1935 | |
| DE | 1808245 | 2/1960 | |

(List continued on next page.)

OTHER PUBLICATIONS

Press Release, "NIKE iD™ Puts the Power of Design in the People's Hands", on www.Nikebiz.com, Nov. 2, 1999.*
Press Release, "Internet Mall attracts retailers", Oakland Tribune 9 (CA) pC1, Dec. 18, 1996 discloses that a specialty store Copy Caps (Cape Cod, MA) allows clients to design their own hats on the PCs on Interne (see copies of various displays of the www).*

(List continued on next page.)

Primary Examiner—Wynn W. Coggins
Assistant Examiner—Yogesh C. Garg
(74) Attorney, Agent, or Firm—Westman, Champlin & Kelly, P.A.

(57) ABSTRACT

The present application teaches a device and method for adjusting the width, girth, and foot shape of an article of footwear. Lasting boards having different configurations and alternate positions for selectively affixing various portions of an upper can be used to adjust and customize the fit of an article of footwear for an individual wearer. The lasting board can also comprise a spring element which can provide improved cushioning, stability, running economy, and a long service life. Unlike the conventional foam materials presently being used by the footwear industry, the spring element is not substantially subject to compression set degradation and can provide a relatively long service life. The components of the article of footwear including the upper, insole, lasting board and/or spring element, and sole including possible midsole and outsole portions can be selected from a range of options, and can be easily removed and replaced, as desired. Further, the relative configuration and functional relationship as between the forefoot, midfoot and rearfoot areas of the article of footwear can be readily modified and adjusted. Accordingly, the article of footwear can be customized by a wearer or specially configured for a select target population in order to optimize desired performance criteria. Moreover, the present invention teaches a novel method of manufacturing an article of footwear, and also, a novel way of doing both retail and Internet business.

20 Claims, 16 Drawing Sheets

U.S. PATENT DOCUMENTS

| | | | | |
|---|---|---|---|---|
| 357,062 | A | 2/1887 | Buch | |
| 620,582 | A | 3/1889 | Goff | |
| 413,693 | A | 10/1889 | Walker | |
| 418,922 | A | 1/1890 | Minahan | |
| 427,136 | A | 5/1890 | Walker | 36/7.8 X |
| 622,673 | A | 4/1899 | Ferrata | |
| 641,642 | A | 1/1900 | Gunn | |
| 733,167 | A | 7/1903 | Denton | 36/37 X |
| 854,274 | A | 5/1907 | Crook et al. | |
| 871,864 | A | 11/1907 | Feazell et al. | |
| 927,831 | A | 7/1909 | Crane | |
| 1,022,672 | A | 4/1912 | Hammer | 36/37 X |
| 1,043,350 | A | 11/1912 | Owers | |
| 1,080,781 | A | 12/1913 | Razntch | |
| 1,088,328 | A | 2/1914 | Cucinotta | |
| 1,107,894 | A | 8/1914 | Cain | |
| 1,113,266 | A | 10/1914 | Wachter | |
| 1,147,508 | A | 7/1915 | Hussey | |
| 1,154,340 | A | 9/1915 | Rolfe | |
| 1,160,810 | A | 11/1915 | Abramowitz | |
| 1,182,787 | A | 5/1916 | Murphy | |
| 1,196,410 | A | 8/1916 | Walker | |
| 1,352,865 | A | 9/1920 | Augestad | 36/27 |
| 1,370,212 | A | 3/1921 | Iaculli | |
| 1,380,879 | A | 6/1921 | Young | |
| 1,403,940 | A | 1/1922 | Lloy | |
| 1,502,087 | A | 7/1924 | Bunns | |
| 1,587,749 | A | 7/1924 | Bierly | |
| 1,522,890 | A | 1/1925 | Krap | |
| 1,539,762 | A | 5/1925 | Mussabini | |
| 1,726,028 | A | 8/1929 | Keller | 36/7.8 |
| 1,894,681 | A | 1/1933 | Greider | |
| 1,920,112 | A | 7/1933 | Shaft | |
| D95,767 | S | 5/1935 | Marks | |
| 2,002,706 | A | 5/1935 | Mong | 36/7.6 |
| 2,048,683 | A | 7/1936 | Brockman | |
| 2,112,052 | A | 3/1938 | Smith | 36/2.5 |
| D111,852 | S | 10/1938 | Hurzeler | |
| 2,172,000 | A | 3/1939 | Wenker | 272/70 |
| 2,178,025 | A | 10/1939 | Richter | 36/2.5 |
| 2,183,277 | A | 12/1939 | Heilhecker | 36/14 |
| 2,200,080 | A | 5/1940 | Fein | 36/2.5 |
| D121,466 | S | 6/1940 | Calderazzo | |
| 2,205,091 | A | 6/1940 | Geffner | 36/2.5 |
| D122,607 | S | 9/1940 | Nutt | |
| 2,220,534 | A | 11/1940 | McLean | 36/11.5 |
| 2,236,367 | A | 3/1941 | Gruber | 36/2.5 |
| 2,302,596 | A | 11/1942 | Bigio | 36/101 |
| D145,816 | S | 10/1946 | Payne | D7/7 |
| 2,413,545 | A | 12/1946 | Cordi | 36/7.8 X |
| 2,414,445 | A | 1/1947 | Cahill | 36/8.5 |
| 2,444,865 | A | 7/1947 | Warrington | 36/38 |
| 2,430,338 | A | 11/1947 | Helman | 36/12 |
| 2,435,668 | A | 2/1948 | Behringer et al. | 36/11.5 |
| 2,447,603 | A | 8/1948 | Snyder | 36/38 |
| 2,456,102 | A | 12/1948 | Agostinelli | 36/68 |
| 2,508,318 | A | 1/1949 | Wallach | 36/38 |
| 2,469,708 | A | 5/1949 | Alexander | 36/11.5 |
| 2,491,930 | A | 12/1949 | Parlante | 36/2.5 |
| 2,493,154 | A | 1/1950 | Mavrakis | 36/2.5 |
| 2,497,175 | A | 2/1950 | Mantos | 36/2.5 |
| 2,537,156 | A | 1/1951 | Pennell | 36/43 |
| 2,552,943 | A | 5/1951 | Danielius | 36/15 |
| 2,579,953 | A | 12/1951 | Morris | 36/7.6 |
| 2,588,061 | A | 3/1952 | Vesely | 36/11.5 |
| 2,721,400 | A | 10/1952 | Israel | 36/8.5 |
| 2,640,283 | A | 6/1953 | McCord | 36/25 |
| 2,814,132 | A | 10/1953 | Montoscuro | 36/37 |
| 2,761,224 | A | 9/1956 | Gardiner | 36/11.5 |
| 2,809,449 | A | 10/1957 | Smith | 36/2.5 |
| 2,873,540 | A | 2/1959 | Murphy | 36/2.5 |
| 2,953,861 | A | 5/1959 | Horten | 36/7.8 |
| 3,012,340 | A | 12/1961 | Reinhart | 36/2.5 |
| 3,012,341 | A | 12/1961 | Schaefer | 36/2.5 |
| 194,309 | A | 1/1963 | Levine | D7/7 |
| D194,345 | S | 1/1963 | Levine | D7/7 |
| 3,075,212 | A | 1/1963 | Sherbrook | 12/142 |
| 3,142,910 | A | 8/1964 | Levine | 36/2.5 |
| 3,204,346 | A | 9/1965 | Lockard et al. | 36/2.5 |
| 3,214,849 | A | 11/1965 | Nadaud | 36/38 |
| 3,251,144 | A | 5/1966 | Weitzner | 36/2.5 |
| D205,882 | S | 10/1966 | Post | D7/7 |
| 3,333,353 | A | 8/1967 | Garcia | 36/68 |
| 3,352,034 | A | 11/1967 | Braun | 36/67 |
| 3,369,309 | A | 2/1968 | Brooks | 36/2.5 |
| 3,404,468 | A | 10/1968 | Rosen | 36/11 |
| 3,436,843 | A | 4/1969 | Sacks | 36/2.5 |
| 3,541,708 | A | 11/1970 | Rosen | 36/2.5 |
| 3,577,663 | A | 5/1971 | Mershon | 36/67 |
| 3,597,863 | A | 8/1971 | Austin | 36/59 |
| 3,686,777 | A | 8/1972 | Rosen | 36/2.5 |
| 3,686,779 | A | 8/1972 | Sacks | 36/2.5 W |
| 3,777,374 | A | 12/1973 | Hendricks | 36/38 |
| 3,786,579 | A | 1/1974 | Clark et al. | 36/7.6 |
| 3,818,617 | A | 6/1974 | Dassler et al. | 36/32 R |
| 3,822,490 | A | 7/1974 | Murawski | 36/2.5 R |
| 3,858,337 | A | 1/1975 | Vogel | 36/55 |
| 3,878,626 | A | 4/1975 | Isman | 36/15 |
| 3,886,674 | A | 6/1975 | Pavia | 36/38 |
| 3,906,646 | A | 9/1975 | Milotic | 36/2.5 C |
| 3,982,336 | A | 9/1976 | Herro | 36/62 |
| 3,983,642 | A | 10/1976 | Liao | 36/101 |
| 4,062,132 | A | 12/1977 | Klimaszewski | 36/100 |
| 4,091,472 | A | 5/1978 | Daher et al. | 623/55 |
| 4,103,440 | A | 8/1978 | Lawrence | 36/101 |
| 4,107,857 | A | 8/1978 | Devlin | 36/129 |
| 4,128,950 | A | 12/1978 | Bowerman et al. | 36/30 R |
| 4,132,016 | A | 1/1979 | Vaccari | 36/114 |
| 4,146,981 | A | 4/1979 | Renaldo | 36/100 |
| 4,183,156 | A | 1/1980 | Rudy | 36/44 |
| 4,187,623 | A | 2/1980 | Dassler | 36/129 |
| 4,198,037 | A | 4/1980 | Anderson | 267/153 |
| 4,217,705 | A | 8/1980 | Donzis | 36/29 |
| 4,219,945 | A | 9/1980 | Rudy | 36/29 |
| 4,237,625 | A | 12/1980 | Cole et al. | 36/28 |
| 4,255,877 | A | 3/1981 | Bowerman | 36/129 |
| 4,258,480 | A * | 3/1981 | Famolare, Jr. | 36/91 |
| 4,259,792 | A | 4/1981 | Halberstadt | 36/28 |
| 4,262,434 | A | 4/1981 | Michelotti | 36/67 |
| 4,267,649 | A | 5/1981 | Smith | 36/101 |
| 4,267,650 | A | 5/1981 | Bauer | 36/101 |
| 4,271,606 | A | 6/1981 | Rudy | 36/29 |
| 4,271,607 | A | 6/1981 | Funck | 36/30 |
| 4,279,083 | A | 7/1981 | Dilg | 36/101 |
| 4,287,250 | A | 9/1981 | Rudy | 428/166 |
| 4,300,294 | A | 11/1981 | Riecken | 36/97 |
| 4,314,413 | A | 2/1982 | Dassler | 36/129 |
| 4,317,294 | A | 3/1982 | Goodyear | 36/100 |
| 4,322,893 | A | 4/1982 | Halvorsen | 36/43 |
| 4,322,895 | A | 4/1982 | Hockerson | 36/129 |
| 4,333,248 | A | 6/1982 | Samuels | 36/72 R |
| 4,335,530 | A | 6/1982 | Stubblefield | 36/83 |
| 4,340,626 | A | 7/1982 | Rudy | 428/35 |
| 4,342,158 | A | 8/1982 | McMahon et al. | 36/35 R |
| 4,343,057 | A | 8/1982 | Bensley | 12/142 D |
| 4,351,120 | A | 9/1982 | Dalebout | 36/117 |
| 4,358,902 | A | 11/1982 | Cole et al. | 36/28 |
| 4,360,978 | A | 11/1982 | Simpkins | 36/7.8 X |
| 4,364,188 | A | 12/1982 | Turner et al. | 36/31 |
| 4,364,189 | A | 12/1982 | Bates | 36/31 |
| 4,370,754 | A | 2/1983 | Donzis | 2/2 |

| Patent | Date | Inventor | Class |
|---|---|---|---|
| 4,372,058 A | 2/1983 | Stubblefield | 36/32 R |
| 4,377,042 A | 3/1983 | Bauer | 36/101 |
| 4,389,798 A | 6/1983 | Tilles | 36/129 |
| 4,391,048 A | 7/1983 | Lutz | 36/28 |
| 4,399,620 A | 8/1983 | Funck | 36/30 R |
| 4,402,146 A | 9/1983 | Parracho et al. | 36/129 |
| 4,429,474 A | 2/1984 | Metro | 36/36 A |
| 4,429,475 A | 2/1984 | Bensley | 36/45 |
| 4,430,810 A | 2/1984 | Bente | 36/32 R |
| 4,439,935 A | 4/1984 | Kelly | 36/101 |
| 4,439,936 A | 4/1984 | Clarke et al. | 36/102 |
| 4,441,211 A | 4/1984 | Donzis | 2/2 |
| 4,450,633 A | 5/1984 | Connelly | 36/101 |
| 4,453,271 A | 6/1984 | Donzis | 2/2 |
| 4,471,538 A | 9/1984 | Pomeranz et al. | 36/28 |
| 4,481,726 A | 11/1984 | Phillips | 36/30 A |
| 4,481,727 A | 11/1984 | Stubblefield | 36/83 |
| 4,484,397 A | 11/1984 | Curley, Jr. | 36/92 |
| 4,486,901 A | 12/1984 | Donzis | 2/2 |
| 4,486,964 A | 12/1984 | Rudy | 36/28 |
| 4,497,123 A | 2/1985 | Ehrlich | 36/32 R |
| 4,506,460 A | 3/1985 | Rudy | 36/28 |
| 4,506,462 A | 3/1985 | Cavanagh | 36/92 |
| 4,513,449 A | 4/1985 | Donzis | 2/2 |
| 4,523,396 A | 6/1985 | Dassler | 36/134 |
| 4,534,124 A | 8/1985 | Schnell | 36/114 |
| 4,535,554 A | 8/1985 | De Obaldia B. | 36/113 |
| 4,536,974 A | 8/1985 | Cohen | 36/28 |
| D280,567 S | 9/1985 | Ji | D2/310 |
| 4,542,598 A | 9/1985 | Misevich et al. | 36/114 |
| 4,542,599 A | 9/1985 | Annovi | 36/117 |
| 4,561,195 A | 12/1985 | Onoda et al. | 36/30 R |
| 4,562,651 A | 1/1986 | Frederick et al. | 36/102 |
| 4,566,206 A | 1/1986 | Weber | 36/27 |
| 4,577,417 A | 3/1986 | Cole | 36/29 |
| 4,578,882 A | 4/1986 | Talarico, II | 36/103 |
| 4,586,209 A | 5/1986 | Bensley | 12/142 D |
| 4,592,153 A | 6/1986 | Jacinto | 36/38 |
| 4,598,487 A | 7/1986 | Misevich | 36/114 |
| 4,606,139 A | 8/1986 | Silver | 36/15 |
| 4,610,100 A | 9/1986 | Rhodes | 36/42 |
| 4,611,412 A | 9/1986 | Cohen | 36/28 |
| 4,620,372 A | 11/1986 | Goodrich | 36/107 |
| 4,622,764 A | 11/1986 | Boulier | 36/68 |
| 4,638,576 A | 1/1987 | Parracho et al. | 36/68 |
| 4,642,911 A | 2/1987 | Talarico, II | 36/30 R |
| 4,651,445 A | 3/1987 | Hannibal | 36/103 |
| 4,652,266 A | 3/1987 | Truesdell | |
| 4,670,995 A | 6/1987 | Huang | 36/29 |
| 4,694,591 A | 9/1987 | Banich et al. | 36/102 |
| 4,706,392 A | 11/1987 | Yang | 36/101 |
| 4,727,661 A | 3/1988 | Kuhn | 36/100 |
| 4,741,114 A | 5/1988 | Stubblefield | 36/32 R |
| 4,745,693 A | 5/1988 | Brown | 36/101 |
| 4,756,095 A | 7/1988 | Lakic | 36/2.6 |
| 4,766,679 A | 8/1988 | Bender | 36/30 R |
| 4,766,681 A | 8/1988 | O'Rourke et al. | 36/89 |
| 4,768,295 A | 9/1988 | Ito | 36/28 |
| 4,771,554 A | 9/1988 | Hannemann | 36/27 |
| 4,783,910 A | 11/1988 | Boys, II et al. | 36/107 |
| 4,794,707 A | 1/1989 | Franklin et al. | 36/107 |
| 4,805,321 A | 2/1989 | Tonkel | 36/54 |
| 4,807,372 A | 2/1989 | McCall | 36/135 |
| 4,815,221 A | 3/1989 | Diaz | 36/27 |
| 4,817,304 A | 4/1989 | Parker et al. | 36/114 |
| 4,821,430 A | 4/1989 | Flemming et al. | 36/69 |
| 4,822,363 A | 4/1989 | Phillips | |
| 4,833,795 A | 5/1989 | Diaz | 36/29 |
| 4,837,949 A | 6/1989 | Dufour | 36/127 |
| 4,843,737 A | 7/1989 | Vorderer | 36/38 |
| 4,854,057 A | 8/1989 | Misevich et al. | 36/114 |
| 4,858,341 A | 8/1989 | Rosen | 36/97 |
| RE33,066 E | 9/1989 | Stubblefield | 36/83 |
| 4,874,640 A | 10/1989 | Donzis | 427/421 |
| 4,878,300 A | 11/1989 | Bogaty | 36/35 R |
| 4,878,301 A | 11/1989 | Kiyosawa | 36/69 |
| 4,881,329 A | 11/1989 | Crowley | 36/38 |
| 4,887,367 A | 12/1989 | Mackness et al. | 36/28 |
| 4,887,369 A | 12/1989 | Bailey et al. | 36/101 |
| 4,890,397 A | 1/1990 | Harada et al. | 36/30 R |
| 4,892,554 A | 1/1990 | Robinson | |
| 4,894,934 A | 1/1990 | Illustrato | 36/37 |
| 4,897,938 A | 2/1990 | Otsuka | 36/88 |
| 4,906,502 A | 3/1990 | Rudy | 428/69 |
| 4,910,855 A | 3/1990 | Balarzs | 36/38 X |
| 4,910,884 A | 3/1990 | Lindh et al. | 36/28 |
| 4,912,861 A | 4/1990 | Huang | 36/29 |
| 4,918,838 A | 4/1990 | Chang | 36/28 |
| D307,608 S | 5/1990 | Shure | D21/72 |
| 4,922,631 A | 5/1990 | Anderieé | 36/102 |
| 4,926,503 A | 5/1990 | Wingo, Jr. | 2/267 |
| 4,934,072 A | 6/1990 | Fredericksen et al. | 36/29 |
| 4,936,028 A | 6/1990 | Posacki | 36/15 |
| 4,936,029 A | 6/1990 | Rudy | 36/39 |
| 4,941,273 A | 7/1990 | Gross et al. | |
| 4,942,677 A | 7/1990 | Flemming et al. | 36/27 |
| 4,949,476 A | 8/1990 | Anderié | 36/129 |
| 4,958,447 A | 9/1990 | DuPree | 36/101 |
| 4,967,492 A | 11/1990 | Rosen | 36/97 |
| 4,970,807 A | 11/1990 | Anderiéet al. | 36/28 |
| 4,974,344 A | 12/1990 | Ching | 36/101 |
| 4,985,931 A | 1/1991 | Wingo, Jr. | 2/2 |
| 4,989,349 A | 2/1991 | Ellis, III | 36/25 R |
| 5,003,709 A | 4/1991 | Okayasu et al. | 36/107 |
| 5,005,300 A | 4/1991 | Diaz et al. | 36/114 |
| 5,014,449 A | 5/1991 | Richard et al. | 36/114 |
| 5,024,007 A | 6/1991 | Dufour | 36/127 |
| 5,029,341 A | 7/1991 | Wingo, Jr. | 2/2 |
| 5,035,009 A | 7/1991 | Wingo, Jr. et al. | 2/414 |
| 5,042,174 A | 8/1991 | Nichols | 36/25 |
| 5,042,175 A | 8/1991 | Ronen et al. | 36/28 |
| 5,042,176 A | 8/1991 | Rudy | 36/29 |
| 5,046,267 A | 9/1991 | Kilgore et al. | 36/114 |
| 5,052,130 A | 10/1991 | Barry et al. | 36/107 |
| 5,060,401 A | 10/1991 | Whatley | 36/25 R |
| 5,065,531 A | 11/1991 | Prestridge | 36/100 |
| 5,083,361 A | 1/1992 | Rudy | 29/454 |
| 5,083,385 A | 1/1992 | Halford | 36/101 |
| 5,092,060 A | 3/1992 | Frachey et al. | 36/29 |
| 5,097,607 E | 3/1992 | Fredericksen | 36/291 |
| 5,109,614 A | 5/1992 | Curry | 36/100 |
| 5,113,599 A | 5/1992 | Cohen et al. | 36/88 |
| 5,123,180 A | 6/1992 | Nannig et al. | 36/43 |
| 5,123,181 A | 6/1992 | Rosen | 36/97 |
| 5,131,173 A | 7/1992 | Anderieé | 36/25 R |
| 5,133,138 A | 7/1992 | Durcho | 36/36 R |
| 5,138,776 A | 8/1992 | Levin | 36/38 |
| 5,155,927 A | 10/1992 | Bates et al. | 36/28 |
| 5,159,767 A | 11/1992 | Allen | 36/27 |
| 5,185,943 A | 2/1993 | Tong et al. | 36/28 |
| D334,276 S | 3/1993 | Feller et al. | 82/314 |
| 5,191,727 A | 3/1993 | Barry et al. | 36/107 |
| 5,195,258 A | 3/1993 | Loader | 36/38 |
| 5,197,206 A | 3/1993 | Shorten | 36/29 |
| 5,197,207 A | 3/1993 | Shorten | 36/29 |
| 5,197,210 A | 3/1993 | Sink | 36/127 |
| 5,201,125 A | 4/1993 | Shorten | 36/29 |
| 5,203,095 A | 4/1993 | Allen | 36/27 |
| 5,206,804 A * | 4/1993 | Thies et al. | 705/27 |
| 5,212,878 A | 5/1993 | Burke et al. | 36/27 |
| 5,235,715 A | 8/1993 | Donzis | 12/142 R |
| 5,247,742 A | 9/1993 | Kilgore et al. | 36/114 |

| Patent No. | Date | Inventor | Class |
|---|---|---|---|
| D340,349 S | 10/1993 | Kilgore et al. | D2/318 |
| D340,350 S | 10/1993 | Kilgore et al. | D2/318 |
| 5,255,451 A | 10/1993 | Tong et al. | 36/30 A |
| 5,279,051 A | 1/1994 | Whatley | 36/25 R |
| 5,280,680 A | 1/1994 | Burke et al. | 36/28 |
| 5,280,890 A | 1/1994 | Wydra | 267/220 |
| D344,174 S | 2/1994 | Kilgore | D2/964 |
| D344,398 S | 2/1994 | Kilgore | D2/967 |
| D344,399 S | 2/1994 | Kilgore | D2/965 |
| D344,400 S | 2/1994 | Kilgore | D2/965 |
| D344,401 S | 2/1994 | Kilgore | D2/965 |
| 5,282,325 A | 2/1994 | Beyl | 36/27 |
| 5,285,583 A | 2/1994 | Aleven | 36/44 |
| D344,622 S | 3/1994 | Kilgore | D2/964 |
| 5,297,349 A | 3/1994 | Kilgore | 36/114 |
| 5,313,717 A | 5/1994 | Allen et al. | 36/28 |
| 5,317,819 A | 6/1994 | Ellis, III | 36/25 R |
| 5,317,822 A | 6/1994 | Johnson | 36/101 |
| 5,319,866 A | 6/1994 | Foley et al. | 36/91 |
| D350,018 S | 8/1994 | Kilgore | D2/964 |
| D350,019 S | 8/1994 | Kilgore | D2/965 |
| D350,020 S | 8/1994 | Kilgore | D2/965 |
| 5,337,492 A | 8/1994 | Anderieé et al. | 36/28 |
| 5,339,544 A | 8/1994 | Caberlotto | 367/102 |
| D350,225 S | 9/1994 | Kilgore | D2/964 |
| D350,226 S | 9/1994 | Kilgore | D2/964 |
| D350,227 S | 9/1994 | Kilgore | D2/964 |
| D350,433 S | 9/1994 | Kilgore | D2/961 |
| 5,343,636 A | 9/1994 | Sabol | 36/78 |
| 5,343,639 A | 9/1994 | Kilgore et al. | 36/29 |
| D351,057 S | 10/1994 | Kilgore | D2/964 |
| D351,720 S | 10/1994 | Kilgore | D2/967 |
| 5,353,522 A | 10/1994 | Wagner | 36/15 |
| 5,353,523 A | 10/1994 | Kilgore et al. | 36/29 |
| D351,936 S | 11/1994 | Kilgore | D2/965 |
| D352,159 S | 11/1994 | Kilgore | D2/965 |
| D352,160 S | 11/1994 | Kilgore | D2/967 |
| 5,363,570 A | 11/1994 | Allen et al. | 36/28 |
| 5,367,790 A | 11/1994 | Gamow et al. | 36/27 |
| 5,367,792 A | 11/1994 | Richard et al. | 36/114 |
| 5,369,896 A | 12/1994 | Frachey et al. | 36/29 |
| D354,617 S | 1/1995 | Kilgore | D2/964 |
| 5,381,608 A | 1/1995 | Claveria | 36/35 R |
| 5,384,973 A | 1/1995 | Lyden | 36/25 R |
| D355,755 S | 2/1995 | Kilgore | D2/964 |
| 5,390,430 A | 2/1995 | Fitchmun et al. | 36/30 |
| 5,401,564 A | 3/1995 | Lee et al. | 428/228 |
| 5,406,719 A | 4/1995 | Potter | 36/28 |
| 5,410,821 A | 5/1995 | Hilgendorf | 36/100 |
| 5,419,060 A | 5/1995 | Choi | 36/36 R |
| 5,425,184 A | 6/1995 | Lyden et al. | 36/29 |
| 5,435,079 A | 7/1995 | Gallegos | 36/38 |
| 5,437,110 A | 8/1995 | Goldston et al. | 36/38 |
| 5,461,800 A | 10/1995 | Luthi et al. | 36/28 |
| 5,483,757 A | 1/1996 | Frykberg | 36/101 |
| 5,493,792 A | 2/1996 | Bates et al. | 36/28 |
| 5,501,022 A | 3/1996 | Cohn | 36/101 |
| 5,528,842 A | 6/1996 | Ricci et al. | 36/27 |
| 5,533,280 A | 7/1996 | Halliday | 36/101 |
| 5,542,198 A | 8/1996 | Famolare | 36/130 |
| 5,543,194 A | 8/1996 | Rudy | 428/69 |
| 5,544,429 A | 8/1996 | Ellis, III | 36/25 R |
| 5,544,430 A | 8/1996 | Jacko | 36/7.1 R |
| 5,546,829 A | 8/1996 | Bryne | 74/594.6 |
| 5,560,126 A | 10/1996 | Meschan et al. | 36/42 |
| 5,566,477 A | 10/1996 | Mathis et al. | 36/100 |
| 5,570,523 A | 11/1996 | Lin | 36/112 |
| 5,572,804 A | 11/1996 | Skaja et al. | 36/29 |
| 5,592,706 A | 1/1997 | Pearce | 5/654 |
| 5,595,004 A | 1/1997 | Lyden et al. | 36/29 |
| 5,596,819 A | 1/1997 | Goldston et al. | 36/35 R |
| 5,598,645 A | 2/1997 | Kaiser | 36/29 |
| 5,604,997 A | 2/1997 | Dieter | 36/45 |
| 5,611,152 A | 3/1997 | Richard et al. | 36/28 |
| 5,615,497 A | 4/1997 | Meschan | 36/36 R |
| 5,625,964 A | 5/1997 | Lyden et al. | 36/29 |
| 5,628,129 A | 5/1997 | Kilgore et al. | 36/134 |
| 5,632,057 A | 5/1997 | Lyden | 12/146 B |
| 5,636,456 A | 6/1997 | Allen | 36/168 |
| 5,642,575 A | 7/1997 | Norton et al. | 36/27 |
| 5,644,857 A | 7/1997 | Ouellette et al. | 36/15 |
| 5,647,145 A | 7/1997 | Russell et al. | 36/28 |
| 5,653,046 A | 8/1997 | Lawlor | 36/28 |
| 5,657,558 A | 8/1997 | Pohu | 36/131 |
| 5,659,979 A | 8/1997 | Sileo | 36/54 |
| 5,661,915 A | 9/1997 | Smith | 36/15 |
| 5,678,327 A | 10/1997 | Halberstadt | 36/27 |
| 5,678,329 A | 10/1997 | Griffin et al. | 36/50.1 |
| 5,692,319 A | 12/1997 | Parker et al. | 36/50.1 |
| 5,701,686 A | 12/1997 | Herr et al. | 36/27 |
| 5,704,137 A | 1/1998 | Dean et al. | 36/28 |
| 5,709,954 A | 1/1998 | Lyden et al. | 428/500 |
| 5,718,063 A | 2/1998 | Yamashita et al. | 36/29 |
| 5,729,912 A | 3/1998 | Gutkowski et al. | 36/97 |
| 5,729,916 A | 3/1998 | Vorobiev et al. | 36/27 |
| 5,729,918 A | 3/1998 | Smets | 36/91 |
| 5,743,028 A | 4/1998 | Lombardino | 36/27 |
| 5,755,001 A | 5/1998 | Potter | 12/142 P |
| 5,775,005 A | 7/1998 | McClelland | 36/31 |
| 5,778,564 A | 7/1998 | Kettner | 36/101 |
| 5,778,565 A | 7/1998 | Holt et al. | 36/110 |
| 5,784,808 A | 7/1998 | Hockerson | 36/102 |
| 5,785,909 A | 7/1998 | Chang et al. | 264/46.5 |
| 5,786,057 A | 7/1998 | Lyden et al. | 428/52 |
| 5,787,610 A | 8/1998 | Brooks | 36/28 |
| 5,802,739 A | 9/1998 | Potter | 36/29 |
| 5,806,209 A | 9/1998 | Crowley et al. | 36/28 |
| 5,806,210 A | 9/1998 | Meschan | 36/36 R |
| 5,813,146 A | 9/1998 | Gutkowski et al. | 36/97 |
| 5,822,886 A | 10/1998 | Luthi et al. | 36/28 |
| 5,826,352 A | 10/1998 | Meschan et al. | 36/42 |
| 5,832,630 A | 11/1998 | Potter | 36/29 |
| 5,832,634 A | 11/1998 | Wong | 36/107 |
| 5,836,094 A | 11/1998 | Figel | 36/131 |
| 5,843,268 A | 12/1998 | Lyden et al. | 156/324.4 |
| 5,848,484 A | 12/1998 | Dupree et al. | 36/101 |
| 5,852,887 A | 12/1998 | Healy et al. | 36/88 |
| 5,853,844 A | 12/1998 | Wen | 428/119 |
| 5,875,567 A | 3/1999 | Bayley | 36/27 |
| 5,885,500 A | 3/1999 | Tawney et al. | 264/154 |
| 5,896,608 A | 4/1999 | Whatley | 12/142 T |
| 5,897,622 A | 4/1999 | Blinn et al. | 705/26 |
| 5,906,872 A | 5/1999 | Lyden et al. | 428/52 |
| 5,915,820 A | 6/1999 | Kraeuter et al. | 36/114 |
| 5,918,384 A | 7/1999 | Meschan | 36/37 |
| 5,921,004 A | 7/1999 | Lyden | 36/25 R |
| 5,930,769 A * | 7/1999 | Rose | 345/419 |
| 5,930,918 A | 8/1999 | Healy et al. | 36/29 |
| 5,937,544 A | 8/1999 | Russell | 36/28 |
| 5,940,994 A | 8/1999 | Allen | 36/168 |
| 5,970,628 A | 10/1999 | Meschan | 36/42 |
| 5,976,451 A | 11/1999 | Skaja et al. | 264/516 |
| 5,979,078 A | 11/1999 | McLaughlin | 36/29 |
| 5,983,200 A * | 11/1999 | Slotznick | 705/1 |
| 5,983,201 A * | 11/1999 | Fay | 705/26 |
| 5,987,779 A | 11/1999 | Litchfield et al. | 36/29 |
| 5,987,780 A | 11/1999 | Lyden et al. | 36/29 |
| 5,993,585 A | 11/1999 | Goodwin | 156/145 |
| 5,996,255 A | 12/1999 | Ventura | 36/44 |
| 6,009,636 A | 1/2000 | Wallerstein | 36/7.8 |
| 6,009,641 A | 1/2000 | Ryan | 36/131 |
| 6,013,340 A | 1/2000 | Bonk et al. | 428/35.2 |

| | | | | | | | | |
|---|---|---|---|---|---|---|---|---|
| 6,020,055 | A | 2/2000 | Pearce ........................ 428/323 | EP | 1025770 | A2 | 2/2000 | ........... A43B/13/12 |
| 6,024,712 | A | 2/2000 | Iglesias et al. ................. 602/6 | EP | 1048233 | A2 | 2/2000 | ........... A43B/13/12 |
| 6,029,374 | A * | 2/2000 | Herr et al. .................... 36/151 | EP | 1 016 353 | A2 | 7/2000 | ............ A43B/5/00 |
| 6,029,962 | A | 2/2000 | Shorten et al. ............. 267/145 | EP | 1033087 | A1 | 9/2000 | ........... A43B/7/24 |
| 6,041,521 | A | 3/2000 | Wong ........................... 36/28 | EP | 1 240 838 | A1 | 9/2002 | |
| 6,050,002 | A | 4/2000 | Meschan ...................... 36/37 | FR | 141998 | | of 1903 | |
| 6,055,746 | A | 5/2000 | Lyden et al. ................... 36/29 | FR | 424140 | | 5/1911 | |
| 6,055,747 | A | 5/2000 | Lombardino ................... 36/27 | FR | 0472735 | | 12/1916 | .................... 36/37 |
| 6,082,025 | A | 7/2000 | Bonk et al. ..................... 36/29 | FR | 701729 | | 3/1931 | |
| D429,877 | S | 8/2000 | Lozano et al. ............... D2/972 | FR | 1227420 | | 8/1960 | .................... 36/37 |
| 6,098,313 | A | 8/2000 | Skaja ............................ 36/28 | FR | 2448308 | | 2/1980 | ........... A43B/13/14 |
| 6,098,316 | A | 8/2000 | Hong ............................ 36/97 | FR | 2507066 | | 12/1982 | .................... 36/27 |
| 6,115,941 | A | 9/2000 | Ellis, III .................... 36/25 R | FR | 2658396 | | 8/1991 | |
| 6,115,942 | A | 9/2000 | Paradis ......................... 36/27 | GB | 443571 | | 2/1936 | |
| 6,119,371 | A | 9/2000 | Goodwin et al. ............. 36/29 | GB | 608180 | | 9/1948 | |
| D431,898 | S | 10/2000 | Clegg et al. ................. D2/972 | GB | 2 200 030 | A * | 12/1986 | ........... A43B/21/26 |
| 6,127,026 | A | 10/2000 | Bonk et al. ................. 428/213 | GB | 2189978 | A | 11/1987 | ........... A43B/13/18 |
| 6,131,309 | A | 10/2000 | Walsh .......................... 36/28 | GB | 2200030 | | 7/1988 | .................... 36/27 |
| D433,213 | S | 11/2000 | Schuette et al. ............. D2/957 | GB | 2256784 | A | of 1992 | ........... A43B/13/00 |
| D433,216 | S | 11/2000 | Avar et al. ................... D2/972 | IT | 633409 | | 2/1962 | |
| 6,151,805 | A | 11/2000 | Savoie ........................ 36/134 | JP | 4024001 | | 1/1992 | ........... A43B/13/12 |
| 6,161,240 | A | 12/2000 | Huang ........................... 5/710 | WO | 90/11698 | | 10/1990 | ............ A43B/3/26 |
| 6,178,664 | B1 | 1/2001 | Yant et al. ..................... 36/44 | WO | 91/01659 | | 2/1991 | ........... A43B/13/14 |
| 6,195,915 | B1 | 3/2001 | Russell ......................... 36/28 | WO | 91/09547 | | 7/1991 | ........... A43B/13/18 |
| 6,206,750 | B1 * | 3/2001 | Barad et al. ................. 446/268 | WO | 92/08384 | | 5/1992 | ........... A43B/13/18 |
| 6,237,251 | B1 | 5/2001 | Litchfield et al. ........... 36/25 R | WO | 94/13164 | | 6/1994 | ........... A43B/13/00 |
| 6,247,249 | B1 | 6/2001 | Lindquist ...................... 36/28 | WO | 94/21454 | | 9/1994 | ........... B32B/15/00 |
| 6,258,421 | B1 | 7/2001 | Potter ........................ 428/35.2 | WO | 95/15570 | | 11/1995 | |
| 6,282,814 | B1 | 9/2001 | Krafsur et al. ................. 36/27 | WO | WO98/07343 | | 2/1998 | ........... A43B/13/18 |
| 6,295,679 | B1 | 10/2001 | Chenevert ................. 12/142 P | WO | WO 98/18386 | * | 5/1998 | ........... A61B/5/107 |
| 6,299,962 | B1 | 10/2001 | Davis et al. .................. 428/98 | WO | WO9924498 | A2 | 5/1999 | ............. C08J/7/00 |
| 6,321,465 | B1 | 11/2001 | Bonk et al. .................... 36/28 | WO | WO0213641 | A2 | 2/2001 | ............ A43B/3/26 |
| 6,324,772 | B1 | 12/2001 | Meschan .................... 36/25 R | WO | WO010062 | A2 | 9/2001 | ........... A43B/13/00 |
| 6,327,795 | B1 | 12/2001 | Russell ......................... 36/28 | WO | WO0170061 | A2 | 9/2001 | ........... A43B/13/00 |
| 6,330,757 | B1 | 12/2001 | Russell ......................... 36/28 | WO | WO0170063 | A2 | 9/2001 | ........... A43B/13/00 |
| 6,332,281 | B1 | 12/2001 | Savoie ........................ 36/134 | WO | WO0170064 | A2 | 9/2001 | ........... A43B/13/00 |
| 6,342,544 | B1 | 1/2002 | Krstic et al. ................. 523/167 | WO | WO0178539 | A2 | 10/2001 | |
| 6,367,167 | B1 | 4/2002 | Krstic et al. ................ 36/25 R | WO | WO0170060 | A2 | 11/2001 | ........... A43B/13/10 |
| 6,367,168 | B1 | 4/2002 | Hatfield et al. ................. 36/45 | | | | | |
| 6,393,731 | B1 | 5/2002 | Moua et al. ................... 36/27 | | | | | |
| 6,401,366 | B2 | 6/2002 | Foxen et al. ................... 36/91 | | | | | |
| 6,416,610 | B1 | 7/2002 | Matis et al. ................. 156/245 | | | | | |
| 6,449,878 | B1 | 9/2002 | Lyden ........................... 36/27 | | | | | |

OTHER PUBLICATIONS

Wilson, Tim, "Custom Manufacturing—Nike Model Shows Web's Limitations", Internetweek; Manhasset; Dec. 6, 1999, Issue 792, extracted on Internet from http://proquest.umi.com/pqdweb?TS on May 30, 2002.*

Runner's World, Fall 2000 Shoe Buyer's Guide, Sep., 2000.

8 Photos of Nike Secret Prior Art Published Oct., 2000.

2 pages, DuPont Website Information Re: ZYTEL® and Nike Track Shoes dated Feb. 1, 2001, Published Oct., 2000.

K. J. Fisher, "Advanced Composites Step into Athletic Shoes,"*Advanced Composites*, May/Jun./ 1991, pp. 32–35.

Product Literature from L.A. Gear Regarding the Catapult Shoe Design.

*Discovery*, Oct. 1989, pp. 77–83, Kunzig.

U.S. patent application Ser. No. 09/228,206, Robert M. Lyden, filed Jan. 11, 1999, entitled "Wheeled Skate with Step–In Binding and Brakes".

U.S. patent application Ser. No. 09/570,171, Robert Lyden, filed May 11, 2000, entitled "Light Cure Conformable Device for Articles of Footwear and Method of Making the Same.".

Herr et al., "A Mechanically Efficient Shoe Midsole Improves Running Economy, Stability and Cushioning," J. Appl. Physiol, in press.

Kerdok et al., "Energetics and Mechanics of Human Running on Surfaces of Different Stiffnesses," J. Appl. Physiol 92:469–478, 2002.

Robert Lyden, "Distance Running", pp. 5–8, 269–319, In Press.

FOREIGN PATENT DOCUMENTS

| | | | |
|---|---|---|---|
| DE | 2419870 | 11/1974 | |
| DE | 2501561 | 7/1976 | ........... A43B/13/26 |
| DE | 2543268 A1 | 3/1977 | ........... A43C/15/16 |
| DE | 2851535 A1 | 4/1980 | ........... A43B/13/26 |
| DE | 2851571 A1 | 5/1980 | ........... A43B/13/26 |
| DE | 29 29 365 A1 | 2/1981 | ........... A43B/13/26 |
| DE | 3034126 A1 | 3/1982 | |
| DE | 3219652 A1 | 12/1983 | ........... A43C/15/16 |
| DE | 3415705 A1 | 10/1985 | |
| DE | 3415705 | 10/1985 | .................... 36/28 |
| DE | 4120133 A1 | 12/1992 | ........... B29C/45/14 |
| DE | 4120134 A1 | 12/1992 | ............. B32B/7/04 |
| DE | 4120136 A1 | 12/1992 | ........... A43B/13/26 |
| DE | 4123302 A1 | 1/1993 | ........... A43C/15/16 |
| DE | 4210292 A1 | 9/1993 | ........... A43B/13/26 |
| DE | 4214802 | 11/1993 | ........... A43B/13/02 |
| DE | 4214802 A1 | 11/1993 | ........... A43B/13/02 |
| EP | 0103041 | 3/1984 | .................... 36/27 |
| EP | 0 272 082 A2 | 6/1988 | ........... A43B/13/18 |
| EP | 0443293 A1 | 8/1991 | ............ A43B/3/26 |
| EP | 0 471 447 B1 | 2/1992 | ........... A43B/13/00 |
| EP | 0 619 084 A1 | 10/1994 | ........... A43B/13/18 |
| EP | 0 752 216 A2 | 1/1997 | ........... A43B/7/14 |
| EP | 0890321 | 1/1999 | |
| EP | 0 890 321 A2 | 1/1999 | ............ A43B/5/00 |
| EP | 0 947 145 A1 | 10/1999 | ........... A43B/13/18 |

* cited by examiner

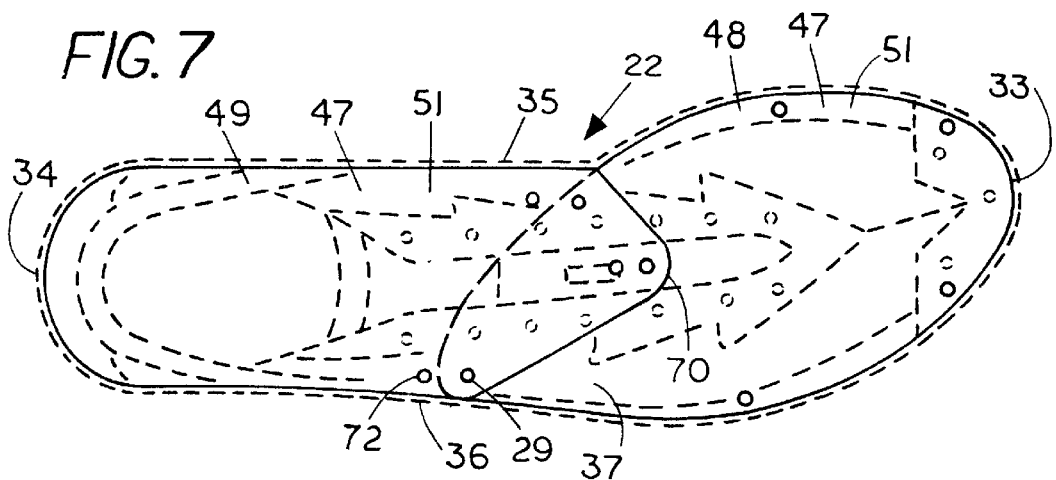
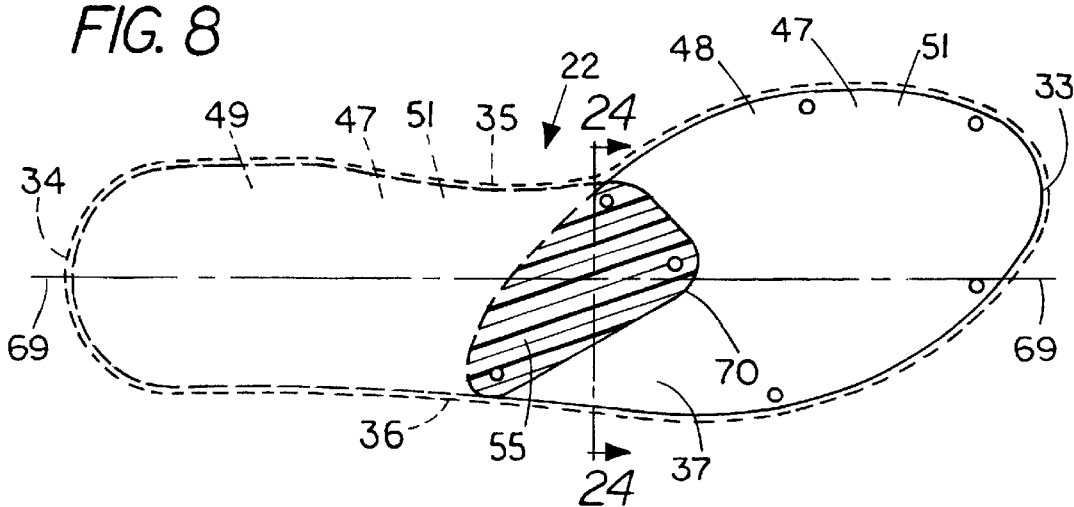
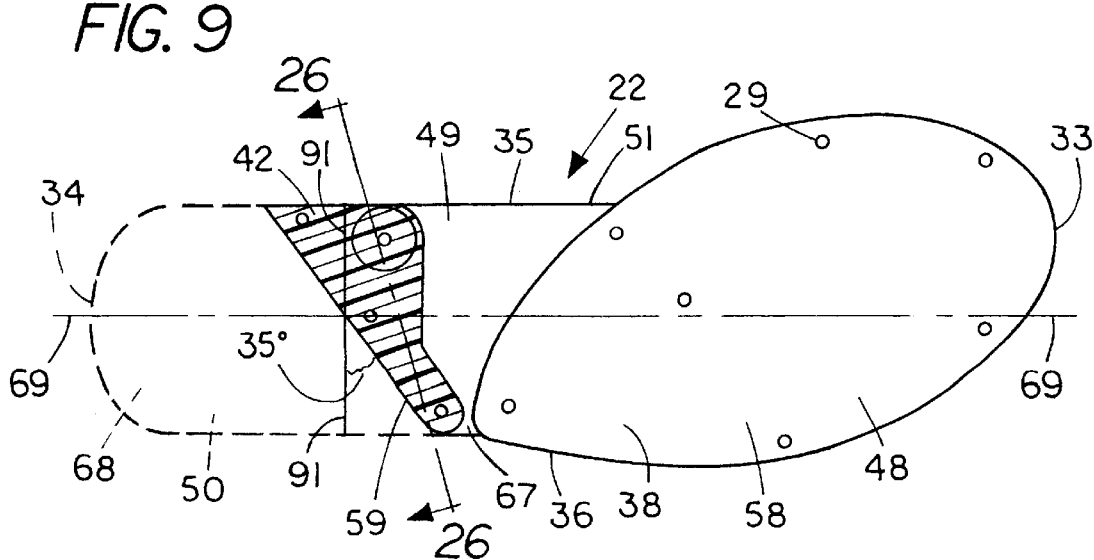

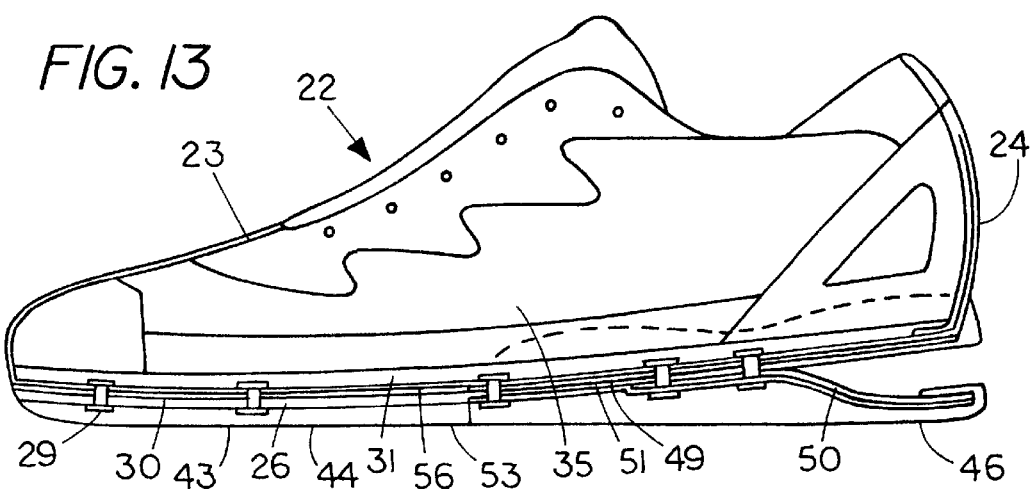
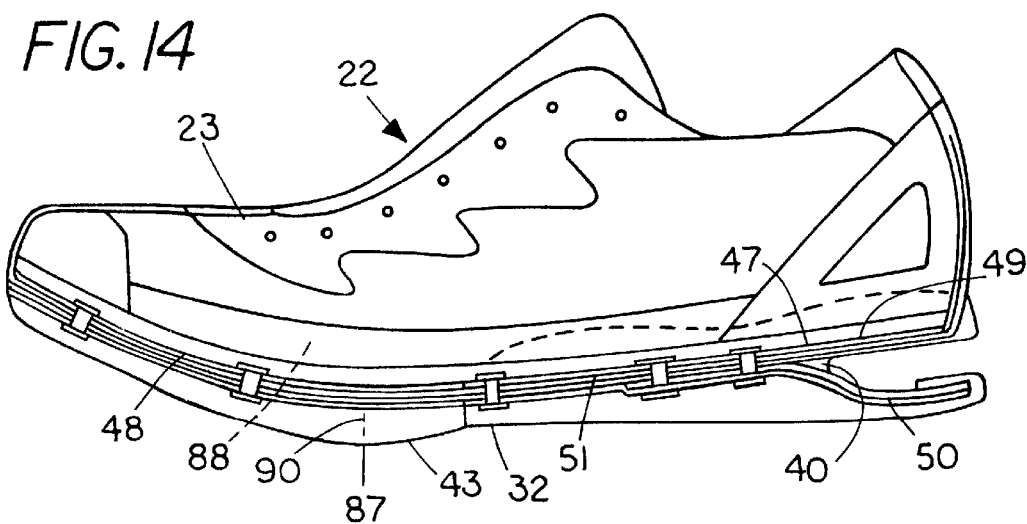
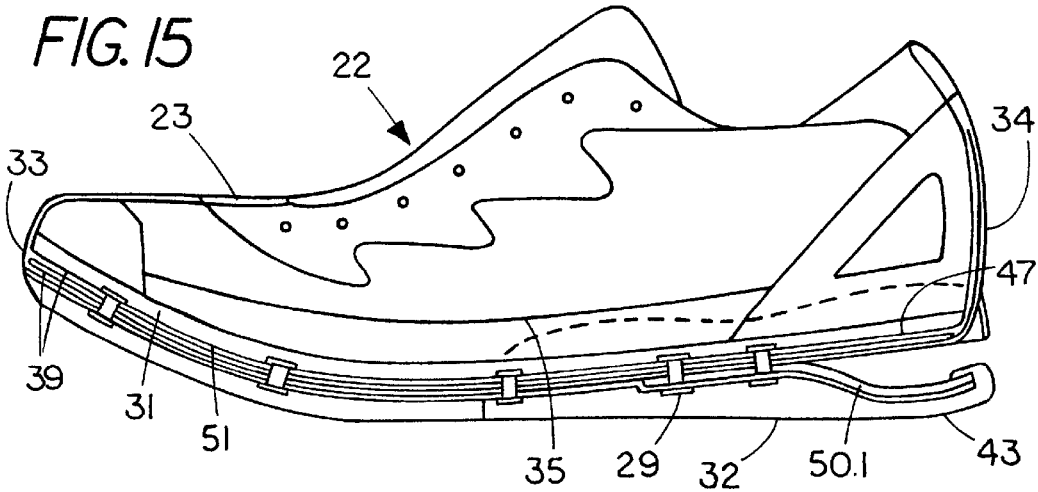

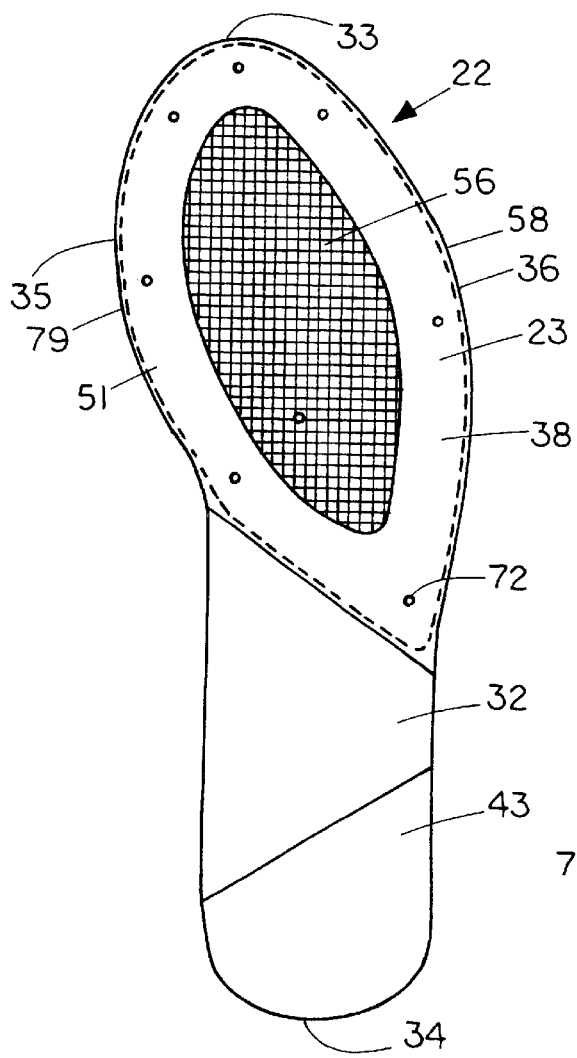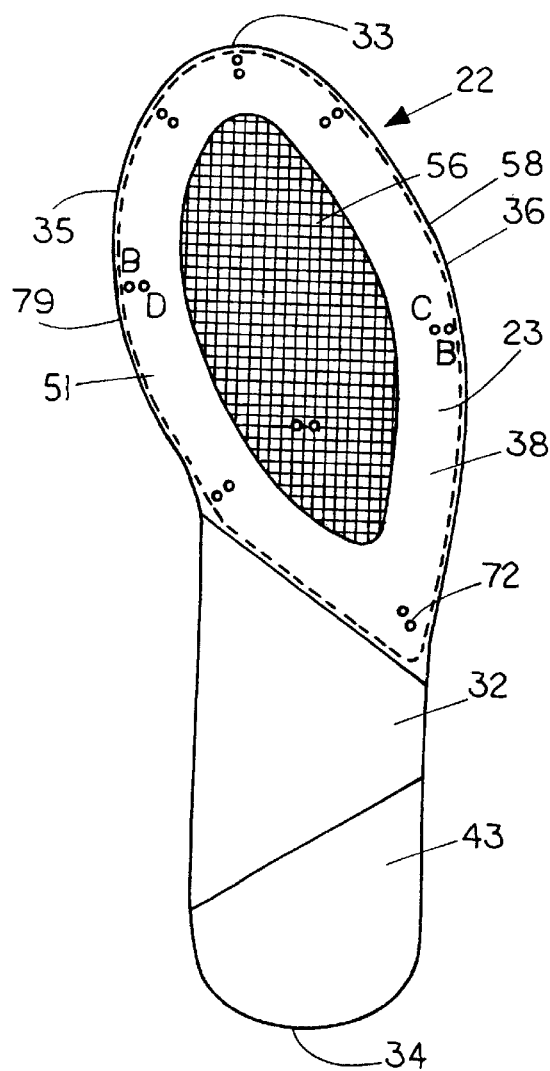

CUSTOMIZED ARTICLE OF FOOTWEAR AND METHOD OF CONDUCTING RETAIL AND INTERNET BUSINESS

CROSS REFERENCE TO RELATED APPLICATION

The present Patent Application is a Continuation-In-Part of U.S. patent application Ser. No. 09/523,341, filed by the present inventor on Mar. 10, 2000, which was entitled "Article of Foowear Having a Spring Element and Selectively Removable Components" now U.S. Pat. No. 6,449,878.

FIELD OF THE INVENTION

The present invention teaches an article of footwear including means for adjusting the foot shape, width, and girth. Further, the present invention teaches an article of footwear including a spring element, and selectively removable and renewable components. Moreover, the present invention teaches a novel method of manufacturing articles of footwear, and also, a novel way of doing both retail and Internet business.

BACKGROUND OF THE INVENTION

The present invention teaches an article of footwear including means for adjusting the foot shape, width, and girth. Lasting boards having different configurations and alternate positions for selectively affixing various portions of an upper can be used to adjust and customize the fit of an article of footwear for an individual wearer. The lasting board can also comprise a spring element which can provide improved cushioning, stability, running economy, and a long service life. Unlike the conventional foam materials presently being used by the footwear industry, the spring element is not substantially subject to compression set degradation and can provide a relatively long service life. The components of the article of footwear including the upper, insole, lasting board or spring element, and sole including possible midsole and outsole portions can be selected from a range of options, and can be easily removed and replaced, as desired. Further, the relative configuration and functional relationship as between the forefoot, midfoot and rearfoot areas of the article of footwear can be readily modified and adjusted. Accordingly, the article of footwear can be customized by a wearer or specially configured for a select target population in order to optimize desired performance criteria. Moreover, the present invention teaches a novel method of manufacturing an article of footwear, and also, a novel way of doing both retail and Internet business.

Conventional athletic footwear typically include an outsole made of a rubber compound which is affixed by adhesive to a midsole made of ethylene vinyl acetate or polyurethane foam material which is in turn affixed by adhesive to an upper which is constructed with the use of stitching and adhesives. Because of the difficulty, time, and expense associated with renewing any portion of conventional articles of footwear, the vast majority are generally discarded at the end of their service life. This service life can be characterized as having a short duration when the wearer frequently engages in athletic activity such as distance running or tennis. In tennis, portions of the outsole can be substantially abraded within a few hours, and in distance running the foam midsole can become compacted and degrade by taking a compression set within one hundred miles of use. The resulting deformation of the foam midsole can degrade cushioning, footwear stability, and contribute to athletic injuries. Accordingly, many competitive distance runners who routinely cover one hundred miles in a week's time will discard their athletic footwear after logging three hundred miles in order to avoid possible injury.

Even though the service life of conventional athletic footwear is relatively short, the price of athletic footwear has steadily increased over the last three decades, and some models now bear retail prices over one hundred and twenty dollars. However, some of this increase in retail prices has been design and fashion driven as opposed to reflecting actual value added, thus some individuals believe that the best values on functional athletic footwear can be found in the price range of fifty to eighty dollars. In any case, conventional athletic footwear remain disposable commodities and few are being recycled. The method of manufacture and disposal of conventional athletic footwear is therefore relatively inefficient and not environmentally friendly.

In contrast with conventional athletic footwear, the present invention teaches an article of footwear that includes spring elements which do not take a compression set or similarly degrade, thus the physical and mechanical properties afforded by a preferred article of footwear remain substantially the same over a useful service life which can be several times longer than that of conventional articles of footwear. The present invention teaches an article of footwear which represents an investment, as opposed to a disposable commodity. Like an automobile, the preferred article of footwear includes components which can be easily renewed and replaced, but also components which can be varied and customized, as desired.

Prior art examples devices and means for selectively and removably affixing various components of an article of footwear include, e.g., U.S. Pat. Nos. 2,183,277, 2,200,080, 2,220,534, 2,552,943, 2,588,061, 2,640,283, 2,873,540, 3,012,340, 3,818,617, 3,878,626, 3,906,646, 3,982,336, 4,103,440, 4,107,857, 4,132,016, 4,262,434, 4,267,650, 4,279,083, 4,300,294, 4,317,294, 4,351,120, 4,377,042, 4,535,554, 4,606,139, 4,807,372, 4,887,369, 5,083,385, 5,317,822, 5,339,544, 5,410,821, 5,533,280, 5,542,198, 5,615,497, 5,628,129, 5,644,857, 5,657,558, 5,661,915, 5,826,352, and 5,896,608, all of these patents hereby being incorporated by reference herein.

Conventional athletic footwear cannot be substantially customized for use by the consumer or wearer. The physical and mechanical properties of conventional athletic footwear are relatively fixed generic qualities. However, the body weight or mass and characteristic running technique of different individuals having the same footwear size can vary greatly. Often, the stiffness in compression of the foam material used in the midsole of athletic shoes can be too soft for individuals who employ more forceful movements, or who have greater body mass than an average wearer. Accordingly, conventional articles of athletic footwear do not provide optimal performance characteristics for individual wearers.

In contrast, the present invention permits a wearer to customize a preferred article of footwear. For example, the length, width, girth, and configuration of the upper, as provided by various last options or by two or three dimensional modeling and footwear design equipment including computer software, or by two, three, or four dimensional measurement devices such as scanners, as well as the type of footwear construction and design of the upper can be selected by the consumer or wearer. Further, the physical and mechanical properties of the article of footwear can be selected and changed as desired in order to optimize desired performance characteristics given various performance criteria or environmental conditions. For example, the configuration and geometry of the article of footwear, and the stiffness of the spring elements can be customized, as desired. In addition, the ability to easily remove, renew, and recycle the outsole portions of the preferred article of footwear renders the use of softer materials having enhanced shock and vibration dampening characteristics, but perhaps diminished wear properties viable from a practical standpoint. Moreover, the outsole portion of the preferred article of footwear can be selected from a variety of options with regards to configuration, materials, and function.

The physical and mechanical properties associated with an article of footwear of the present invention can provide enhanced cushioning, stability, and running economy relative to conventional articles of footwear. The spring to dampening ratio of conventional articles of footwear is commonly in the range between 40–60 percent, whereas the preferred article of footwear can provide a higher spring to dampening ratio, thus greater mechanical efficiency and running economy. The preferred article of footwear can include an anterior spring element that underlies the forefoot area which can store energy during the latter portion of the stance phase and early portion of the propulsive phase of the running cycle, and then release this energy during the latter portion of the propulsive phase, thus facilitating improved running economy. It is believed that the resulting improvement in running performance can approximate one second over four hundred meters, or two to three percent.

The preferred article of footwear can provide differential stiffness in the rearfoot area so as to reduce both the rate and magnitude of pronation, or alternately, the rate and magnitude of supination experienced by an individual wearer, thus avoid conditions which can be associated with injury. Likewise, the preferred article of footwear can provide differential stiffness in the midfoot and forefoot areas so as to reduce both the rate and magnitude of inward and/or outward rotation of the foot, thus avoid conditions which can be associated with injury. The preferred spring elements can also provide a stable platform which can prevent or reduce the amount of deformation caused by point loads, thus avoid conditions which can be associated with injury.

Again, the viability of using relatively soft outsole materials having improved shock and vibration dampening characteristics can enhance cushioning effects. Further, in conventional articles of footwear, the shock and vibration generated during rearfoot impact is commonly transmitted most rapidly to a wearer through that portion of the outsole and midsole which has greatest stiffness, and normally, this is a portion of the sole proximate the heel of the wearer which undergoes the greatest deflection and deformation. However, in the present invention a void space exists beneath the heel of a wearer and the ground engaging portion of the outsole. Some of the shock and vibration generated during the rearfoot impact of an outsole with the ground support surface must then travel a greater distance through the outsole and inferior spring element in order to be transmitted to the superior spring element and a wearer. In addition, in the present invention, a posterior spacer which can serve as a shock and vibration isolator, and also vibration decay time modifiers can be used to decrease the magnitude of the shock and vibration transmitted to the wearer of a preferred article of footwear.

There have been many attempts in the prior art to introduce functional spring elements into articles of footwear including, but not limited to U.S. Pat. Nos. 357,062, 1,107,894, 1,113,266, 1,352,865, 1,370,212, 2,447,603, 2,508,318, 4,429,474, 4,492,046, 4,314,413, 4,486,964, 4,506,460, 4,566,206, 4,771,554, 4,854,057, 4,878,300, 4,942,677, 5,052,130, 5,060,401, 5,138,776, 5,159,767, 5,203,095, 5,279,051, 5,337,492, 5,343,639, 5,353,523, 5,367,790, 5,381,608, 5,437,110, 5,461,800, 5,596,819, 5,701,686, 5,822,886, 5,875,567, 5,937,544, 6,029,374, French Patent 472,735, Italian Patent 633,409, European Patent Application EP 0 890 321 A2, and PCT Patent Application WO 98/07341, all of these patents and patent applications hereby being incorporated by reference herein. Relatively few of these attempts have resulted in functional articles of footwear which have met with commercial success. The limitations of some of the prior art has concerned the difficulty of meeting the potentially competing criteria associated with cushioning and footwear stability. In other cases, the manufacturing costs of making prior art articles of footwear including spring elements have proved prohibitive.

The spring element and various other novel structures taught in the present invention can be used in a wide assortment of articles of footwear including but not limited to those used for running, basketball, tennis, volleyball, but also sandals and hiking boots. The present invention teaches an article of footwear which can provide a wearer with improved cushioning and stability, running economy, and an extended service life while reducing the risks of injury normally associated with footwear degradation. The preferred article of footwear provides a wearer with the ability to customize the fit, but also the physical and mechanical properties and performance of the article of footwear. Moreover, the preferred article of footwear is economical and environmentally friendly to both manufacture and recycle.

The present invention also teaches articles of footwear including means for adjusting the foot shape, width, and girth. Lasting boards having different configurations and/or alternate positions for selectively affixing various portions of an upper can be used to adjust and customize the fit of an article of footwear for an individual wearer. The upper can also include means for adjusting the width, girth, and foot shape in functional relation to a lasting board. The lasting board can also constitute and serve as a spring element and vice-versa. Alternately, the lasting board and spring element can consist of separate parts. The components of the article of footwear including but not limited to the upper, insole, lasting board, spring element, and sole including possible midsole and outsole portions can be selected from a range of options, and can be easily removed and replaced, as desired. Further, the relative configuration and functional relationship as between the forefoot, midfoot and rearfoot areas of the article of footwear can be readily modified and adjusted. Accordingly, the article of footwear can be configured and customized for a wearer or a select target population in order to optimize performance criteria, as desired.

Moreover, the present invention teaches a novel method of manufacturing articles of footwear, and also, a novel way of doing both retail and Internet business. For example, the anatomical features, configuration, and dimensions of a given wearer's foot and any other special needs, requirements, or preferences can be recorded by direct communication, observation and measurement in a retail or medical setting, or by a wearer or other individual within their home or other remote site, and this data can be used to generate information and intelligence relating to the manufacture of a custom article of footwear. Conventional measuring or reproduction means such as rulers, measuring tapes, Brannock devices, two or three dimensional scanners, pressure sensors, infrared thermography, stereolithography, photographs, photocopies, FAX, e-mail, cameras, images, tracings, video, television, computers and computer screens, templates, molds, models, and patterns can be used to help determine and make selections relating to an individual's foot shape, length, width, girth, and the like. Given an adequate and ready stock of the various components anticipated for use in making the preferred articles of footwear, and the information and intelligence created from the data relating to an individual wearer or target population, a worker and/or automated system can assemble or manufacture a customized article of footwear within a few minutes. This can be accomplished at the point of purchase or service center which can be located in a retail or medical facility, or alternatively, at a remote manufacturing environment.

Accordingly, similar to the rapid delivery eyewear service centers and retail stores which presently exist, a consumer can now also be provided with a custom article of footwear within minutes. Alternately, if and when an individual's data is received from a remote site at the Website or other address of a company which practices the present invention, and then transmitted to a manufacturing or assembly center, a custom article of footwear can be made and possibly delivered to an individual's home or other designated address by same day or overnight service, as desired.

SUMMARY OF THE INVENTION

A preferred article of footwear has an anterior side, posterior side, medial side, lateral side, superior side, inferior side, and a longitudinal axis, and includes an upper, a lasting board, and a sole. The sole can comprise a midsole and an outsole, or merely an outsole. The superior surface of the lasting board can include an insole. Alternately, a separate insole can be included within the upper. The upper, lasting board, and sole can be removably affixed in functional relation with the use of mechanical engagement means. The lasting board can comprise a spring element, and a spring element can comprise a lasting board. Alternately, the lasting board and spring element can consist of separate parts. In the latter case, the upper, lasting board, spring element and sole can be removably affixed in functional relation with the use of mechanical engagement means. The mechanical engagement means can comprise a plurality of fasteners including male and female parts.

The spring element can include a superior spring element, and an inferior spring element. The inferior spring element is affixed in function relation to the superior spring element and projects rearward and downward therefrom, and has an flexural axis deviated from the transverse axis in the range between 10 and 50 degrees. It can be advantageous for the flexural axis to be deviated from the transverse axis in the range between 10 and 30 degrees in articles of footwear intended for walking, or for use by runners who tend to supinate during the braking and stance phases of the running cycle, and in the range between 30 and 50 degrees for runners who tend to pronate during the braking and stance phases of the running cycle. Accordingly, posterior of the flexural axis, the anterior to posterior lengths of the superior spring element and the inferior spring element can be shorter on the medial side than on the lateral side.

The preferred article of footwear includes a spring element having a superior spring element which can have a configuration substantially corresponding to the last bottom of the article of footwear, and an inferior spring element. The superior spring element can consist of a single component, or can consist of two portions, an anterior spring element and a posterior spring element which are affixed together in functional relation. In an alternate embodiment, the anterior spring element and inferior spring element can consist of a single component, or alternately, can be affixed together in functional relation, and the posterior spring element can be affixed in functional relation thereto. Further, it can be readily understood that an equivalent spring element can be formed as a single part, or in four parts. In another alternate embodiment, the article of footwear further includes a separate lasting board, and the spring element, lasting board, upper, and sole can be affixed together in functional relation.

The superior spring element can be positioned in functional relation within the upper and the sole can be positioned inferior to the upper, and a plurality of fasteners can be used for affixing the superior spring element to the sole, thus trapping and securing the upper in functional relation therebetween. Further, a plurality of fasteners can be used to selectively affix the superior spring element in functional relation to the upper and the inferior spring element. The plurality of fasteners can include male and female parts, and the male parts can be affixed to the lasting board or superior spring element. The upper can further include a sleeve for affixing at least a portion of the superior spring element in function relation thereto.

The superior spring element and inferior spring element can be configured or affixed in functional relation to form a v-shape in the rearfoot area of an article of footwear and provide deflection in the range between 8–15 mm, and in particular, approximately 10 mm. At the posterior side, the v-shaped spring element can exhibit less stiffness in compression on the lateral side relative to the medial side, and it can be advantageous that the differential stiffness be in the range between two-to-three to one.

The superior spring element can have a thickness in the range between 1.0 and 3.5 mm. The superior spring element can include an anterior spring element having a thickness in the range between 1.0–2.0 mm, and a posterior spring element having a thickness in the range between 2.0 and 3.5 mm. The inferior spring element can have a thickness in the range between 2.0 and 3.5 mm.

The posterior spring element can further include a projection, and the anterior spring element and posterior spring element can be affixed by at least three fasteners in triangulation.

The superior spring element can be generally planar, or alternately can be curved to mate with the anatomy of a wearer and can further include elevated portions such as a side stabilizer or a heel counter.

The spring element can be made of a fiber composite material, or alternately, a thermoplastic material, or a metal material. The spring element can include areas having different thickness, notches, slits, or openings which serve to produce differential stiffness when the spring element is loaded. The spring element can include different types, orientations, configurations, and numbers of composite layers, and in different areas, in order to achieve differential stiffness when the spring element is loaded. Accordingly, the flexural modulus or stiffness exhibited by a spring element in the rearfoot, midfoot, and forefoot areas, and about any axis can be engineered, as desired.

The article of footwear can include a selectively removable sole. A sole can include a midsole and an outsole, or merely an outsole. The outsole can include an anterior outsole element and posterior outsole element. Alternately, the outsole can consist of a single component, or a three part component including an anterior outsole element, a middle outsole element and a posterior outsole element. The outsole can include a backing, a tread or ground engaging surface, and lines of flexion. The article of footwear can include a rocker sole configuration. The article of footwear can further include a spring guard for protecting the posterior aspect of the mating portions of the superior spring element or posterior spring element and the inferior spring element.

The article of footwear can further include an anterior spacer positioned between the anterior spring element and the posterior spring element for dampening shock and vibration. The anterior spacer can have a wedge shape which can be used to modify the configuration and performance of the article of footwear.

The article of footwear can further include a posterior spacer positioned between the superior spring element or posterior spring element and the inferior spring element for dampening shock and vibration. The posterior spacer can have a wedge shape which can be used to modify the configuration and performance of the article of footwear.

The article of footwear can further include a vibration decay time modifier. The vibration decay time modifiers can include a head and a stem. The head of the vibration decay time modifiers can be dimensioned and configured for vibration substantially free of contact with the base of the posterior spacer or spring element in directions which substantially encompass a 360 degree arc and normal to the longitudinal axis of the stem.

A preferred article of footwear can include an anterior side, posterior side, medial side, lateral side, superior side, inferior side, and a longitudinal axis, and an upper affixed in functional relation to a spring element comprising an anterior spring element, a posterior spring element, and an inferior spring element. The anterior spring element can be affixed in functional relation to the posterior spring element, and a substantial portion of the anterior spring element can extend anterior of a position associated with 70 percent of the length of the upper as measured from the posterior side. The inferior spring element can be affixed in function relation to the posterior spring element, and a substantial portion of the inferior spring element can extend posterior of a position associated with 50 percent of the length of the upper as measured from the posterior side.

In an alternate embodiment of an article of footwear, the spring element can consist of a superior spring element which can include an anterior spring element and a posterior spring element affixed together in functional relation, but not include an inferior spring element projecting rearward and downward therefrom.

The ability to easily customize and adapt the preferred article of footwear in a desired manner can render the present invention suitable for use in walking, running, hiking, and a variety of other athletic activities including tennis, basketball, baseball, football, soccer, volleyball, bicycling, and in-line skating.

An alternate preferred article of footwear can have an anterior side, a posterior side, a medial side, a lateral side, superior side, inferior side, and a longitudinal axis, and a plurality of fasteners. The upper can include a plurality of alternate openings on the inferior side at a plurality of different positions, and the alternate openings can be offset by a distance corresponding to a change in one standard width size and configured for receiving the plurality of fasteners. A lasting board can be positioned within the upper, and the lasting board and upper can be being removably affixed in functional relation to a sole by the plurality of fasteners, thereby securing the upper in functional relation therebetween. Different lasting boards can comprise different configurations for accommodating different foot shapes, foot lengths, and foot width sizes. Lasting boards for a given foot shape and foot length or standard size article of footwear, can be made in various standard size widths.

The plurality of fasteners can include male and female parts, and the male parts can be affixed in functional relation to the lasting board. Alternately, the female parts can be affixed in functional relation to the lasting board, or the male or female parts can be affixed in function relation to the sole, or the plurality of fasteners including male and female parts can consist of loose parts.

Further, the lasting board can include a plurality of openings. The plurality of openings in the lasting board can comprise a plurality of alternate openings offset by a distance corresponding to a change in one standard width size at a plurality of different positions. In addition, the plurality of alternate openings on the inferior side of the upper can comprise two alternate openings, or three alternate openings.

The lasting board can comprise a spring element, and a spring element can comprise a lasting board. Alternately, a lasting board and spring element can consist of separate parts. The spring element can comprise a superior spring element positioned within the upper. The superior spring element can include an anterior spring element and a posterior spring element affixed together in functional relation. The anterior spring element can include a medial anterior spring element and a lateral anterior spring element. The spring element can also include an inferior spring element substantially positioned inferior and externally with respect to the upper which is affixed in functional relation to the posterior spring element. The anterior spring element including the medial anterior spring element and lateral anterior spring element can consist of two separate parts that are removably affixed in functional relation to the posterior spring element.

The present invention teaches a method of making an article of footwear comprising the following steps:
 a) Collecting data relating to a wearer's preferences and the anatomical features and measurements of the wearer's foot;
 b) Creating information and intelligence for selecting and making an article of footwear for the wearer;
 c) Selecting a foot length;
 d) Selecting a last bottom configuration;
 e) Selecting a foot width;
 f) Selecting girth dimensions at a plurality of positions;
 g) Selecting an upper, sole, and lasting board which can be affixed together in functional relation to provide the selected foot length, last bottom configuration, foot width, and girth dimensions; and,
 f) Removably affixing the upper, sole, and lasting board in functional relation with the use of mechanical engagement means.

The inferior side of the upper can include a plurality of openings for receiving the mechanical engagement means which can include a plurality of fasteners having male and female parts. The upper and sole can include a plurality of openings, and the lasting board can include male parts which can be caused to pass through the plurality of openings in the upper and sole, and female parts which can be removably affixed to the male parts can be used to removably affix the upper, lasting board, and sole in functional relation. Alternately, the lasting board can include female parts, and male parts can be used to removably affix the upper, lasting board, and sole in functional relation. Alternately, the sole can include male or female parts, and the corresponding male or female parts can be used to removably affix the upper, lasting board, and sole in functional relation. Alternately, the plurality of fasteners can consist of loose parts.

The plurality of openings on the inferior side of the upper can include two alternate openings at a plurality of different positions. The two alternate openings can be offset by a distance corresponding to a change in one standard width size and configured for receiving the plurality of fasteners, whereby the girth of the upper can be selected at the plurality of positions during assembly. Alternately, the plurality of openings on the inferior side of the upper can include three alternate openings at a plurality of different positions, each of the three alternate openings being offset by a distance corresponding to a change in one standard width size and configured for receiving the plurality of fasteners, whereby the girth of the upper can be selected at the plurality of positions during assembly.

For any given foot shape and standard size foot length, the lasting board can be made in different standard size foot widths. In the American sizing system, foot length can vary by ⅓ inch per standard size, and foot width will vary by ¼ inch per standard size, but other sizing systems can be used. The lasting board can also include a plurality of alternate openings at a plurality of different positions. The plurality of openings can be offset by a distance corresponding to a change in one standard width size and configured for receiving the plurality of fasteners, whereby the girth of the upper can be selected at the plurality of positions during assembly. Further, when a lasting board consists of two or more parts, an anterior element and a posterior element, e.g., a spring element including an anterior spring element and a posterior spring element, a plurality of openings can be included in the anterior spring element and posterior spring element which can be offset by a distance corresponding to a change in one half or one whole standard length size and the two parts can be affixed in functional relation with the use of fasteners or other conventional means to provide a desired size length.

The present invention also teaches a method of conducting business including making and selling an article of footwear including the following steps:

a) Collecting data relating to a wearer's preferences and the anatomical features and measurements of the wearer's foot, and initiating or completing a financial transaction, thus selling an article of footwear;

b) Creating information and intelligence for making an article of footwear for the wearer;

c) Providing the information and intelligence to a physical location at which the article of footwear can be made;

d) Selecting a foot length;

e) Selecting a last bottom configuration;

f) Selecting a foot width;

g) Selecting girth dimensions at a plurality of positions;

h) Selecting an upper, sole, and lasting board, which can be removably affixed together in functional relation to provide the foot length, last bottom configuration, foot width, and girth dimensions at the plurality of positions;

i) Removably affixing the upper, sole, and lasting board in functional relation with the use of mechanical engagement means, and completing the manufacture of the article of footwear; and, j) Causing the article of footwear to be delivered to a designated address.

The physical location can be a retail store and the manufacture of the article of footwear can be completed within thirty minutes. Alternately, the physical location can be a medical facility. Alternately, the physical location can be a manufacturing center for making the article of footwear, and the data relating to the wearer's preferences and the anatomical features and measurements of the wearer's foot can be transmitted from a remote site, and the article of footwear can be caused to be delivered from the manufacturing center to a designated address. The data can be transmitted electronically by means including but not limited to the Internet, telephone and Fax.

In the continental United States, and possibly within many other host countries in which the novel method of making an article of footwear and conducting business would be practiced, an article of footwear can be caused to be delivered to a designated address within a selected number of working days. For example, the article of footwear can sometimes be delivered the same day, the next day, or within a different selected number of working days, as desired.

BRIEF DESCRIPTION OF THE DRAWING FIGURES

FIG. 7 is a top view of a two part lasting board or spring element in the article of footwear shown in FIG. 2, with the upper shown in dashed lines.

FIG. 8 is a top view of a two part lasting board or spring element in an article of footwear generally similar to that shown in FIG. 2, but having a relatively more curve lasted upper shown in dashed lines.

FIG. 9 is a bottom view of the article of footwear shown in FIG. 3, with the outsole elements being removed to reveal the anterior spring element, posterior spring element and inferior spring element.

FIG. 13 is a medial side view of an alternate article of footwear generally similar to that shown FIG. 12, with parts broken away, but having a forefoot area including a detachable outsole and foam midsole.

FIG. 14 is a medial side view of an alternate article of footwear generally similar to that shown in FIG. 4, with parts broken away, further including a spring guard, and also a rocker sole configuration.

FIG. 15 is a medial side view of an alternate article of footwear generally similar to that shown in FIG. 4, with parts broken away, having a upper including a sleeve for accommodating a lasting board or spring element.

FIG. 30 is a bottom view of the inferior side of the upper of an article of footwear showing a lasting board or anterior spring element having a plurality of openings.

FIG. 31 is a bottom view of the inferior side of the upper of an article of footwear showing a plurality of adjacent openings at different positions.

DETAILED DESCRIPTION OF THE PREFERRED EMBODIMENTS

The present invention teaches an article of footwear including means for adjusting the foot shape, width, and girth. Lasting boards having different configurations and alternate positions for selectively affixing various portions of an upper can be used to adjust and customize the fit of an article of footwear for an individual wearer. The lasting board can also comprise a spring element which can provide improved cushioning, stability, running economy, and a long service life. Unlike the conventional foam materials presently being used by the footwear industry, the spring element is not substantially subject to compression set degradation and can provide a relatively long service life. The components of the article of footwear including the upper, insole, lasting board or spring element, and sole including possible midsole and outsole portions can be selected from a range of options, and can be easily removed and replaced, as desired. Further, the relative configuration and functional relationship as between the forefoot, midfoot and rearfoot areas of the article of footwear can be readily modified and adjusted. Accordingly, the article of footwear can be customized by a wearer or specially configured for a select target population in order to optimize desired performance criteria. Moreover, the present invention teaches a novel method of manufacturing an article of footwear, and also, a novel way of doing both retail and Internet business.

Figure 1:
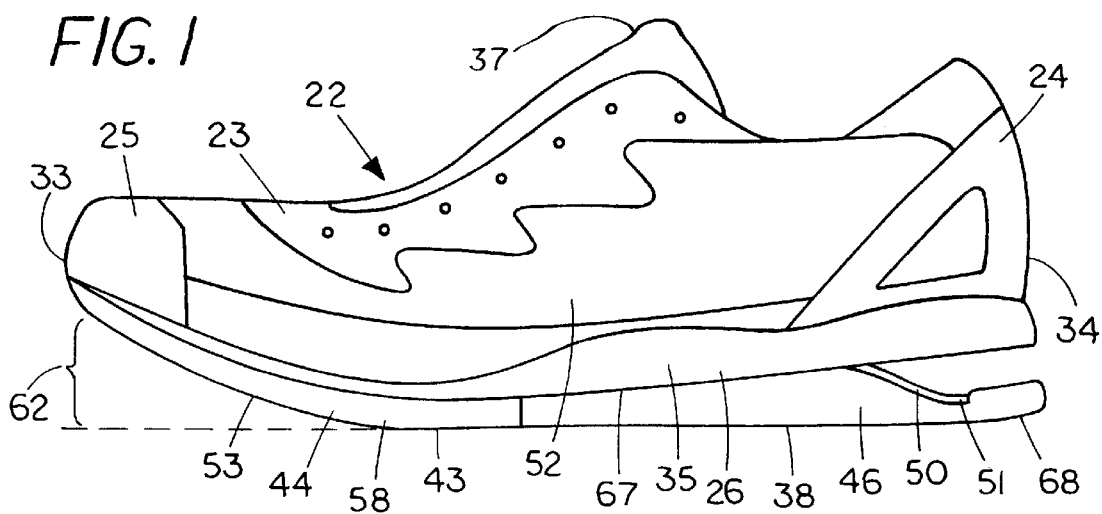
FIG. 1 is a medial side view of an article of footwear including a lasting board or spring element according to the present invention.
Figure 4:
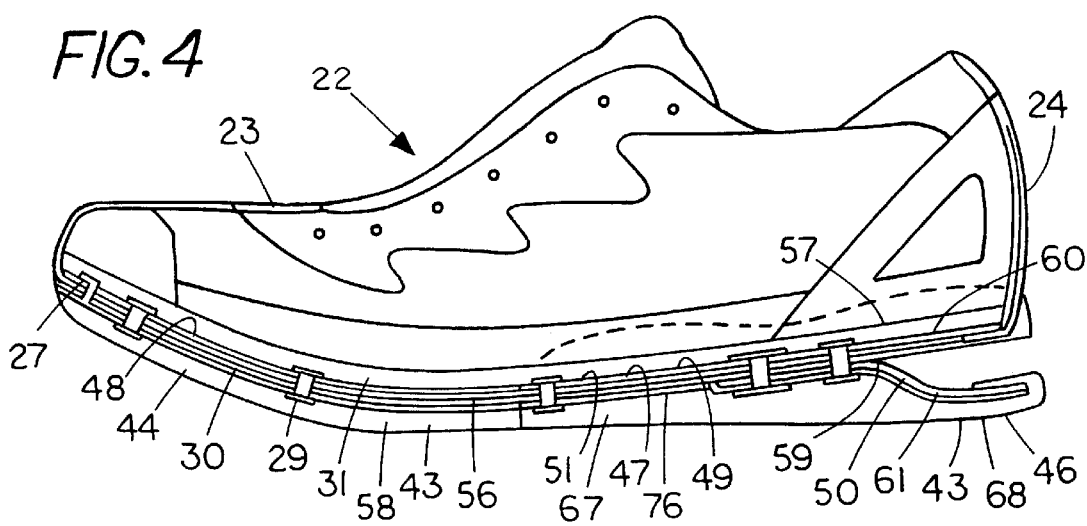
FIG. 4 is a medial side view of the article of footwear shown in FIG. 1, with parts broken away.

FIG. 1 is a medial side view of an article of footwear 22 including a spring element 51 consisting of at least two portions, a superior spring element 47 and an inferior spring element 50. The portions of spring element 51 can be integrally formed in a single component, but can be formed in at least two parts which can be affixed together by adhesives. Preferably, the lasting board 79 or superior spring element 47 is removably affixed in functional relation to the inferior spring element 50, upper 23, and sole 32 possibly including an outsole 43 and midsole 26 by mechanical engagement means such as fasteners 29. Threaded nuts and bolts, rivets, pop-rivets, snaps, hooks, clips, mating male and female parts, and the like, can be used as fasteners 29. The fasteners 29 can be made, e.g., of metal, ceramic, thermoplastic, or thermoset materials. When a thermoplastic or thermoset material is used, a fastener 29 can be formed or affixed in position with the use of heat, and pressure, welding, adhesive, polymerization or vulcanization, and can later be removed by destructive method or again with the use of heat and pressure. For example, the distal end of the male part of a fastener 29 can be melted and formed into a rivet like shape with the use of heat and pressure. Contact adhesives and light cure adhesives can also be used to create or affix a fastener 29. Preferably, the fasteners 29 are selectively removable and also renewable, thus enable various portions of the spring element 51 and article of footwear 22 to be removed and replaced, as desired. Threaded fasteners 29 can include Allen head or star drive mechanical mating configurations for use with a like tool, and the fasteners 29 can be torque limited to tighten to an appropriate and desired torque value. Again, it can be readily understood that other conventional means can be used to affix the upper 23 in functional relation to the spring element 51 and outsole 43, such as VELCRO® hook and pile, or other mechanical engagement means and devices. For example, as shown in FIG. 4, a portion of the posterior outsole element 46 can slip over and trap a portion of the inferior spring element 50 and then be secured with fasteners 29. Further at least one hook 27 can extend from the backing 30 of anterior outsole element 44 and engage a portion of the upper 23 or the superior spring element 47 as a portion of the outsole 43 is attached to a preferred article of footwear 22. Again, prior art examples of means for selectively and removably affixing various components of an article of footwear include, e.g., U.S. Pat. Nos. 2,183,277, 2,200,080, 2,220,534, 2,552,943, 2,588,061, 2,640,283, 2,873,540, 3,012,340, 3,818,617, 3,878,626, 3,906,646, 3,982,336, 4,103,440, 4,107,857, 4,132,016, 4,262,434, 4,267,650, 4,279,083, 4,300,294, 4,317,294, 4,351,120, 4,377,042, 4,535,554, 4,606,139, 4,807,372, 4,887,369, 5,083,385, 5,317,822, 5,339,544, 5,410,821, 5,533,280, 5,542,198, 5,615,497, 5,628,129, 5,644,857, 5,657,558, 5,661,915, 5,826,352, and 5,896,608, all of these patents being previously incorporated by reference herein.

Also shown in FIG. 1 is an upper 23 including a heel counter 24, tip 25, vamp 52, anterior side 33, posterior side 34, medial side 35, top or superior side 37, bottom or inferior side 38, forefoot area 58, midfoot area 67, rearfoot area 68, midsole 26, a spring element 51 including an inferior spring element 50, an outsole 43 including an anterior outsole element 44 and posterior outsole element 46 having a tread or ground engaging surface 53, and the presence of toe spring 62. The upper 23 can be made of a plurality of conventional materials known in the footwear art such as leather, natural or synthetic textile materials, paper or cardboard, stitching, adhesive, thermoplastic material, foam material, and natural or synthetic rubber. Since the various components of a preferred article of footwear 22 can be easily removed and replaced, a wearer can select a custom upper 23 having a desired size, shape, design, construction and functional capability. The article of footwear 22 can also include means for customizing the shape, width, and fit of the upper such as taught in U.S. Pat. Nos. 5,729,912, 5,813,146, and the like. Further, the present invention teaches novel devices and methods for customizing the width, girth, and last or foot shape of the preferred article of footwear, as discussed in greater detail below. Moreover, the article of footwear 22 can include a custom insole, but also a custom upper using light cure material as taught in the applicant's U.S. Pat. No. 5,632,057, hereby incorporated by reference herein.

As shown in FIG. 4, the anterior outsole element 44 and posterior outsole element 46 can include a backing 30 portion. The outsole 43 can be firmly secured in function relation to the upper 23 and lasting board 79 or spring element 51 with the use of a plurality of fasteners 29. In an alternate embodiment, it is possible to configure the posterior outsole portion 46 such that a portion can slip over and trap the posterior side of the inferior spring element 50, and the posterior outsole element 46 can then be secured with fasteners 29 near the anterior side of the posterior outsole element 46 and inferior spring element 50. Since the posterior outsole element 46 consists of a resilient elastomer such as natural or synthetic rubber, during footstrike and the early portion of the braking phase of the gait cycle, the posterior outsole element 46 can become somewhat elongated and distended along the longitudinal or anterior to posterior axis and to lesser degree the medial to lateral or transverse axis, and this can further contribute to reducing the shock and vibration which is generated upon impact, as the forces and direction of loading during footstrike and the braking phase have not only vertical or z axis, but also x and y axis components.

The ground engaging portion 53 of the outsole 43 can be made of a natural or synthetic rubber material such as nitrile or styrene butadiene rubber, a thermoplastic material an elastomer such as polyurethane, or a hybrid thermoplastic rubber. Further, these materials can possibly be suitable for use when blown or foamed. Suitable hybrid thermoplastic and rubber combinations include dynamically vulcanized alloys which can be injection molded such as those produced by Advanced Elastomer Systems, 338 Main Street, Akron, Ohio 44311, e.g., SANTOPRENE®, VYRAM®, GEOLAST®, TREFSIN®, VISTAFLEX®, GEOLAST®, DYTROL XL®, and taught in the following U.S. Pat. Nos. 5,783,631, 5,779,968, 5,777,033, 5,777,029, 5,750,625, 5,672,660, 5,609,962, 5,591,798, 5,589,544, 5,574,105, 5,523,350, 5,403,892, 5,397,839, 5,397,832, 5,349,005, 5,300,573, 5,290,886, 5,177,147, 5,157,081, 5,100,947, 5,086,121, 5,081,179, 5,073,597, 5,070,111, 5,051,478, 5,051,477, 5,028,662, and U.S. Pat. No. RE 035398. SANTOPRENE® is known to consist of a combination of butyl rubber and ethylene-propylene. The backing 30 portion of the outsole 43 can be made of a formulation of a thermoplastic material such as nylon, polyurethane, or SANTOPRENE® that is relatively firm relative to the ground engaging portion 53 of the outsole 43. For example, a polyurethane or SANTOPRENE® material having a hardness between 35–75 Durometer Asker C could be used on the ground engaging portion 53 of the outsole 43, and a polyurethane or SANTOPRENE® material having a hardness between 75–100 Durometer on the Shore A or D scales could be used to make the backing 30 of outsole 43. A polyurethane backing 30 can be bonded to a polyurethane ground engaging portion 53 of outsole 43 or other material, or alternately, a SANTOPRENE® backing can be bonded to a SANTOPRENE® ground engaging portion 53 of outsole 43. This can be accomplished by dual injection molding, or over-molding of the like materials. One advantage when using homogenous materials for the two portions of the outsole 43 concerns the affinity of like materials for effectively bonding together.

Another advantage in using homogenous materials for the two portions of the outsole 43 concerns the "green" or environmentally friendly and recyclable nature of the component at the end of its service life. It is possible for the spent homogenous outsole 43 component including the backing 30 and ground engaging portion 53 to be recycled by the footwear manufacturer or by a third party, e.g., the outsole 43 can be re-ground into pieces and be thermoformed to make a portion of a new outsole 43 component. Further, the relative absence of adhesives in the manufacture of the outsole components and article of footwear taught in the present invention also makes for a "green" or environmentally friendly product. In contrast, conventional articles of footwear are commonly manufactured with the extensive use of adhesives for bonding a foam midsole to an upper and outsole. These adhesives are commonly non-environmentally friendly and can pose health hazards, and the resulting article of footwear cannot be so easily disassembled or recycled at the end of its service life. Moreover, the process associated with making conventional foam materials in making a midsole, and the blowing agents used therein, can be non-environmentally friendly and relatively energy inefficient as compared with conventional injection molding of thermoplastic materials, or the use of light cure materials and methods, as taught in the applicant's co-pending U.S. patent application Ser. No. 08/862,598 entitled "Method of Making a Light Cure Component For Articles of Footwear," hereby incorporated by reference herein. For example, instead of using large presses imparting both heat and pressure upon compression molds for effecting the cure of a midsole or outsole component over perhaps a seven minute cycle time, injection molding equipment and light cure technology can be used to reduce the cycle times to perhaps fractions of a second with relative energy efficiency and little or no waste product in a relatively environmentally friendly manufacturing environment. Accordingly, manufacturing can be located in the United States, or otherwise closer to the intended market.

Figure 16:
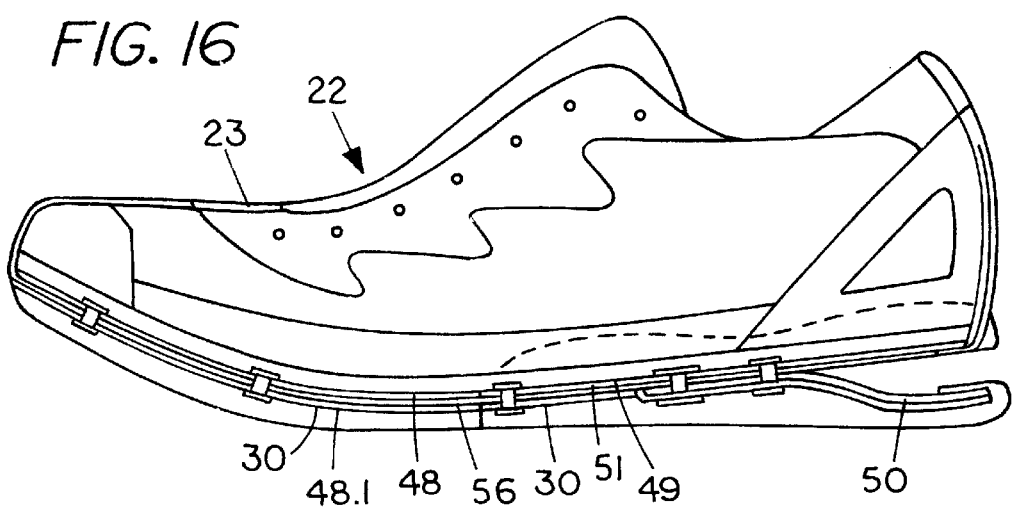
FIG. 16 is a medial side view of an alternate article of footwear generally similar to that shown in FIG. 4, with parts broken away, having fewer layers underlying the superior spring element.

It is also possible for heterogeneous materials to be used in making the backing 30 and ground engaging portion 53 of the outsole 43. For example, Advanced Elastomer Systems has developed a formulation of SANTOPRENE® which is capable of bonding to nylon. See also U.S. Pat. Nos. 5,709,954, 5,786,057, 5,843,268, and 5,906,872 granted to Lyden et al. and assigned to NIKE, Inc., all of these patents hereby incorporated by reference herein, which relate to chemical bonding of rubber to plastic materials in articles of footwear. Further, in an alternate embodiment of the present invention, the backing 30 can simultaneously comprise at least a portion of the spring element 51 of the article of footwear 22, as shown in FIG. 16. In addition, the outsole 43 can also include desired lines of flexion 54. The following U.S. Patents and some of the prior art recited therein contain teachings with respect to lines of flexion 54 in articles of footwear such as grooves, and the like: U.S. Pat. Nos. 5,384,973, 5,425,184, 5,625,964, 5,709,954, 5,786,057, 4,562,651, 4,837,949, and 5,024,007, all of these patents being hereby incorporated by reference herein.

The use of a relatively soft elastomeric material having good dampening characteristics on the ground engaging portion 53 of an outsole 43 can contribute to enhanced attenuation of the shock and vibration generated by impact events. Relatively soft elastomeric materials having good dampening characteristics tend to have inferior abrasion and wear characteristics, and this can pose a practical limitation on their use in conventional articles of footwear constructed with the use of adhesives having non-renewable outsoles. However, the use of relatively soft elastomeric materials having good dampening characteristics does not pose a practical problem with respect to the preferred article of footwear 22 taught in the present application since the outsole 43 can be easily renewed and replaced. Accordingly, the preferred article of footwear 22 can provide a wearer with enhanced cushioning effects relative to many conventional articles of footwear.

The spring element 51 can be made of a resilient material such as metal, and in particular spring steel, a thermoplastic material, or alternately a preferred fiber composite material. Glass fiber, aramide or KEVLAR® fiber, or carbon fiber composite materials can be used individually, or in partial or complete combination. Glass fiber composite materials are generally available at a cost of about $5.00 per pound, whereas carbon fiber materials are generally available at a cost of about $8.00–$14.00 per pound. Glass fiber composite materials generally exhibit a lower modulus of elasticity or flexural modulus, thus less stiffness in bending as compared with carbon fiber materials, but can generally withstand more severe bending without breaking. However, the higher modulus of elasticity of carbon fiber composite materials can provide greater stiffness in bending and a higher spring rate, and reduced weight relative to glass fiber composite materials exhibiting like flexural modulus. Blends or combinations of glass fiber and carbon fiber materials are commonly known as hybrid composite materials.

Carbon fiber composite materials can be impregnated or coated with thermoplastic materials or thermoset materials. The modulus of elasticity or flexural modulus of some finished thermoplastic carbon fiber composite materials can be lower than that of some thermoset carbon fiber composite materials. For example, a sample of thermoplastic carbon fiber composite material having a relatively broad weave can have a flexural modulus in the range between 10–12 Msi, and in the range between 5–6 Msi in a finished part, whereas a "standard modulus" grade of thermoset impregnated unidirectional carbon fiber composite material can have a flexural modulus in the range of 33 Msi, and in the range between 18–20 Msi in a finished part. Also available are "intermediate modulus" carbon fiber composite materials at approximately 40 Msi, and "high modulus" carbon fiber composite materials having a flexural modulus greater than 50 Msi and possibly as high as approximately 100 Msi. Accordingly, in order the achieve a desired flexural modulus, a thicker and heavier portion of thermoplastic carbon fiber composite material would normally be required relative to a thermoset impregnated unidirectional carbon fiber composite material.

Impregnated carbon fiber composite materials are commonly known as "prepreg" materials. Such materials are available in roll and sheet form and in various grades, sizes, types of fibers, and fiber configurations, but also with various resin components. Various known fiber configurations include so-called woven, plain, basket, twill, satin, uni-directional, multi-directional, and hybrids. Prepreg carbon fiber composite materials are available having various flexural modulus, and generally, the higher the modulus the more expensive is the material. A standard modulus uni-directional prepreg peel-ply carbon fiber composite material made by Structural Polymer Systems Inc., also known as Cape Composites, Inc. of San Diego, Calif. can be suitable for use. Such prepreg material can have a thickness of 0.025 mm or 0.01 inches including the peel-ply backing and 0.13 mm or 0.005 inches without. It is therefore relatively easy to predict the number of layers required in order to made a part having a known target thickness, but one must also allow for a nearly 10 percent reduction in thickness of the part due to shrinkage during the curing process. The cost of a suitable unidirectional 33 Msi thermoset standard modulus carbon fiber composite material having a weight of approximately 300 grams per square meter made or distributed by Structural Polymer Systems, Inc. is presently approximately in the range between $8.00 and $9.00 per pound, and one pound yields approximately one square meter of material.

The desired thickness of the superior spring element 47 or anterior spring element 48 in the forefoot area 58 of an article of footwear intended for use in running when using standard modulus 33 Msi thermoset uni-directional prepreg carbon fiber composite material is at least 1.0 mm and approximately 1.25 mm or 0.049 inches for an individual weighing 100–140 pounds running at slow to moderate speeds, approximately 1.50 mm or 0.059 inches for an individual weighing 140–180 pounds running at slow to moderate speeds, and 1.75 mm or 0.0685 inches for an individual weighing 180–220 pounds running at slow to moderate speeds. When running at higher speeds, e.g., on a track and field surface, individuals generally prefer a thicker and stiffer plate relative to that selected for use at slow or moderate speeds. The perceived improvement in running economy can be on the order of at least one second over four hundred meters which corresponds to approximately two to three percent improvement in athletic performance. The superior spring element 47 or anterior spring element 48 can store energy when loaded during the latter portion of the stance phase and early portion of the propulsive phase of the running cycle, and then release that energy during the latter portion of the propulsive phase. Accordingly, the anterior spring element 48 provides not only deflection for attenuating shock and vibration associated with impact events, but can also provide a relatively high level of mechanical efficiency by storing and possibly returning in excess of 70 percent of the energy imparted thereto. In contrast, most conventional prior art athletic footwear soles including foam midsoles and rubber outsoles have a spring to dampening ratio somewhere between 40–60 percent. The preferred article of footwear 22 can then afford a wearer with greater mechanical efficiency and running economy than most conventional prior art athletic footwear.

Further, unlike the conventional foam materials used in prior art articles of footwear such as ethylene vinyl acetate which can become compacted and take a compression set, the spring elements 51 used in the present invention are not substantially subject to compression set degradation due to repetitive loading. The degradation of conventional foam materials can cause injury to a wearer, as when a broken down midsole results in a wearer's foot being unnaturally placed in a supinated or pronated position as opposed to a more neutral position, or when a compacted foam midsole in the forefoot area 58 causes a wearer's metatarsals to drop out of normal orientation or to unnaturally converge. Further, the quality of cushioning provided by conventional foam materials such as ethylene vinyl acetate or polyurethane rapidly degrades as the material becomes compacted and takes a compression set. In contrast, the spring elements 51 taught in the present invention do not substantially suffer from these forms of degradation, rather provide substantially the same performance and geometric integrity after extended use as when new. Further, in the event of a fatigue or catastrophic failure of a spring element, the damaged part can simply be removed and replaced.

The desired thickness of the superior spring element 47, or posterior spring element 49 for the rearfoot area 68 of an article of footwear intended for running use when using standard modulus 33 Msi thermoset uni-directional prepreg carbon fiber composite material is approximately in the range between 2.0–4.0 mm, and in particular, at least 2.0 mm, and about 2.25 mm or 0.0885 inches for an individual weighing between 100–140 pounds, about 2.5 mm or 0.0985 inches for an individual weighing between 140–160 pounds, about 2.75 mm or 0.108 inches for an individual weighing between 160–180 pounds, about 3.0 mm or 0.118 inches for an individual weighing between 180–200 pounds, and about 3.25 mm or 0.1275 inches for an individual weighing between 200–225 pounds.

It can be advantageous for the sake of robustness that the thickness of the inferior spring element 50 be equal to, or slightly greater than that of the corresponding superior spring element 47 or posterior spring element 49 in the rearfoot area 68, as the inferior spring element 50 has a more complex curved shape and is subject to direct repetitive impact events. Accordingly, the desired thickness of the inferior spring element 50 for an article of footwear for running use when using standard modulus 33 Msi thermoset uni-directional prepreg carbon fiber material is approximately in the range between 2.0–4.0 mm, and in particular, about 2.5 mm or 0.0985 inches for an individual weighing between 100–120 pounds, 2.75 mm or 0.108 inches for an individual weighing between 120–140 pounds, 3.0 mm or 0.118 inches for an individual weighing between 140–160 pounds, 3.25 mm or 0.1275 inches for an individual weighing between 160–180 pounds, 3.5 mm or 0.138 inches for an individual weighing between 180–200 pounds, and 3.75 mm or 0.1475 inches for an individual weighing between 200–225 pounds. Different individuals can have different preferences with respect to the thickness and stiffness of various spring element components regardless of their body weight, and this can be due to their having different running styles or different habitual average running speeds. During normal walking activity the magnitude of the loads generated are commonly in the range between one to two body weights, whereas during normal running activity the magnitude of the loads generated are commonly in the range between two to three body weights. Accordingly, the flexural modulus of a spring element for use in an article of footwear primarily intended for walking can be reduced relative to an article of footwear intended for running, thus the thickness and/or stiffness of the spring element can be reduced.

When the superior spring element 47 consists of a single part, the thickness can vary and be tapered from the posterior side 34 to the anterior side 33, that is, the part can gradually become thinner moving in the direction of the anterior side 33. This can be accomplished by reducing the number of layers during the building of the part and/or with the use of compressive forces during the molding or curing process. When the superior spring element 47 consists of two parts, e.g., an anterior spring element 48 and a posterior spring element 49, the parts can be made in different thickness. Alternately, the posterior spring element 49 can be made of a higher modulus material having a given thickness, and the anterior spring element 48 can be made of a lower modulus material having the same thickness, thus the two parts can have the same thickness but nevertheless provide different and desired spring and dampening characteristics.

Alternately, the number of fiber composite layers, the type of fiber and resin composition of the layers, the inclusion of a core material, and the geometry and orientation of the layers, can be varied so as to create areas of differential stiffness in a spring element 51. For example, the inferior spring element 50 can project from the superior spring element 47 with the flexural axis 59 oriented consistent with a transverse axis, that is, at approximately 90 degrees with respect to the longitudinal axis 69 provided that the aforementioned variables concerning the fiber composite layers are suitably engineered so as to render the medial side 35 of the inferior spring element 50 approximately 2–3 times stiffer than the lateral side 36, that is, in an article of footwear intended for walking or running activity.

Figure 10:
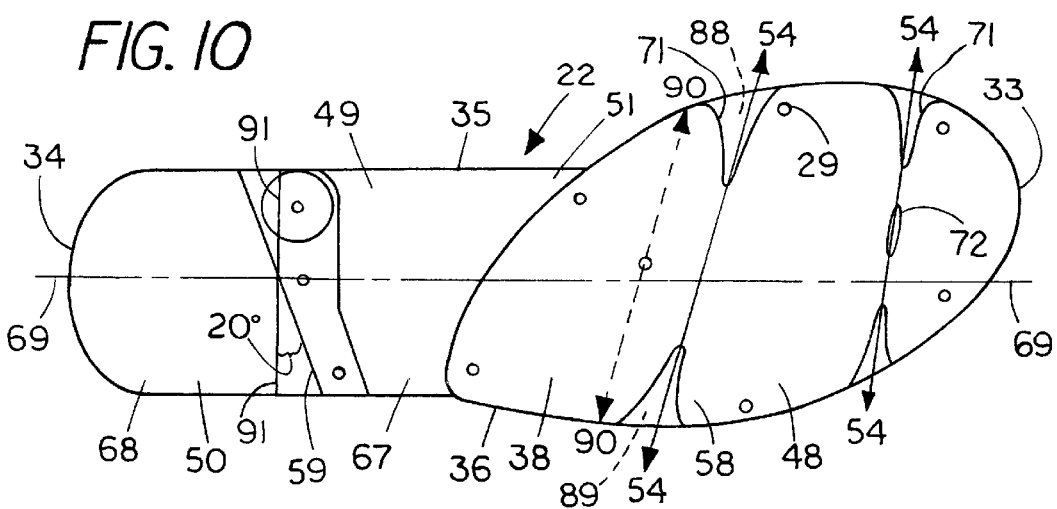
FIG. 10 is a bottom view of an alternate article of footwear generally similar to that shown in FIG. 9, with the outsole elements being removed to reveal an anterior spring element, a posterior spring element, an inferior spring element having an alternate configuration, and also a possible position of a rocker sole configuration.

Further, the configuration of a spring element 51, and in particular, an inferior spring element 50 having an flexural axis 59 orientated at approximately 90 degrees with respect to the longitudinal axis 69, can be configured so as to provide differential stiffness. For example, a portion of a spring element 51 can include transverse or longitudinal slits, notches, openings, a core material, or reduced thickness so as to exhibit areas of differential stiffness, as shown in FIG. 10. U.S. Pat. No. 5,875,567, hereby incorporated by reference herein, recites several configurations and methods for achieving differential stiffness in the midfoot area 67 or rearfoot area 68 of an article of footwear. However, the projection of exposed portions of a spring element beyond the sides of a sole, as recited and shown in U.S. Pat. No. 5,875,567, could result in injury to the medial side of a wearer's leg during running. Further, the method and process recited therein relating to grinding or otherwise removing portions of a spring element for creating differential stiffness is not considered practical or economical with regards to conventional mass produced articles of footwear. In addition, given the common orientation of the foot of a wearer who would be characterized as a rearfoot striker during footstrike, an inferior spring element 50 having an flexural axis 59 oriented consistent with transverse axis 91 at 90 degrees with respect to the longitudinal axis 69 is not so advantageously disposed to receive repetitive loading and exhibit robustness during its service life relative to an inferior spring element 50 having an flexural axis 59 deviated from the transverse axis 91 in the range between 10 and 50 degrees, as shown in FIGS. 9 and 10. In this regard, the foot of a wearer characterized as a rearfoot striker is normally somewhat dorsiflexed, supinated and abducted during footstrike, as recited in U.S. Pat. Nos. 5,425,184, and 5,625,964, hereby incorporated by reference herein. Accordingly, it can be advantageous for the flexural axis 59 of the inferior spring element 50 to be deviated from the transverse axis 91 in the range between 10 and 30 degrees in an article of footwear which is intended for walking use, or use by runners who tend to supinate during the braking and stance phases of the running cycle, and for the flexural axis 59 of the inferior spring element 50 to be deviated from the transverse axis 91 in the range between 30 and 50 degrees in an article of footwear intended for use by runners who tend to pronate during the braking and stance phases of the running cycle. Other teachings having possible merit relating to differential stiffness in the rearfoot area of an article of footwear include, e.g., U.S. Pat. Nos. 4,506,462, 4,364,189, 5,201,125, 5,197,206, and 5,197,207, all of these patents hereby being incorporated by reference herein.

In order to make carbon fiber composite spring elements, it can be advantageous to create a form or mold. The form or mold can be made of wood, composite material, or metal. Prototype forms or molds can be made of thin sheets of stainless steel which can be cut and bent into the desired configurations. The stainless steel can then be treated with a cleaner and appropriate release agent. For example, the stainless steel can be washed with WATERCLEAN and then dried, then given two coats of SEALPROOF sealer and dried, and finally given two coats of WATERSHIELD release agent and dried, all of these products being made by Zyvax, Inc. of Boca Raton, Fla., and distributed by Technology Marketing, Inc. of Vancouver, Wash., and Salt Lake City, Utah.

A "prepreg" unidirectional carbon fiber composite material including a peel-off protective layer that exposes a self-adhesive surface can then be cut to the approximate shapes of the desired spring element by a razor blade, scissors, cutting die, or water jet cutter. Suitable carbon fiber composite materials for use include F3(C) 50K made by FORTAFIL, PANEX 33 made by ZOLTEK, AS4C made by HEXCEL, T300 made by TORAY/AMOCO, and the like. The individual layers of carbon fiber composite material can have a thickness of approximately 0.13 mm or 0.005 inches and be affixed to one another to build the desired thickness of the spring elements, but allowing for a reduction of approximately 10 percent due to shrinkage which commonly takes place during the curing process. The individual layers can be alternated in various orientations, e.g., some can be orientated parallel to the length of the desired spring element, and others inclined at 45 degrees to the left or right, or at 90 degrees. The stiffness in bending exhibited by the spring element in various orientations can thereby be engineered by varying the number, type, and orientation of the fiber composite layers.

Once the spring element components have been built by adhering the desired number, type, and orientation of glass or carbon fiber composite layers together, the spring element can be rolled or placed under pressure and applied to the stainless steel prototype form or mold. When making prototype spring elements, the carbon fiber composite lay-up including the stainless steel form or mold can be wrapped in a peel ply or perforated release film such as Vac-Pak E 3760 or A 5000 Teflon® FEP, then wrapped in a bleeder such as A 3000 Resin Bleeder/Breather or RC-3000-10A polyester which will absorb excess resin which could leach from the spring elements during curing. This assembly can then be enclosed in a vacuum bagging film, e.g., a Vak-Pak® Co-Extruded Nylon Bagging Film such as Vac-Pak HS 800 and all mating edges can be sealed with the use of a sealant tape such as Schnee Morehead vacuum bag tacky tape, or RAP RS200. A vacuum valve can be installed in functional relation to the vacuum bagging film before the vacuum bag is completely sealed. The vacuum valve can be subsequently connected to an autoclave vacuum hose and a vacuum pump, and the assembly can be checked for leaks before placing it in an oven for curing. The entire assembly, while under constant vacuum pressure, can then be placed into an oven and heated at a temperature of approximately 250 degrees Fahrenheit for one to two hours in order to effect setting and curing of the carbon fiber composite spring elements. Upon removal from the oven and cooling, the vacuum bag can be opened and the cured carbon fiber composite spring elements can be removed from within the bleeder and the peel ply or release film, and separated from the stainless steel form or mold. The spring element parts can then possibly be cut or trimmed with a grinder or with the use of water jet cutting equipment, then the fasteners 29 can be affixed and the spring element installed in functional relation to the upper and outsole of a prototype article of footwear.

The method of making fiber composite materials in a production setting differs depending upon whether thermoplastic or thermoset materials are being used. For example, thermoplastic carbon fiber composite materials including their resin coatings are commonly available in flat sheet stock. Parts can then be cut from these sheets using water jet cutting equipment. These parts can then be preheated for a short time in an oven in order to reach a temperature below but relatively close to the melt point of the thermoplastic material, thus rendering the part moldable. Production molds are commonly milled from aluminum, then polished and treated with a non-stick coating and release agent. The cost of a single aluminum production mold is approximately $2,500. The parts can then be placed into a relatively cold mold and subjected to pressure as the part is permitted to cool. The parts can then be removed and inspected for possible use. One manufacturer of thermoset fiber composite parts is Performance Materials Corporation of 1150 Calle Suerte, Camarillo, Calif. 93012.

The production method and process is different when a thermoset carbon fiber composite uni-directional prepreg material is being used to make a desired part. The uncured layered thermoset part is commonly placed into an aluminum mold which has been preheated to a desired temperature. The mold is closed and the part is then subjected to both heat and pressure. In this regard, the set and cure time of thermoset fiber composite materials is temperature dependent. Generally, the set and cure time for thermoset parts will be about one hour given a temperature of 250 degrees Fahrenheit. However, it is often possible for the same thermoset parts to reach their gel state and take a set, whereupon the shape of the part will be stable, in about one half hour given a temperature of 270 degrees Fahrenheit, in about fifteen minutes given a temperature of 290 degrees Fahrenheit, or in about seven minutes given a temperature of 310 degrees Fahrenheit. Having once reached their gel state and taken a set, the thermoset parts can then be removed from the mold. The parts can later be placed in an oven and subjected to one to two hours of exposure to a temperature of 250 degrees Fahrenheit in order to complete the curing process. Moreover, Structural Polymer Systems, Inc. of San Diego, Calif. makes a "quick cure" thermoset material identified by their product code number 2510 which can completely cure in ten minutes given a temperature of 250 degrees Fahrenheit, and perhaps even faster at higher temperatures. One manufacturer of thermoset fiber composite parts is Quatro Composites of 12544 Kirkham Court, Number 16, Poway, Calif. 92064.

Alternative methods of making fiber composite parts can include the use of light cure technology, compression molding, injection molding, reaction injection molding, and also pulltrusion. Compression molding, injection molding, and reaction injection molding have been widely used in the automotive industry, e.g., the body of the Corvette largely consists of fiber composite construction. Thermoplastic materials, or alternately, thermoset materials including polymers, resins, or epoxies which can be rubber toughened including glass fiber, aramide fiber, carbon fiber, or boron fiber materials, and the like, having a relatively long fiber length can be used. For example, Dow Chemical Company of Midland, Mich. makes SPECTRUM® reaction moldable polymer which has been used to make automobile body parts, and LNP Engineering Plastics of Exton, Pa. makes THERMOCOMP® and VERTON® thermoplastic materials which can include long carbon fibers. Further, PPG of Pittsburgh, Pa., Corning, of Corning, N.Y., and Vetrotex of Valley Forge, Pa., are makers of electrical and structural grade fiberglass products.

Figure 2:
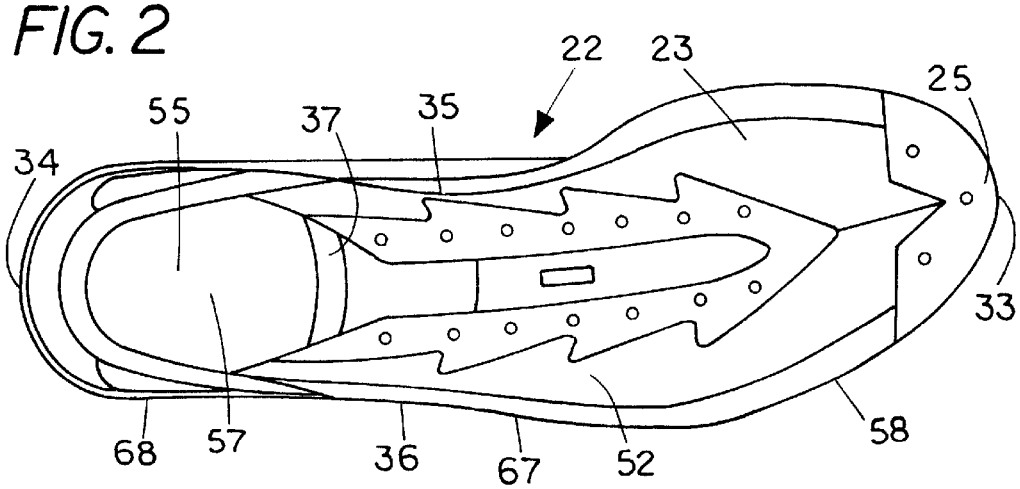
FIG. 2 is a top view of the article of footwear shown in FIG. 1.

FIG. 2 is a top view showing the superior side 37 of the article of footwear 22 shown in FIG. 1. Shown are the tip 25, vamp 52, insole 55, anterior side 33, posterior side 34, medial side 35, and lateral side 36 of the upper 23 of the article of footwear 22. Also shown is the forefoot area 58, midfoot area 67, rearfoot area 68, and position approximately corresponding to the weight bearing center of the heel 57.

Figure 3:
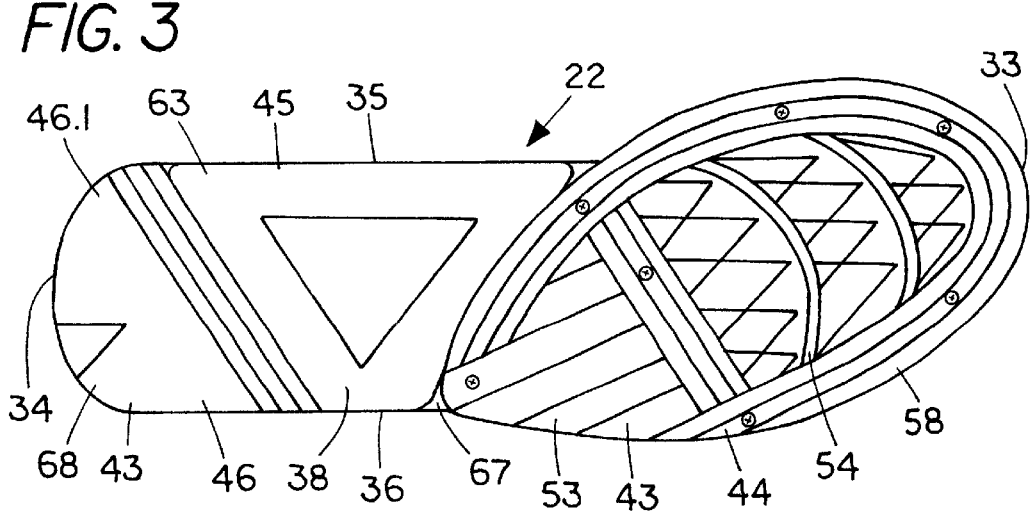
FIG. 3 is a bottom view of the article of footwear shown in FIG. 1.

FIG. 3 is a bottom view showing the inferior side 38 of the article of footwear 22 shown in FIG. 1. Shown is an outsole 43 having a tread or ground engaging surface 53 consisting of anterior outsole element 44 that includes lines of flexion 54, and a posterior outsole element 46 that extends substantially within the midfoot area 67 and rearfoot area 68. Alternately, posterior outsole element 46 can be made in two portions, that is, a posterior outsole element 46.1 positioned adjacent the posterior side 34 in the rearfoot area 68, and a stabilizer 63 having a generally triangular shape positioned substantially in the midfoot area 67. For the sake of brevity, both options have been shown simultaneously in FIG. 3. It can be readily understood that stabilizer 63 can be made in various configurations, and various different stiffness in compression options can be made in order to optimize desired performance characteristics such as cushioning and stability for an individual wearer, or a target population of wearers. In this regard, a stabilizer 63 can include a foam material, gas filled bladders, viscous fluids, gels, textiles, thermoplastic materials, and the like.

FIG. 4 is a medial side view of the article of footwear 22 shown in FIG. 1, with parts broken away. Shown in FIG. 4 is a two part outsole 43 consisting of anterior outsole element 44, and posterior outsole element 46, each having a backing 30. Also shown are the upper 23, including a tip 25, vamp 52, heel counter 24, fasteners 29, and insole 31. The insole 31 can be made of a foamed or blown neoprene rubber material including a textile cover and having a thickness of approximately 3.75 mm, or a SORBOTHANE®, or PORON® polyurethane foam material including a textile cover. The insole 31 preferably includes a light cure material for providing a custom fit in accordance with U.S. Pat. No. 5,632,057 granted to the present inventor, hereby incorporated by reference herein. The superior spring element 51 underlies the insole 31 and can be configured to approximate the shape of the insole 31 and last bottom about which the upper 23 can be affixed during the manufacturing process, or alternately, to a soft data storage and retrieval computer software three dimensional model relating to the configuration and pattern of the upper 23 of the article of footwear.

The spring element 51 can consist of a plurality of portions, and preferably three portions, an anterior spring element 48, a posterior spring element 49, and an inferior spring element 50 which can be affixed together in functional relation, e.g., with the use of fasteners 29, and the like. The anterior spring element 48 can underlay a substantial portion of the forefoot area 58 and is preferably affixed to the posterior spring element 49 in the forefoot area 58 or midfoot area 67 posterior of a position in the range between approximately 60–70 percent of the length of the upper 23 of the article of footwear 22 as measured from the posterior side 34, that is, a position posterior of the metatarsal-phalangeal joints of a wearer's foot when the article of footwear 22 is donned. The metatarsal-phalangeal joints are located at approximately 70 percent of foot length on the medial side 35 of the foot, and at approximately 60 percent of foot length on the lateral side 36 of the foot. Accordingly the anterior spring element 48 can underlay the metatarsal-phalangeal joints of the foot and energy can temporarily be stored and later released to generate propulsive force when the anterior spring element 48 undergoes bending during the stance and propulsive phases of the running cycle. The anterior spring element 48 can be selectively and removably attached and renewed in the event of damage or failure. Further, a wearer can select from anterior spring elements 48 having different configurations and stiffness, and therefore customize the desired stiffness of the anterior spring element 48 in an article of footwear 22. For example, different individuals having different body weight, running styles, or characteristic running speeds could desire anterior spring elements 48 having different stiffness.

Likewise, the superior spring element 47 or posterior spring element 46 can be selectively and removably affixed to the inferior spring element 50 in the rearfoot area 68 or midfoot area 67 of the article of footwear 22. Accordingly the superior spring element 47 or posterior spring element 49 can underlay a substantial portion of the wearer's rearfoot and perhaps a portion of the wearer's midfoot and energy can be stored during the braking and stance phases of the running cycle and released in the later portion of the stance and propulsive phases of the running cycle to provide propulsive force. The anteriormost portion of wearer's rearfoot on the lateral side of the foot is consistent with the junction between the calcaneus and cuboid bones of the foot which is generally in the range between 25–35 percent of a given foot length and that of a corresponding size upper 23 of an article of footwear 22. The superior spring element 47 or posterior spring element 49, and inferior spring element 50 can be selectively and removably attached and renewed in the event of failure. Further, a wearer can select from superior spring elements 47 or posterior spring elements 49, and inferior spring elements 50 having different configurations and stiffness, and therefore customize the desired stiffness of these spring elements in an article of footwear 22. For example, different individuals having different weight, running styles, or characteristic running speeds could desire to select superior spring elements 47 or posterior spring elements 49, and inferior spring elements 50 having different stiffness.

Accordingly, the spring element 51 of a preferred article of footwear can consist of three portions, an anterior spring element 48 which is positioned anterior of at least approximately 70 percent of the length of the upper 23 of the article of footwear 22 as measured from the posterior side 34, a posterior spring element 49 which extends anteriorly from proximate the posterior side 34 of the upper 23 of the article of footwear 22 and is affixed in functional relation to the anterior spring element 48, and an inferior spring element 50 which is affixed in functional relation to the posterior spring element 49. The inferior spring element 50 projects rearwards and downwards and extends beneath a substantial portion of the rearfoot area 68 of the article of footwear 22, that is, inferior spring element 50 can extend posterior of a position which corresponds to approximately 25–35 percent of the length of the upper 23 as measured from the posterior side 34. Alternately, the spring element 51 can be formed in two portions or a single part.

The elevation of the wearer's foot in the rearfoot area 68 measured under the weight bearing center of a wearer's heel 57 is preferably less than 30 mm, and is approximately 26 mm in a size 11 men's article of footwear 22, as shown in FIG. 4. The elevation of the wearer's foot in the forefoot area 58 measured under the ball of the foot proximate the metatarsal-phalangeal joints is preferably less than 20 mm, and is approximately 16 mm in a size 11 men's article of footwear, as shown in FIG. 4. The difference in elevation between the forefoot area 58 when measured under the ball of the foot and the rearfoot area 68 when measured under the weight bearing center of a wearer's heel 57 is preferably in the range between 8–12 mm, and is approximately 10 mm, as shown in FIG. 4.

The preferred maximum amount of deflection as between the superior spring element 47 or posterior spring element 49 and the inferior spring element 50 is in the range between 8–15 mm for most athletic footwear applications. As shown in FIG. 4, the maximum amount of deflection possible as between posterior spring element 49 and inferior spring element 50 is approximately 10 mm, and this amount of deflection is generally preferred for use in the rearfoot area 68 of a running shoe. It can be advantageous from the standpoint of injury prevention that the elevation of the rearfoot area 68 minus the maximum amount of deflection permitted between the superior spring element 47 or posterior spring element 49 and the inferior spring element 50 be equal to or greater than the elevation of the forefoot area 58. It can also be advantageous as concerns the longevity of the working life of the spring element 51 that the amount of deflection permitted be equal to or less than approximately 75% the maximum distance between the proximate opposing sides of the spring element 51, that is, as between the inferior surface of the superior spring element 47 or posterior spring element 49 and the superior surface of the inferior spring element 50.

The preferred amount of deflection or compression under the wearer's foot in the forefoot area 58 is approximately 4–6 mm, and such can be provided by an insole 31 having a thickness of 3.75 mm in combination with an anterior outsole element 44 having a total thickness of 6.5 mm including a backing 30 having a thickness of approximately 1.5 mm and a tread or ground engaging portion 53 having a thickness of approximately 5 mm, and in particular, when the ground engaging portion 53 is made of a relatively soft and resilient material having good traction, and shock and vibration dampening characteristics. For example, a foamed natural or synthetic rubber or other elastomeric material can be suitable for use. If hypothetically, an outsole material having advantageous traction, and shock and vibration dampening characteristics only lasts 200 miles during use, that is, as opposed to perhaps 300 miles associated with a harder and longer wearing outsole material, this does not pose a practical problem as the outsole 43 portions can be easily renewed in the present invention, whereas a conventional article of footwear would normally be discarded. Accordingly, it is possible to obtain better traction, and shock and vibration dampening characteristics in the present invention, as the durability of the outsole 43 portions is not such an important criteria.

Figure 5:
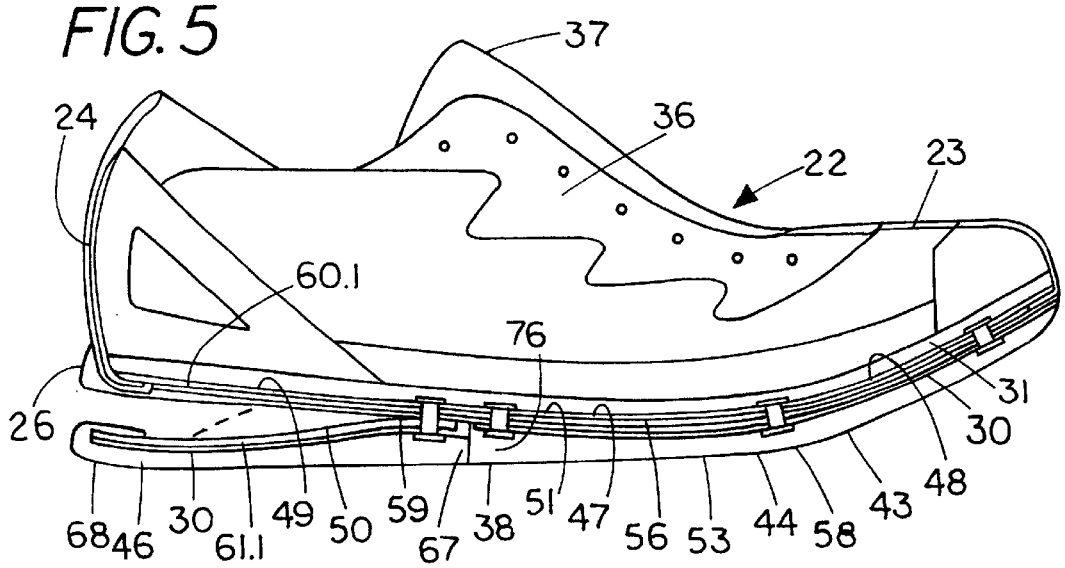
FIG. 5 is a lateral side view of the article of footwear shown in FIG. 1, with parts broken away.

FIG. 5 is a lateral side view of the article of footwear 22 shown in FIG. 1, with parts broken away. Shown in dashed lines is the medial aspect of the inferior spring element 50. Also shown is the flexural axis 59 which can be deviated in the range between 10 and 50 degrees from the transverse axis 91 of an article of footwear 22. It can be advantageous that the flexural axis 59 be deviated from the transverse axis 91 in the range between 10–30 degrees in an article of footwear intended for use in walking, and generally in the range between 30–50 degrees in an article of footwear intended for use in running. As shown in FIGS. 4 and 5, the flexural axis 59 is deviated about 35 degrees with the transverse axis 91 of the article of footwear 22.

It can be readily understood that posterior of the flexural axis 59 the length of the superior lever arm 60 and inferior lever arm 61 formed along the medial side 35 of the superior spring element 47 or posterior spring element 49 and the inferior spring element 50 are shorter than the length of the corresponding superior lever arm 60.1 and inferior lever arm 61.1 formed along the lateral side 36 of the superior spring element 47 or posterior spring element 49 and the inferior spring element 50. Accordingly, when the inferior spring element 50 is affixed in functional relation to the superior spring element 47 or posterior spring element 49 and is subject to compressive loading, the inferior spring element 50 exhibits less stiffness in compression at the lateral and posterior corner, and increasing stiffness in compression both anteriorly and laterally. Again, it can be advantageous for enhancing rearfoot stability during walking or running that the spring element 51 including inferior spring element 50 exhibit approximately two to three times the stiffness in compression on the medial side 35 relative to the stiffness exhibited on the lateral side 36. Further, as shown in FIGS. 4 and 5, the inferior aspect of the spring element 51 has a concave configuration in the midfoot area 67, that is, between the inferiormost portion of the anterior spring element 48 in the forefoot area 58 and the inferiormost portion of the inferior spring element 50 in the rearfoot area 68. It can be readily understood that the configuration of this concavity 76 and the flexural modulus of the spring element 51, as well as the stiffness of the anterior outsole element 44, middle outsole element 45, posterior outsole element 46, anterior spacer 55, and posterior spacer 42 can be engineered to provide optimal cushioning characteristics such as deflection with respect to the midfoot area 67 and rearfoot area 68 for an individual wearer, or for a target population having similar needs and requirements.

Figure 6:
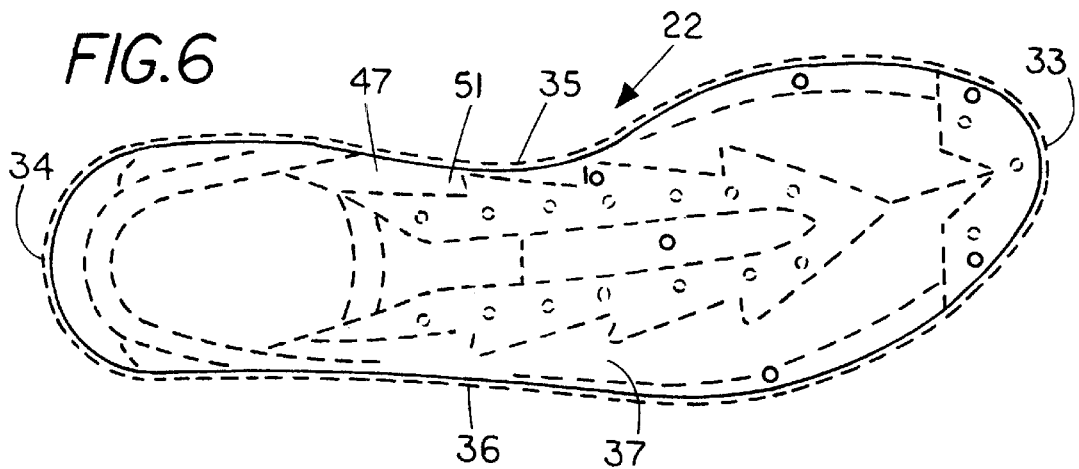
FIG. 6 is a top view of a lasting board or spring element in the article of footwear shown in FIG. 2, with the upper shown in dashed lines.

FIG. 6 is a top view of a lasting board 79 or spring element 51 in the article of footwear 22 similar to that shown in FIG. 2, but having a relatively more curved shape corresponding to a relatively more curve lasted upper 23 shown in dashed lines. Shown is a spring element 51 consisting of a single full length superior spring element 47.

FIG. 7 is a top view of a two part lasting board 79 or spring element 51 consisting of anterior spring element 48 and posterior spring element 49 in the article of footwear 22 shown in FIG. 2, with the upper 23 shown in dashed lines.

FIG. 8 is a top view of a two part lasting board 79 or spring element 51 consisting of anterior spring element 48 and posterior spring element 49 in an article of footwear 22 generally similar to that shown in FIG. 2, but having a relatively more curved shape corresponding to a relatively more curve lasted upper 23 which is shown in dashed lines. The anterior spring element 48 and posterior spring element 49 can be affixed with three fasteners 29 in triangulation. The posterior spring element 48 can include a projection 70 proximate the longitudinal axis 69 of the article of footwear 22. The configuration of this projection 70 can at least partially determine the torsional rigidity of the assembled spring element 51 consisting of anterior spring element 48 and posterior spring element 49, thus the degree to which the forefoot area 58 can be rotated inwards or outwards about the longitudinal axis 69. Further, the number, dimension, and location of the fasteners 29 used to affix the anterior spring element 48 and posterior spring element 49 can affect both the flexural modulus of the superior spring element 47 along the length of the longitudinal axis 69, but also rotationally about the longitudinal axis 69, that is, the torsional modulus of the superior spring element 47. A portion of the anterior spring element 48 is shown broken away in order to reveal the optional inclusion of an anterior spacer 55 between the anterior spring element 48 and the posterior spring element 49.

As shown in FIG. 8, an anterior spacer 55 which can possibly consist of a cushioning medium having desired spring and dampening characteristics can be inserted in the area between the anterior spring element 48 and posterior spring element 49, that is, within an area of possible overlap as between the two components. The configuration and compressive, flexural, and torsional stiffness of an anterior spacer 55 can be used to modify the overall configuration and performance of a spring element 51 and article of footwear 22. In this regard, an anterior spacer 55 can have uniform height, or alternately an anterior spacer 55 can have varied height. Further, an anterior spacer 55 can exhibit uniform compressive, flexural, and torsional stiffness throughout, or alternately an anterior spacer 55 can exhibit different compressive, flexural, and torsional stiffness in different locations. These varied characteristics of an anterior spacer 55 can be used to enhance the cushioning, stability and overall performance of an article of footwear 22 for a unique individual wearer, or for a target population of wearers. For example, an anterior spacer 55 having an inclined or wedge shape can be used to decrease the rate and magnitude of pronation, supination, and inward or outward rotation of portions of a wearer's foot during portions of the walking or running gait cycle, and can also possibly correct for anatomical conditions such as varus or valgus. The relevant methods and techniques for making corrections of this kind are relatively well known to qualified medical doctors, podiatrists, and physical therapists. See also the following prior art references, U.S. Pat. Nos. 4,399,620, 4,578,882, 4,620,376, 4,642,911, 4,949,476, and 5,921,004, all of these patents hereby being incorporated by reference herein. Normally, an anterior spacer 55 having an inclined wedge shape that increases in height from the lateral to the medial side, or one which exhibits greater stiffness in compression on the medial side can be used to compensate for a forefoot varus condition, whereas an anterior spacer 55 having an inclined wedge shape that increases in height from the medial to the lateral side, or one which exhibits greater stiffness in compression on the lateral side can be used to compensate for a forefoot valgus condition. An individual with a profound anatomical condition such as varus or valgus, or having a history of injury would be prudent to consult with a trained medical doctor when contemplating modification to their articles of footwear. Further, an anterior spacer 55 can also have a wedge or complex curved shape along the longitudinal axis 69, that is, in the posterior to anterior orientation, and various configurations of an anterior spacer 55 can be provided which can be used to modify the amount of toe spring 62 and the overall conformance of a spring element 51 and article of footwear 22, as desired.

FIG. 9 is a bottom view of the article of footwear 22 shown in FIG. 3, with the anterior outsole element 44 and posterior outsole element 46 removed to reveal the anterior spring element 48, posterior spring element 49, and inferior spring element 50. The flexural axis 59 of inferior spring element 50 is deviated approximately 35 degrees from the transverse axis 91. This configuration can be advantageous for use by distance runners who tend to pronate during the braking and stance phases of the running cycle. Further, a portion of the inferior spring element 50 is shown broken away to reveal the optional use of a posterior spacer 42 which can serve a role in functional relation to the inferior spring element 50 and the superior spring element 47 or posterior spring element 49 analogous to that of the anterior spacer 55 which can be used as between the anterior spring element 48 and posterior spring element 49. Further, a posterior spacer 42 can also have a wedge or complex curved shape along the longitudinal axis 69, that is, in the posterior to anterior orientation, and various configurations of a posterior spacer 42 can be provided which can be used to modify the overall conformance of a spring element 51 and article of footwear 22, as desired.

FIG. 10 is a bottom view of an alternate article of footwear 22 with the anterior outsole element 44 and posterior outsole element 46 removed to reveal anterior spring element 48, posterior spring element 49 and an alternate configuration of inferior spring element 50. The flexural axis 59 of inferior spring element 50 is deviated approximately 20 degrees from the transverse axis 91. This configuration can be advantageous for use by walkers, or by runners who tend to supinate during the braking and stance phases of the running cycle. The anterior spring element 48, posterior spring element 49, and inferior spring element 50 are shown affixed together in an overlapping relationship in FIGS. 9 and 10. However, it can be readily understood that various components of a spring element 51 can be affixed in function relation with the use of adhesives, mating male and female parts such as tongue and groove, or other configurations and devices known in the prior art.

The possible use of notches 71 or openings 72 in order to diminish the stiffness in bending or flexural modulus exhibited by a portion of spring element 51, and two substantially transverse lines of flexion 54 is also shown in FIG. 10. Shown with a dashed line 90 in FIG. 10, and also in medial side view in FIG. 14, is the possible inclusion of a rocker 87 configuration in the forefoot area 58 of the sole 32 an article of footwear 22. It can be advantageous for the point of greatest elevation of the rocker 87 to be located approximately in the range between 1–4 cm posterior of the metatarsal-phalangeal joints. The location of the first metatarsal-phalangeal joint 88 on the medial side 35 of an average wearer's foot is normally at slightly less than seventy percent of foot length, and the location of the fifth metatarsal-phalangeal joint 89 on the lateral side 36 is normally at slightly greater than sixty percent of foot length as measured from the posterior side 34 of the wearer's foot. Accordingly, a rocker 87 can be positioned in the range between 1–4 cm behind a generally transverse and slightly diagonal line which can be drawn as between these two approximate positions for any given size article of footwear.

Figure 11:
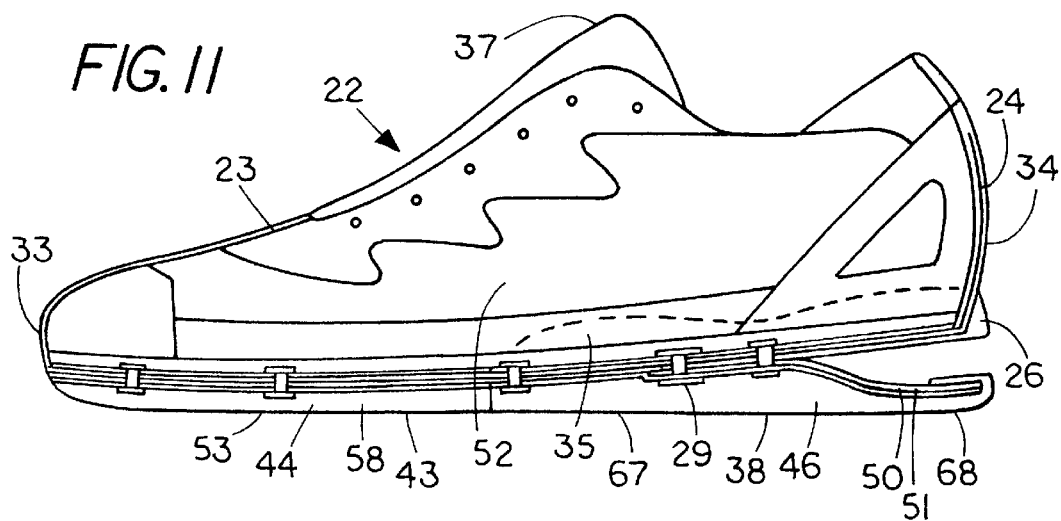
FIG. 11 is a medial side view of an alternate article of footwear generally similar to that shown in FIG. 1, with parts broken away, but having a forefoot area without toe spring.

FIG. 11 is a medial side view of an alternate article of footwear 22 generally similar to that shown in FIG. 1, with parts broken away, but having a forefoot area 58 without substantial toe spring 62. This particular article of footwear 22 can be suitable for use in activities such as tennis, volleyball, or basketball.

Figure 12:
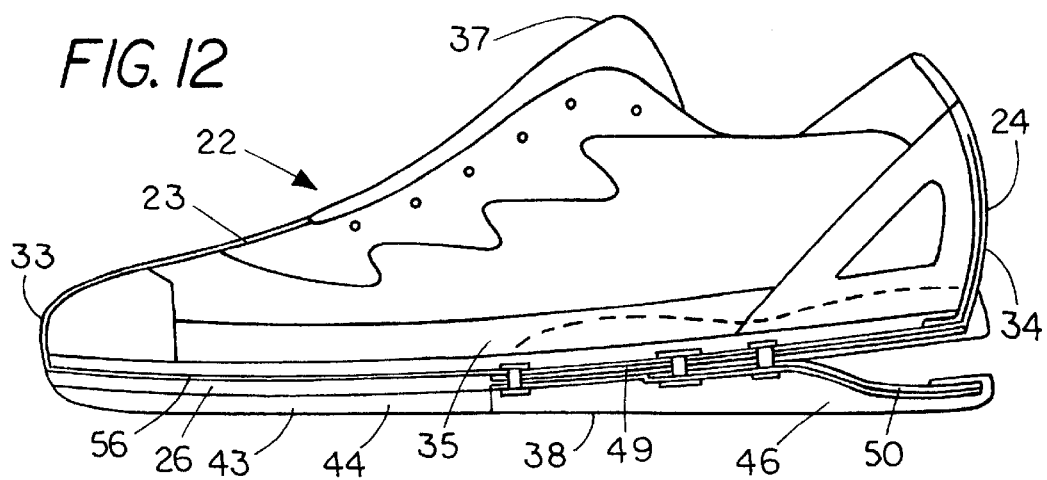
FIG. 12 is a medial side view of an alternate article of footwear generally similar to that shown in FIG. 11, with parts broken away, but having a forefoot area including an outsole, foam midsole, and upper affixed together with an adhesive.

FIG. 12 is a medial side view of an alternate article of footwear 22 generally similar to that shown in FIG. 11, with parts broken away, having a forefoot area 58 without substantial toe spring 62, but including an anterior outsole element 44, foam midsole 26, and upper 23 which are affixed together with the use of adhesives.

FIG. 13 is a medial side view of an alternate article of footwear 22 generally similar to that shown in FIG. 12, with parts broken away, having a forefoot area 58 without substantial toe spring 62, but including a detachable anterior outsole element 44 and foam midsole 26.

Figure 18:
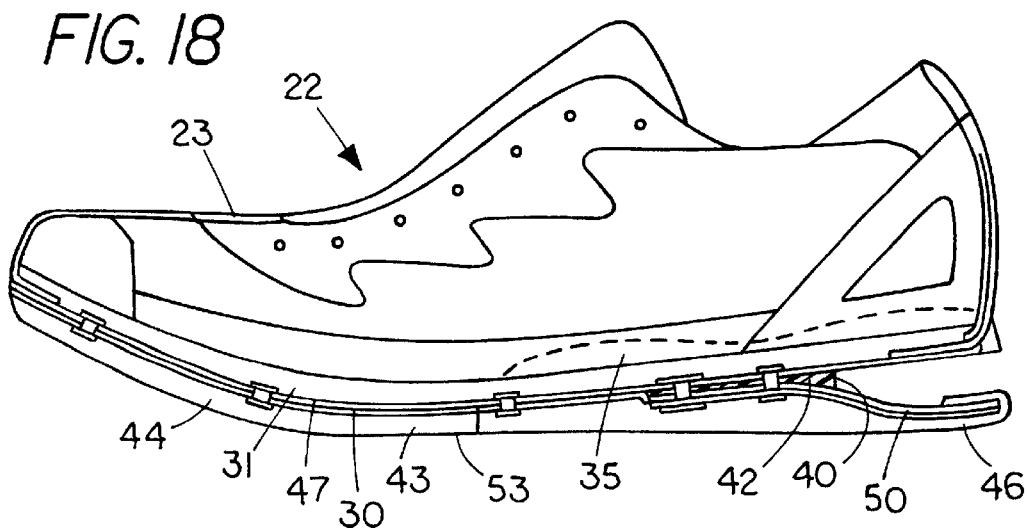
FIG. 18 is a medial side view of an alternate article of footwear generally similar to that shown in FIG. 17, further including a posterior spacer including a spring guard.
Figure 20:
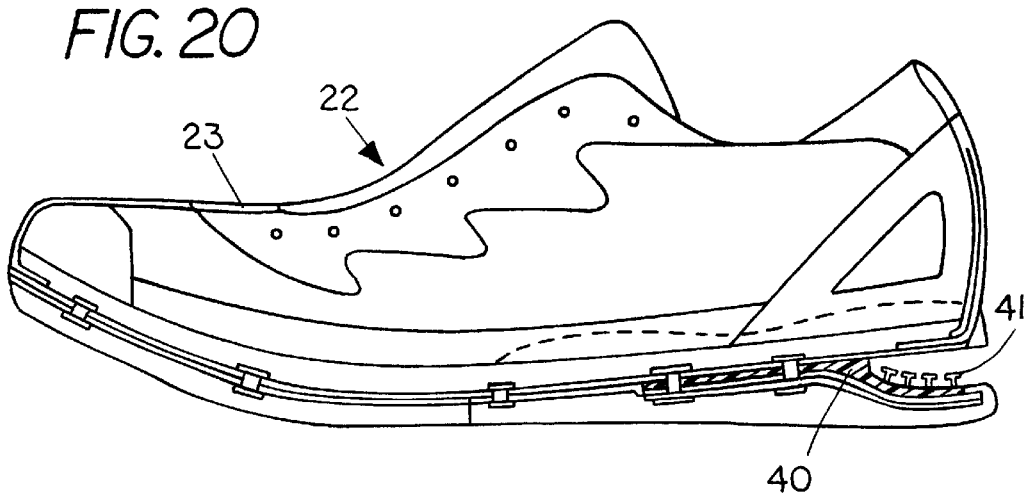
FIG. 20 is a medial side view of an alternate article of footwear generally similar to that shown in FIG. 19, further including a spring guard including a plurality of vibration decay time modifiers.

FIG. 14 is a medial side view of an alternate article of footwear 22 similar to that shown in FIG. 4, further including a spring guard 40. The spring guard 40 can be made of a relatively soft resilient material such as a foam material, or a natural or synthetic rubber. The spring guard 40 can prevent foreign matter from becoming lodged in the area proximate the junction of the superior spring element 47 or posterior spring element 49 and the inferior spring element 50, thus can prevent damage to spring element 51. The spring guard 40 can be affixed to the superior spring element 47 or posterior spring element 49, or to the inferior spring element 50, or to both portions of the spring element 51. Alternately, the spring guard 40 can form a portion and extension of posterior spacer 42, as shown in FIG. 18. Further, the spring guard 40 can also serve as a vibration decay time modifier 41, as shown in FIG. 20. Also shown in FIG. 14 is the approximate position of the first metatarsal-phalangeal joint 88 on the medial side 35, and a sole 32 or outsole 43 including a rocker 87 configuration in the forefoot area 58. As shown, the rocker 87 configuration can be formed and substantially consist of a portion of the sole 32 or outsole 43, or alternately, the rocker 87 configuration can be formed at least in part by an inferiorly protruding portion of the lasting board 79 or spring element 51, and in particular, the anterior spring element 48.

FIG. 15 is a medial side view of an alternate article of footwear 22 generally similar to that shown in FIG. 4, with parts broken away, having a upper 23 including a sleeve 39 for accommodating the superior spring element 47. The sleeve 39 can be formed in a portion of the upper 23 inferior to the insole 31, and can possibly consist of portion of the t-sock 56. The spring element 51 can include an inferior spring element 50, and a superior spring element 47 that can include an anterior spring element 48 and a posterior spring element 49. The superior spring element 47 can be positioned within sleeve 39, thus at least partially retaining the superior spring element 47 in functional relation to the upper 23 of the article of footwear 22.

Further, in contrast with the configuration of inferior spring element 50 shown in FIG. 16, an alternate inferior spring element 50.1 is shown in FIG. 15. The alternate inferior spring element 50.1 descends from proximate the superior spring element 47 or posterior spring element 49 and attains maximum separation therefrom. The inferior spring element 50.1 can then possibly extend posteriorly in a parallel relationship with respect to the overlaying superior spring element 47. However, the inferior spring element 50.1 then recurves or curls up slightly as the inferior spring element 50.1 extends towards the posterior side 34 of the article of footwear 22. In particular, the inferior spring element 50.1 curls up slightly in the range between approximately 5–15 degrees as it extends towards the posterior side 34 and lateral side 36 corner of the sole 32 of the article of footwear 22.

FIG. 16 is a medial side view of an alternate article of footwear 22 generally similar to that shown in FIG. 4, with parts broken away. However, this alternate embodiment does not include an additional covering such as a coating, textile, or outsole 43 on the inferior side of the upper 23, as shown in FIG. 4. Accordingly, the inferior side of the upper 23 is in direct contact with the superior side of the backing 30 of the outsole 43, that is, anterior outsole element 44 and posterior outsole element 46 when the article of footwear 22 is assembled. Further, in an alternate embodiment of the present invention, the backing 30 of an outsole 43 can be made of a material having sufficient flexural modulus and resilience as to simultaneously serve as a spring element of the article of footwear, as shown in FIG. 16. Accordingly, the anterior spring element can consist of two portions, anterior spring element 48, and anterior spring element 48.1, which also serves as the backing 30 of anterior outsole element 44.

In the article of footwear shown in FIG. 16, when a line is drawn parallel to the ground support surface and tangent to the inferior surface of the superior spring element 47 in the forefoot area 58, the approximate slope of the superior spring element 47 as it extends posteriorly is approximately five degrees. When affixed in functional relation to the superior spring element 47 or posterior spring element 49, the inferior spring element 50 projects downwards and rearwards therefrom before attaining the desired amount of separation between the components which at least partially determines the maximum amount of deflection that the resulting spring element 51 can provide. As shown in FIG. 16 and several other drawing figures, once the inferior spring element 50 descends and attains the desired amount of separation the inferior spring element 50 extends posteriorly in a substantially parallel relationship with respect to the corresponding overlaying portion of the superior spring element 47 or posterior spring element 49. Accordingly, after descending from proximate the superior spring element 47 or posterior spring element 49 and establishing the desired amount of separation the inferior spring element 50 does not recurve or curl back upwards as it extends towards the posterior side 34 of the article of footwear 22. Instead, it is known in prior art articles of footwear, and can also be advantageous in the present invention for a portion of the outsole 43 near the posterior side 34, and in particular, proximate the posterior side 34 and lateral side 36 corner, to be sloped upwards in the range between 5–15 degrees, and in particular, approximately 12–13 degrees. However, the configuration of the article of footwear 22, e.g., the amount of toe spring 62 and the aforementioned slope of the superior spring element 47 can influence or determine the amount of slope which is advantageous to incorporate in this portion of the outsole 43.

Figure 17:
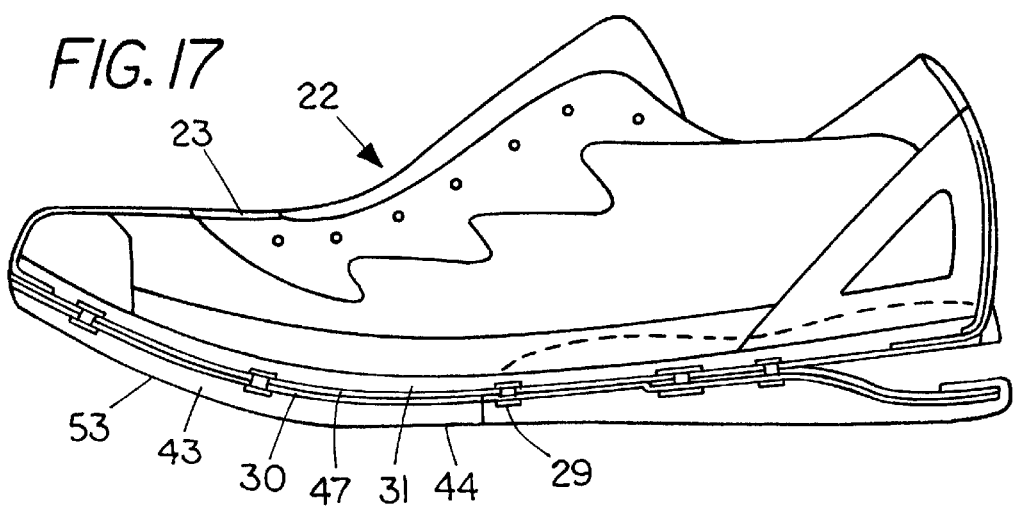
FIG. 17 is a medial side view of an alternate article of footwear generally similar to that shown in FIG. 4, with parts broken away, having a upper affixed to a lasting board or spring element.

FIG. 17 is a medial side view of an alternate article of footwear 22 generally similar to that shown in FIG. 4, having a upper 23 affixed to superior spring element 47, with parts broken away. The upper 23 is affixed to the top or superior surface of superior spring element 47, thus the superior spring element 47 can be exposed on its bottom or inferior surface. Accordingly, the superior surface of the outsole 43 portions including backing 30 can be placed in direct contact with the superior spring element 47 when they are affixed into position.

FIG. 18 is a medial side view of an alternate article of footwear 22 similar to that shown in FIG. 17, further including a posterior spacer 42. As shown in FIG. 18, a posterior spacer 42 can include a spring guard 40. As shown in FIG. 20, a spring guard 40 can further include a vibration decay time modifier 41. The posterior spacer 42 can serve to at least partially isolate the superior spring element 47, upper 23 and wearer from the transmission of shock and vibration which could be imparted by the inferior spring element 50 and posterior outsole element 46 caused by an impact event.

It can be readily understood that a posterior spacer 42 can serve a purpose analogous to that of anterior spacer 55, and vice-versa. Accordingly, a posterior spacer 42 can consist of a cushioning medium having desired spring and dampening characteristics. The posterior spacer 42 can be inserted between the inferior spring element 50 and posterior spring element 49, that is, within an area of possible overlap as between the two components. The configuration and stiffness of a posterior spacer 42 can be used to modify the overall configuration and performance of a spring element 51 and article of footwear 22. In this regard, a posterior spacer 42 can have uniform height, or alternately a posterior spacer 42 can have varied height. Further, a posterior spacer 42 can exhibit uniform compressive, flexural, or torsional stiffness throughout, or alternately can exhibit different properties in different locations. These varied characteristics of a posterior spacer 42 can be used to enhance the cushioning and/or stability of an article of footwear 22 for an unique individual wearer, or for a target population of wearers.

For example, a posterior spacer 42 having an inclined or wedge shape can be used to decrease the rate and magnitude of pronation, supination, inward or outward rotation of portions of a wearer's foot during phases of the walking or running gait cycle, and can also possibly correct for anatomical conditions such as varus or valgus. Again, the relevant methods and techniques for making corrections of this kind are relatively well known to qualified medical doctors, podiatrists, and physical therapists. Normally, a posterior spacer 42 having an inclined wedge shape that increases in height from the lateral to the medial side, or a posterior spacer 42 which exhibits greater stiffness in compression on the medial side can be used to reduce the magnitude and rate of rearfoot pronation, whereas a posterior spacer 42 having an inclined wedge shape that increases in height from the medial to the lateral side, or a posterior spacer 42 which exhibits greater stiffness in compression on the lateral side can be used to reduce the magnitude and rate of rearfoot supination. An individual having a profound anatomical condition such as varus or valgus, an individual who dramatically pronates or supinates, or an individual who has a history of injury would be prudent to consult with a trained medical doctor when contemplating modification to their articles of footwear.

It can be readily understood that with the use of an anterior spacer 55 positioned between anterior spring element 48 and posterior spring element 49, and a posterior spacer 42 positioned between the superior spring element 47 or posterior spring element 49 and the inferior spring element 50, that the configuration and functional relationship as between the forefoot area 58, midfoot area 67, and rearfoot area 68 of an article of footwear 22 can be adjusted and customized as desired by an individual wearer. Further, the use of an anterior spacer 55 and/or posterior spacer 42 having a select configuration can be used to adjust the amount of support provided by a superior spring element 47 or posterior spring element 49 which can possibly further include contours for mating with the complex curved shapes of a wearer's foot. For example, it is possible to customize the amount of support that is provided to the medial longitudinal, lateral longitudinal and transverse arches, and to the sides of a wearer's foot.

Figure 19:
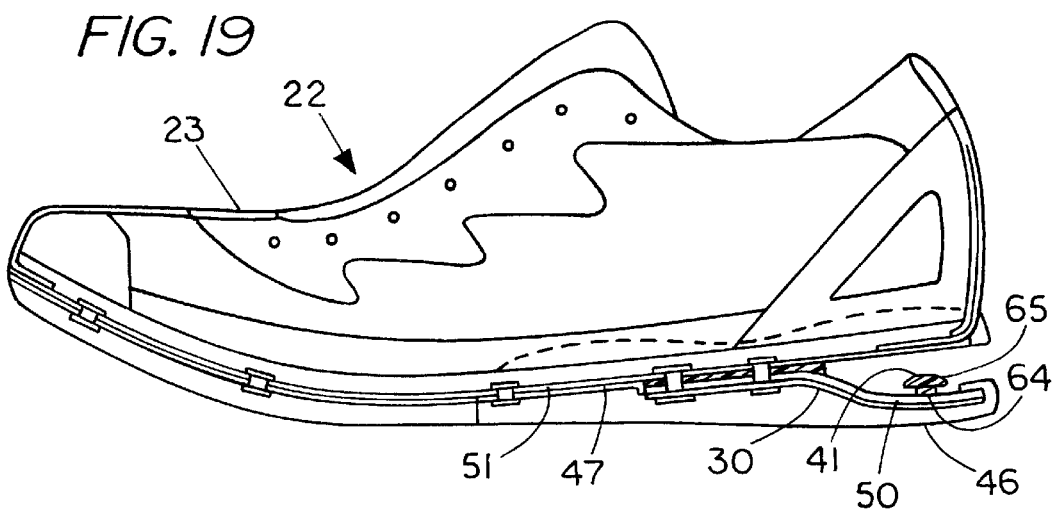
FIG. 19 is a medial side view of an alternate article of footwear generally similar to that shown in FIG. 18, further including a vibration decay time modifier.

FIG. 19 is a medial side view of an alternate article of footwear 22 having a posterior spacer 22 including a spring guard 40, and also a vibration decay time modifier 41 having a stem 64 and a head 65. The vibration decay time modifier 41 can be affixed in function relation to a portion of spring element 51, and in particular, a portion of an inferior spring element 50. The head 65 of the vibration decay time modifier 41 can be dimensioned and configured for vibration substantially free of contact with a spring element 51 in directions which substantially encompass a 360 degree arc and normal to the longitudinal axis of the stem 64, that is, when the vibration decay time modifier 41 is initially excited by shock and vibration. When the superior spring element 47 or posterior spring element 49 and inferior spring element 50 are subjected to compressive loading a vibration decay time modifier 41 can also serve as a stop and prevent any possible impact between these elements. The inclusion of a posterior spacer 42 and/or a vibration decay time modifier 41 can partially attenuate shock and vibration associated with impact events associated with movements such as walking or running, and can reduce the vibration decay time following an impact event. This can serve to enhance comfort, proprioception, reduce local trauma, and possibly solicit greater application of force and improved athletic performance.

Generally, the efficiency of a vibration decay time modifier will be enhanced the closer it is positioned in functional relation to a negative nodal point. When properly configured and placed proximate the negative nodal point of an object or implement, relatively little mass is required in order to substantially prevent, or alternately, to attenuate resonant vibration within fractions of a second. A negative nodal point is a point at which a substantial portion of the vibration energy in an excited object or implement will pass when it is excited by energy associated with an impact or other vibration producing event. Discussion of modes of vibration and negative nodal points can be found in Arthur H. Benade, *Fundamentals of Musical Acoustics*, 2nd edition, New York: Dover Publications, 1990, Harry F. Olson, *Music, Physics and Engineering*, 2nd edition, New York: Dover Publications, 1967, and U.S. Pat. No. 3,941,380 granted to Francois Rene Lacoste on Mar. 2, 1976, this patent hereby being incorporated by reference herein. A technology taught by Steven C. Sims in U.S. Pat. No. 5,362,046, granted Nov. 4, 1994, this patent hereby being incorporated by reference herein, has been commercialized by Wilson Sporting Goods, Inc. into the SLEDGEHAMMER® INTUNE® tennis rackets, and by Hillerich and Bradsby Company, Inc. in the LOUISVILLE SLUGGER® SIMS STINGSTOP® aluminum baseball and softball bats, as well as the POWERBUILT® SIMS SHOCK RELIEF® golf club line, and LIMBSAVER® product for archery. These products substantially eliminate the vibration and stinging associated with impact events experienced by a wielder's hands. Certain aspects of the aforementioned teachings can be applied in the present invention in order to accomplish a similar results with regards to an article of footwear 22 and the lower extremities of a wearer.

The source of shock and vibration can derive from a relatively controlled and harmonic movement, such as when a wearer repeatedly impacts the pavement while running in an article of footwear 22. Further, the source of shock and vibration can be random in nature, as when a wearer rides a wheeled vehicle such as a bicycle or motorcycle over rough terrain. Alternately, the source of shock and vibration can be constant and mechanically driven as when a wearer rides a bicycle, or a motor vehicle such as a motorcycle or snowmobile. A shock wave, that is, a shock pulse or discontinuity can travel at the speed of sound in a given medium. In the human body, the speed of sound in bone is approximately 3,200 meters/second, and in soft tissue approximately 1,600 meters/second. A shock wave traveling in a relatively dense fluid medium such as water has approximately five times the power that it does in a less dense fluid medium such as air. It is important to recognize that the human body is largely comprised of water and like fluid medium.

When a metal bell is struck, the bell will resonate and continue to ring for an extended time while the vibration energy is gradually dampened out. When a small bell is rung, one can place one's hand upon it and silence it. In that case, the primary dampening means for attenuating the resulting shock and vibration is the anatomy of the human subject. The same thing can happen when an impact event takes place as between an individual's foot and the materials which are used in an athletic shoe, and a running surface. When an individual runs on an asphalt surface in running shoes, the sound of the impact event that one hears is the audible portion of the shock wave that has been generated as result of the impact.

Many individuals know from experience that a vibrating implement or object can numb the hands. This is even more true when the source of the vibration is continuous and driven as when power equipment is being used. Associated with that numbness can be pain, reduced sensation and proprioception, and reduced muscular effort and performance as the body responds to protect itself from a perceived source of trauma and injury. Chronic exposure to high levels of vibration can result in a medical condition known as white finger disease. Generally, the lower extremities of most individuals are not subject to high levels of driven vibration. However, bicycle riders wearing relatively rigid articles of footwear can experience constant driven vibration, thus their feet can become numb or "go to sleep" over time. Motorcycle riders can also experience the same phenomenon.

The preferred article of footwear includes spring and dampening means for at least partially attenuating shock and vibration, that is, the initial shock pulse, pressure wave, or discontinuity and associated peak g's that are imparted to a wearer due to an impact event. At a cellular or molecular level, such vibration energy is believed to disturb normal functions such as blood flow in tendon tissue. Given appropriate engineering with respect to the characteristic or desired spring stiffness, mass, deflection, frequency, dampening, and percent transmissibility, an article of footwear of the present invention can partially attenuate shock and vibration. Viscous, friction, and mechanical dampening means can be used to attain this end. It is known that the mean power frequency associated with the rearfoot impact event in running generally corresponds to 20 Herz, and that of the forefoot to 5 Herz. The design and configuration, as well as the spring and dampening characteristics of a spring element 51, posterior spacer 42, and vibration decay time modifier 41 can be engineered so as to target these frequencies and provide a specific characteristic tuned mechanical response.

An anterior spacer 55, posterior spacer 42, and vibration decay time modifier 41 can be made of a cushioning medium such as a natural or synthetic rubber material, or a resilient elastomer such as polyurethane. In this regard, thermoset or thermoplastic materials can be used. Thermoplastic materials can be less expensive to produce as they can be readily injection molded. In contrast, thermoset materials are often compression molded using a relatively time and energy consuming vulcanization process. However, some thermoset materials can possess superior dampening properties and durability. Dampening materials which can be cured with the use of ultrasonic energy, microwave, visible or ultraviolet light, radio frequency, or other portions of the electromagnetic spectrum can be used. Room temperature cure elastomers, such as moisture or evaporation cure, or catalytic cure resilient materials can also be used. A suitable dampening material can be made of a butyl, chloroprene, polynorborene, neoprene, or silicone rubber, and the like. Alternately, a dampening material can be made of an elastomeric material such as polyurethane, or SORBOTHANE®. Suitable hybrid thermoplastic and rubber combinations can also be used, including dynamically vulcanized alloys which can be injection molded such as those produced by Advanced Elastomer Systems, 338 Main Street, Akron, Ohio 44311, e.g., SANTOPRENE®, VYRAM®, GEOLAST®, and TREFSIN®. SANTOPRENE® is known to consist of a combination of butyl rubber and ethylene-propylene. Generally, other materials developed for use in the audio industry for dampening vibration such as EAR ISODAMP®, SINATRA®, EYDEX®, and the like, or combinations thereof, can be used. Fillers such as organic or inorganic microspheres, carbon black or other conventional fillers can be used. Plasticizing agents such as fluids or oils can be used to modify the physical and mechanical properties of the dampening material in a desired manner. The preferred dampening material has transition characteristics suitable for the expected operational temperature of an article of footwear 22, and other physical and mechanical properties well suited to dampen shock and vibration and reduce vibration decay time.

It can be advantageous that the dampening material used to make a solitary vibration decay time modifier 41 including a stem 64 and a head 65 have a hardness in the range of 10–30 durometer, and preferably approximately 20 durometer on the Shore A scale. A relatively soft dampening material is capable a dampening a wide range of exciting vibration frequencies, and also relatively low vibration frequencies. However, a harder dampening material having greater shear and tear strength can sometimes be advantageous for use when making an anterior spacer 55 or posterior spacer 42 due to the magnitude of the loads which can be placed upon these components during use. A vibration decay time modifier 41 can be affixed to spring element 51 by conventional means such as adhesive, mechanically mating parts, chemical bonding, heat and pressure welding, radio frequency welding, compression molding, injection molding, photocuring, and the like.

In a conventional article of footwear having a foam midsole and rubber outsole, the materials located between the wearer's foot and the inferior ground engaging surface of the outsole normally become compressed during footstrike and subsequent loading of the sole. During compressive loading the stiffness of these materials increases linearly or geometrically and as result the ability of the sole to dampen shock and vibration rapidly diminishes. Further, the area of the sole which transmits most of the shock and vibration can be relatively small and localized. In this regard, the energy associated with a shock pulse or discontinuity passes tends to pass quickly by the shortest route and through the hardest or stiffest material in which it is in communication. Again, the transmission of shock and vibration is extremely fast in the human body and the materials used in conventional articles of footwear. In a conventional article of footwear, the shock and vibration resulting from impact with the support surface is rapidly transmitted through the outsole, midsole, upper and insole and into a wearer's foot.

However, in the present invention the shock and vibration generated proximate the inferior ground engaging surface 53 of the outsole 43 must travel anteriorly along the outsole 43 and inferior spring element 50 before being transmitted to the superior spring element 47, upper 23 and wearer, thus for a greater distance relative to a conventional article of footwear. This affords more time and space in which to attenuate and dampen shock and vibration. Further, in the present invention the outsole 43 can be made of a softer material having better shock and vibration dampening characteristics than is normally the case in a conventional article of footwear. In addition, a posterior spacer 42 can serve as a shock and vibration isolator between the inferior spring element 50 and the superior spring element 47, upper 23, and wearer's foot. Moreover, as shown in FIGS. 19 and 20, at least one vibration decay time modifier 41 can be positioned in direct communication with inferior spring element 50 in order to dampen shock and vibration before it can be transmitted to a wearer. Accordingly, the present invention can provide a wearer with enhanced cushioning, shock and vibration isolation, and dampening effects relative to conventional footwear constructions.

FIG. 20 is a medial side view of an alternate article of footwear 22 including a posterior spacer 42 similar to that shown in FIG. 18. As shown in FIG. 20, a posterior spacer 42 can include a spring guard 40 and at least one protrusion which can be configured and engineered to serve as a vibration decay time modifier 41.

Figure 21:
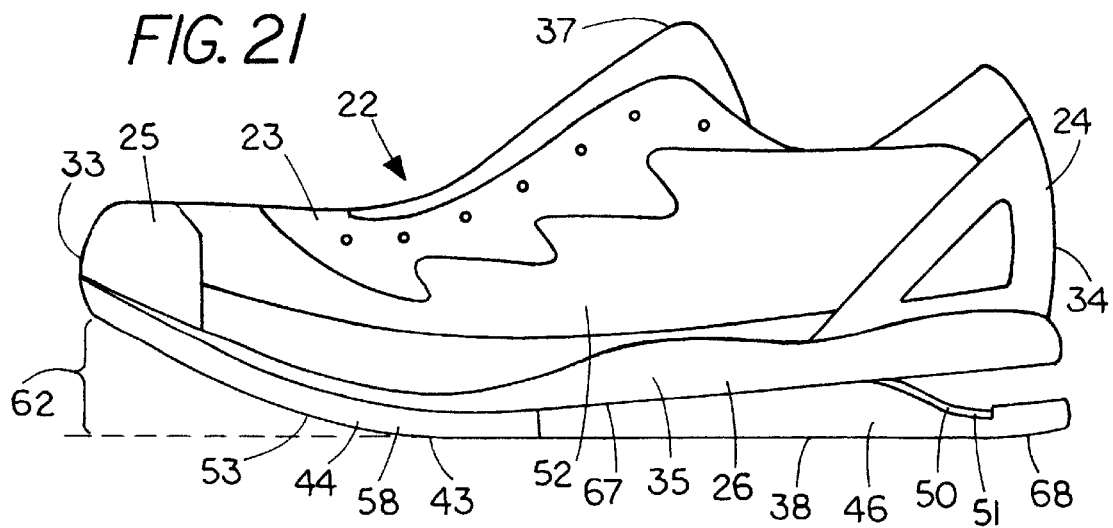
FIG. 21 is a medial side view of an alternate article of footwear similar to that shown in FIG. 4, but having various components affixed together with the use of adhesives.

FIG. 21 is a medial side view of an alternate article of footwear 22 generally similar to that shown in FIG. 1, but having various components including the upper 23, spring element 51, and outsole 43 affixed together with the use of adhesives in the manner of a conventional article of footwear.

Figure 22:
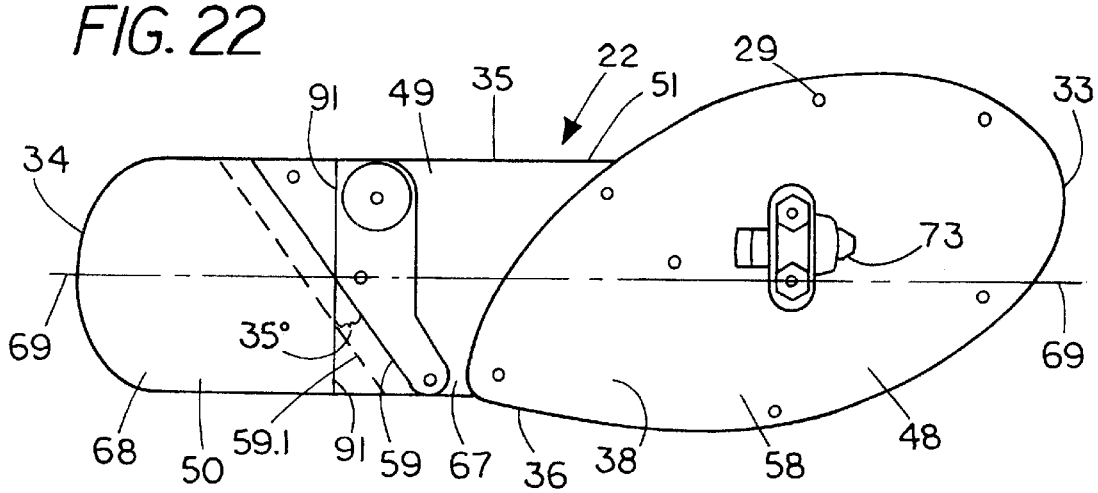
FIG. 22 is a bottom view of an alternate article of footwear similar to that shown in FIG. 3, having a lasting board or spring element configured for accommodating a bicycle or skate cleat.

FIG. 22 is a bottom view of an alternate article of footwear 22 generally similar to that shown in FIG. 3, having a spring element 51 configured for accommodating a detachable bicycle cleat 73. The article of footwear 22 can then serve as bicycling shoe, and possibly also as a functional upper 23 for an in-line skate, as taught in the applicant's co-pending U.S. patent application Ser. No. 09/228, 206 entitled "Wheeled Skate With Step-In Binding And Brakes," hereby incorporated by reference herein.

Also shown in FIG. 22 is flexural axis 59, and with the use of a dashed line, an alternate position of flexural axis 59.1 with reference to the longitudinal axis 69. It can be readily understood that other more anterior or more posterior positions of a flexural axis 59 with reference to the longitudinal axis 69 are possible. The position of the flexural axis 59 can be selected in order to influence or determine the physical and mechanical properties of a spring element 51, and the overall conformance and performance of an article of footwear 22, as desired. However, it has been discovered that it is advantageous both with respect to the stability of the preferred article of footwear 22, but also the weight and cost of the spring element, that the posterior position of the flexural axis 59 on the medial side 35 be positioned approximately in the preferred range between 1–3 inches or 25.4–76.2 mm, and in particular, approximately in the range between 1.5–2.5 inches or 38.1–63.5 mm from the posterior side 34 of the upper 23 in a men's size 11.5 article of footwear 22. The method of grading and scaling various footwear components for other men's or women's sizes is well known in the footwear industry, thus the preferred range as concerns the position of the flexural axis 59 on the medial side 32 can be determined from this information for any given size article of footwear 22.

It can be readily understood that this teaching concerning the preferred position of the flexural axis 59 with reference to the longitudinal axis 69 can be applied to other embodiments of a preferred article of footwear 22. Moreover, possible angular deviation of the flexural axis 59 from the transverse axis 91 in the range between 10–50 degrees was previously discussed. One advantage to using a flexural axis 59 that is deviated from the transverse axis 91 in the range between 10–50 degrees is that it permits the use of an inferior spring element 50 having a relatively homogenous construction and a substantially uniform thickness, and this both serves to reduce manufacturing costs and enhances product reliability. It can be readily understood that various combinations and permutations with respect to the position of the flexural axis 59 with reference to the longitudinal axis 69 and the angular deviation of the flexural axis 59 from the transverse axis 91 can be functional.

Figure 23:
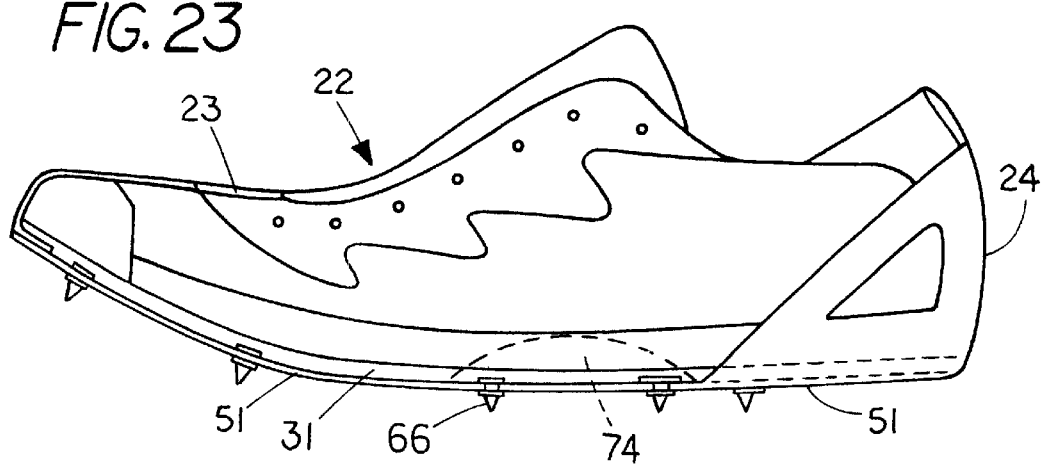
FIG. 23 is a medial side view of an alternate article of footwear generally similar to that shown in FIG. 17, but including a lasting board or spring element which extends about the heel to form an integral heel counter, and about the lateral side of the forefoot to form a side support, with the outsole and inferior spring element removed, and including track spike elements.

FIG. 23 is a medial side view of an alternate article of footwear 22 generally similar to that shown in FIG. 17, but having the anterior outsole element 44, posterior outsole element 46, and inferior spring element 50 removed, and further including track spike elements 66. This embodiment can facilitate enhanced athletic performance and can be used by track and field athletes in the sprinting and jumping events. Further, the spring element 51 can extend upwards about the area of the heel to form an integral heel counter 24, as shown in FIG. 23. In addition, the spring element 51 can extend upwards about the lateral side 36 of the forefoot area 58 to form a side support 74, as shown with dashed lines in FIG. 23. Various configurations of a side support 74 and/or an integral heel counter 24 can be incorporated in any or all embodiments of a preferred article of footwear 22, as desired. Moreover, the superior spring element 47 used in any or all embodiments of a preferred article of footwear 22 can be configured to mate with or otherwise support the complex curved shapes and structures associated with the anatomy of the human foot.

Figure 24:
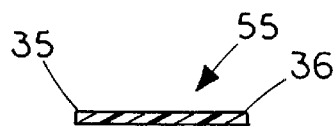
FIG. 24 is a cross sectional view of the anterior spacer included in the article of footwear shown in FIG. 8, taken along line 24—24.

FIG. 24 is a cross sectional view of the anterior spacer 55 included in the article of footwear 22 shown in FIG. 8, taken along line 24—24. As shown in FIG. 24, the anterior spacer 55 has a uniform elevation.

Figure 25:
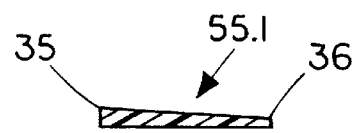
FIG. 25, is a sectional view of an alternate anterior spacer generally similar to that shown in FIG. 8, but having a wedge shape, taken along a line consistent with line 24—24.

FIG. 25 is a cross sectional view of an alternate anterior spacer 55.1 generally similar to that shown in FIG. 8, but having a wedge shape 28, taken along a line consistent with line 24—24. As shown in FIG. 25, the anterior spacer 55.1 has a wedge shape 28 which slopes upward from the lateral side 36 to the medial side 35.

Figure 26:
FIG. 26 is a cross sectional view of the posterior spacer included in the article of footwear shown in FIG. 9, taken along line 26—26.

FIG. 26 is a cross sectional view of the posterior spacer 42 included in the article of footwear 22 shown in FIG. 9, taken along line 26—26. As shown in FIG. 26, the posterior spacer 42 has a uniform elevation.

Figure 27:
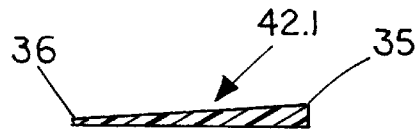
FIG. 27 is a cross sectional view of an alternate posterior spacer generally similar to that shown in FIG. 9, but having a wedge shape, taken along a line consistent with line 26—26.

FIG. 27 is a cross sectional view of an alternate posterior spacer generally similar to that shown in FIG. 9, but having a wedge shape, taken along a line consistent with line 26—26. As shown in FIG. 27, the posterior spacer 42.1 has a wedge shape 28 which slopes upward from the lateral side 36 to the medial side 35.

FIGS. 24–27 have been provided to illustrate a few of the possible configurations of an anterior spacer 55 and posterior spacer 22, and other variations are both possible and anticipated. For example, the configuration and slope of the wedge shapes 28 can be the opposite of that represented, and the anterior spacer 55 and/or posterior spacer 22 can slope upwards from the medial side 35 to the lateral side 36. Further, the anterior spacer 55 and/or posterior spacer 22 can have more complex or compound curved shapes. In addition, it can be readily understood that the amount of elevation and/or degree of slope of the anterior spacer 55 and/or posterior spacer 42 can be varied. The compressive, flexural and torsional stiffness of different anterior spacer 55 and/or posterior spacer 42 can also be varied. Moreover, an anterior spacer 55 and/or posterior spacer can be made to exhibit differential stiffness in different portions.

Again, an anterior spacer 55 or posterior spacer 42 can also have a wedge or complex curved shape along the longitudinal axis 69, that is, in the posterior to anterior orientation, and various configurations can be provided which can be used to modify the overall conformance of a spring element 51 and article of footwear 22, as desired. Accordingly, many variables can be manipulated and selected to optimize the configuration and performance of a preferred article of footwear for an individual wearer, or for a given target population having similar characteristics and requirements.

Figure 28:
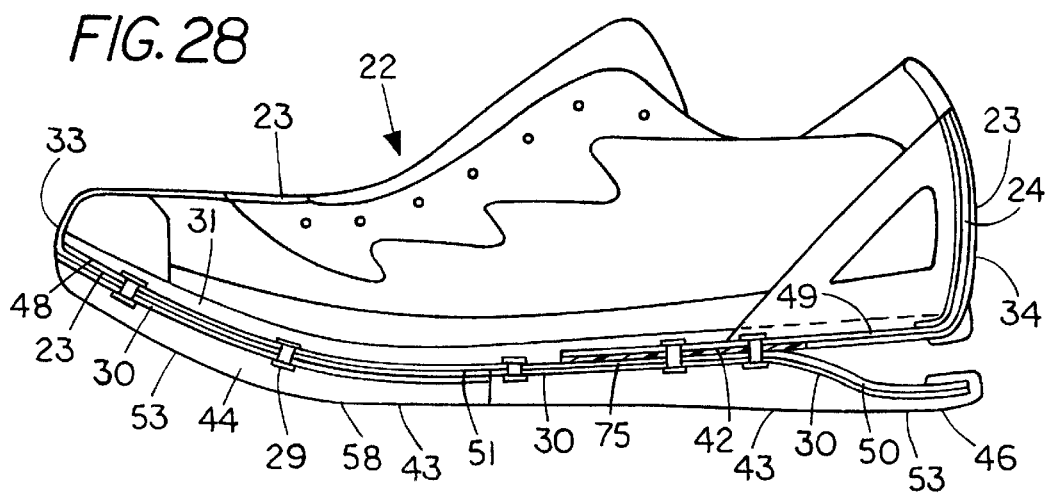
FIG. 28 is a medial side view of an alternate article of footwear having an alternate with parts broken away.

FIG. 28 is a medial side view of an alternate article of footwear 22 having a different configuration of a spring element 51, with parts broken away. In this embodiment, the anterior spring element 48 and inferior spring element 50 can be affixed in functional relation with the use of mechanical means such as fasteners 29, and the like, or alternately be formed as a single component identified herein as anterior and inferior spring element 75. The anterior portion of the spring element 51 can pass through a slit in the t-sock 56 or upper 23 and then be affixed with fasteners 29 to outsole 43, thereby firmly securing the upper 23 in functional relation thereto. As shown, the posterior spring element 49 can be affixed to the posterior portion of the spring element 51 with fasteners 29, and a posterior spacer 42 can also be inserted therebetween. Alternately, the posterior spacer 42 be formed as a coating or otherwise consist of a portion of the t-sock 56 or upper 23. As shown in FIG. 28, the posterior spring element 49 can be made to further include an integral heel counter 24.

Figure 29:
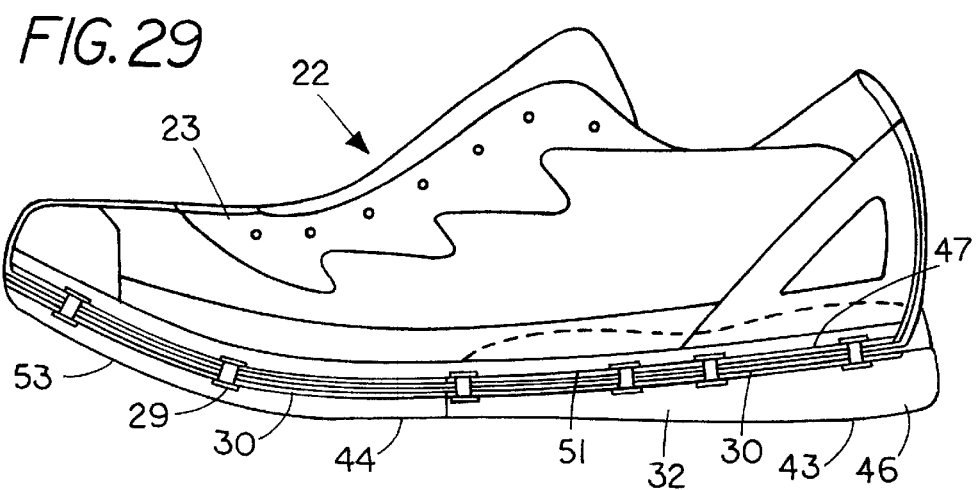
FIG. 29 is a medial side view of an alternate article of footwear having a lasting board or spring element, and a selectively removable sole.

FIG. 29 is a medial side view of an alternate article of footwear 22 including a lasting board 79, and a selectively removable sole 32. The lasting board 79 can have the approximate configuration of the bottom net of a corresponding last 80 or other hard template, model, or pattern. Alternately, the lasting board 79 can be made in accordance with a soft model created and maintained in a data storage and retrieval computer environment. The lasting board 79 can be made of wood, cellulose, cardboard, or other natural fiber, reconstituted leather, a textile formed by knitting or weaving, a non-woven textile, a textile formed by stitch bonding, metal such as steel, spring steel, aluminum, or titanium, a thermoplastic material such as nylon, polyester, polypropylene, an elastomer such as polyurethane, thermoplastic rubber or other natural or synthetic rubber, or as preferred and previously discussed in detail, a fiber composite material such as carbon fiber. Accordingly, a lasting board 79 can also comprise at least a portion of a spring element 51, and vice versa. The lasting board 79 can extend from the near the posterior side 34 to near the anterior side 33 of the article of footwear 22, and can be formed in a single part or two parts as shown in FIGS. 6–8. A lasting board 79 needs to be robust and possess the physical and mechanical properties required to impart and substantially maintain the desired configuration of the upper 23 while at the same time meeting the various other functional performance requirements of the article of footwear 22.

The sole 32 can include separate midsole 26 and outsole 43 components, or can be made as a single component. Various sole 32 components can be made having different physical and mechanical characteristics, and performance capabilities for possible selection and use by a wearer. The sole 32 can be selectively removed and replaced by a wearer in order to customize the article of footwear 22, or to renew a component, as desired. Again, it can be readily understood that a lasting board 79 can simultaneously consist and serve as a spring element 51, and vice-versa. As shown in FIG. 29, the lasting board 79 or spring element 51 does not include an inferior spring element 50, rather the spring element 51 consists of a superior spring element 47, or an anterior spring element 48 and posterior spring element 49 which are affixed in functional relation.

FIG. 30 shows a bottom view of an alternate article of footwear 22 having an anterior lasting board 79 positioned in the forefoot area 58. Also shown is a portion of the inferior side 38 of the upper 23 including a plurality openings 72 which can be made to register with corresponding openings 72 in an anterior lasting board 79, thus enabling the use of a plurality of fasteners 29 to affix the upper 23 in functional relation to the anterior lasting board 79, and a sole 32 which can possibly include a midsole 26 and outsole 43, or merely an outsole 43. The article of footwear 22 shown in FIG. 30 also consists of a slip-lasted construction in the forefoot area 58 including a t-sock 56 to which the upper 23 is affixed by stitching or adhesive, or other conventional means. The t-sock 56 can consist of a substantially non-stretchlastic textile material, but preferably consists of a stretchlastic textile material. Alternately, the t-sock 56 can be made of cellulose, paper, cardboard, or other natural fiber, reconstituted leather, a textile formed by knitting or weaving, a non-woven textile, a textile formed by stitch bonding, a thin film or sheet consisting of thermoplastic material such as nylon, polyester, polypropylene, and the like, an elastomer such as polyurethane, thermoplastic rubber or other natural or synthetic rubber. Alternately, the upper 23 can consist of a different type of slip lasted construction, a moccasin construction, a string lasted construction, or other conventional footwear construction known in the art. The article of footwear 22 can include a sole 32 in the midfoot area 67 and rearfoot area 68 which is affixed to the upper 23 in a conventional manner with the use of adhesives. Alternately, the sole 32 can be affixed to a full length lasting board 79, or a posterior lasting board 79 with the use of fasteners 29.

It can be readily understood that within certain practical limitations, different lasting boards 79 having different configurations possibly including different lengths, foot shapes, and widths can be used with a given upper 23 in order to customize the fit of an article of footwear 22 for a unique individual or target population. For example, a plurality of lasting boards 79 can be developed for use with different target populations consisting of individuals having generally similar anatomical characteristics and foot dimensions. Further, it can also be readily understood that within certain practical limitations, different uppers 23 having different configurations possibly including different lengths, widths, and foot shapes can be used with a given lasting board 79 in order to customize the fit of an article of footwear 22 for a unique individual or target population. For example, a plurality of uppers 23 can be developed for use with different target populations consisting of individuals having generally similar anatomical characteristics and foot dimensions.

FIG. 31 shows a bottom view of the inferior side 38 of the upper 23 of an article of footwear 22 generally similar to that shown in FIG. 30, but including two alternate openings 72 at a plurality of different positions at which a fastener 29 can be used. In the American sizing system, a change in length by one size corresponds to ⅓ inch, and changes in width as between respective sizes A, B, C, D, and E are associated with increments of ¼ inch. Further, the increments in length and width associated with other sizing systems are also known. Given an upper 23 having two alternate openings 72 that are separated by ¼ inch for possible use at each different position at which a fastener 29 can be used, and in particular, about the forefoot area 58, it is possible for the article of footwear 22 to provide three possible options such as width sizes B, C, and D. For example, if the openings 72 closest to the lateral side 23 and medial side 22 are associated with an article of footwear 22 having a B width, then increasing the width of the upper 23 by moving the adjacent opening 72 on one side or the other to that position will provide a C width, and moving the other adjacent opening 72 on the opposite side in like manner will provide a D width. It is generally advantageous to configure an upper 23 having only two alternate openings 72 for possible use at each different position at which a fastener 29 can be used in accordance with the width sizing model shown in FIG. 32.

Figure 32:
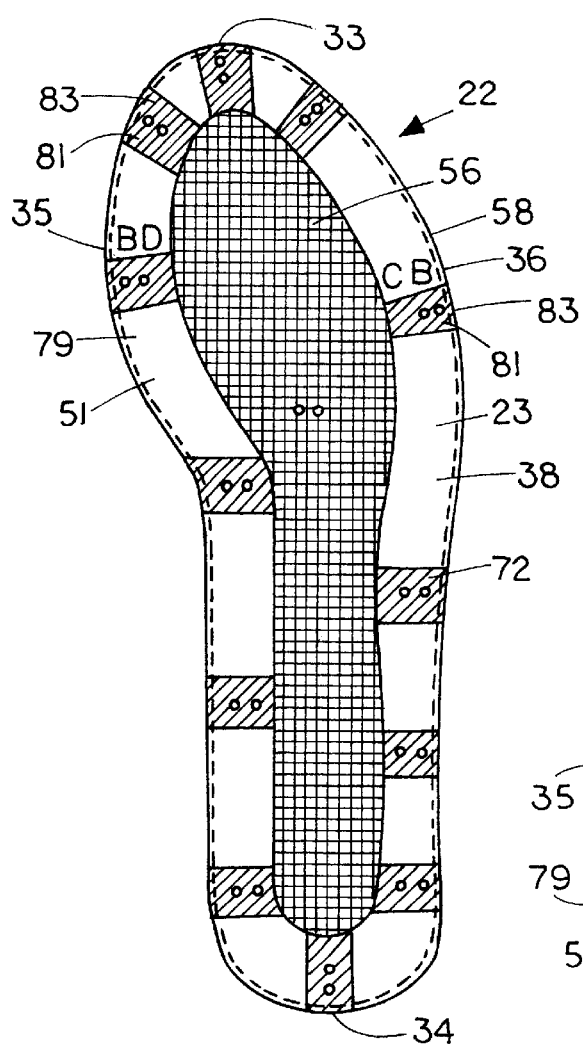
FIG. 32 is a bottom view of the inferior side of the upper of an article of footwear showing reinforcement material about a plurality of adjacent openings at different positions.

FIG. 32 shows an article of footwear 22 which is adjustable along the entire length of the upper 23 including the forefoot area 58, midfoot area 67, and rearfoot area 68 having two alternate openings 72 for possible use at each different position at which a fastener 29 can be used, and the possible use of local reinforcement material 81 in the area about the openings 72. The reinforcement material 81 can be made of tape, textile, plastic, natural or synthetic rubber, natural or synthetic leather, metal, or other robust material which serves to enhance the strength of the upper 23. The reinforcement material 81 can also be tactified, or otherwise possess relatively high static and dynamic coefficients of friction, and can possibly include a self-adhesive material 83. Nevertheless, it can be advantageous that the self-adhesive material 83 have a repeatable or renewable adhesion and release capability such as that provided or illustrated by stick-it notes. Also shown is the use of a t-sock 56 made of stretchlastic material that has greater than 100% elongation which can easily accommodate the possible ½ inch width expansion of the upper 23.

Figure 33:
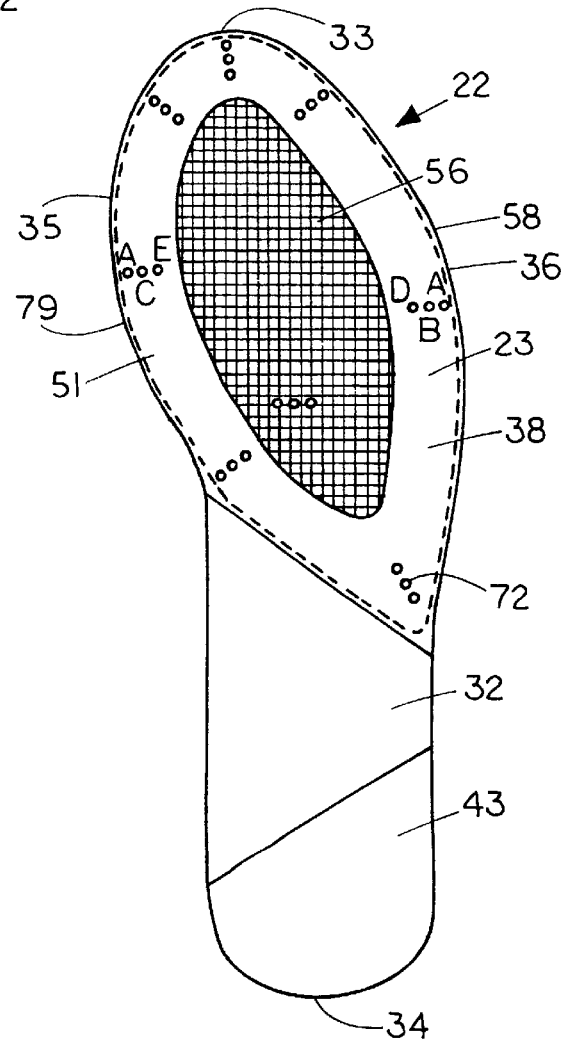
FIG. 33 is a bottom view of the inferior side of the upper of an article of footwear showing a plurality of adjacent openings at different positions.

FIG. 33 shows a bottom view of the inferior side 38 of the upper 23 of an article of footwear generally similar to that shown in FIGS. 30 and 31, but including three alternate openings 72 for possible use at each different position at which a fastener 29 can be used. In the American sizing system, a change in length by one size corresponds to ⅓ inch, and; changes in width as between respective sizes A, B, C, D, and E are associated with increments of ¼ inch. Further, the increments in length and width associated with other sizing systems are also known. Given an upper 23 having three alternate openings 72 that are separated by ¼ inch for possible use at each fastener 29 position, and in particular, about the forefoot area 58, it is possible for the article of footwear 22 to provide five possible width size options such as width sizes A, B, C, D, and E. For example, if the openings 72 closest to the lateral side 23 and medial side 22 are associated with an article of footwear 22 having a size A width, then increasing the width of the upper 23 by moving the next adjacent opening 12 on one side or the other to that position will provide a B width, and moving the other adjacent opening 72 on the opposite side will provide a C width, and so on, thus possibly also providing size D and E widths, as desired. It can be advantageous to configure an upper 23 having three alternate openings 72 for possible use at each different position at which a fastener 29 can be used in accordance with the width sizing model shown in FIG. 34.

Figure 34:
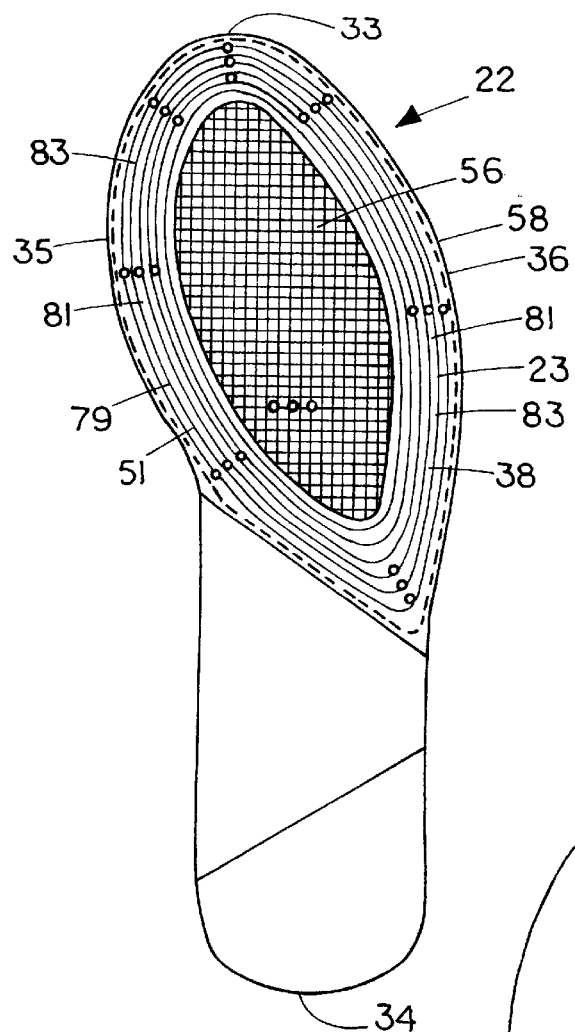
FIG. 34 is a bottom view of the inferior side of the upper of an article of footwear showing reinforcement material about and between a plurality of openings.

FIG. 34 shows an upper 23 having three alternate openings 72 for possible use at each different position at which a fastener 29 can be used, and also the possible use of reinforcement material 81 in the area about and between the openings 72. This reinforcement material 81 can be made of tape, textile, plastic, natural or synthetic rubber, natural or synthetic leather, metal, or other robust material that will serve to enhance the strength of the upper 23. The reinforcement material 81 can also be tactified, or otherwise possess a relatively high static and dynamic coefficient of friction, and can possibly include a self-adhesive material 83. Nevertheless, it can be advantageous that the self-adhesive material 83 have a repeatable or renewable adhesion and release capability such as that provided or illustrated by stick-it notes. Also shown is the use of a t-sock 56 made of stretchlastic material that has greater than 100% elongation which can easily accommodate the possible 1 inch width expansion of the upper 23.

Figure 35:
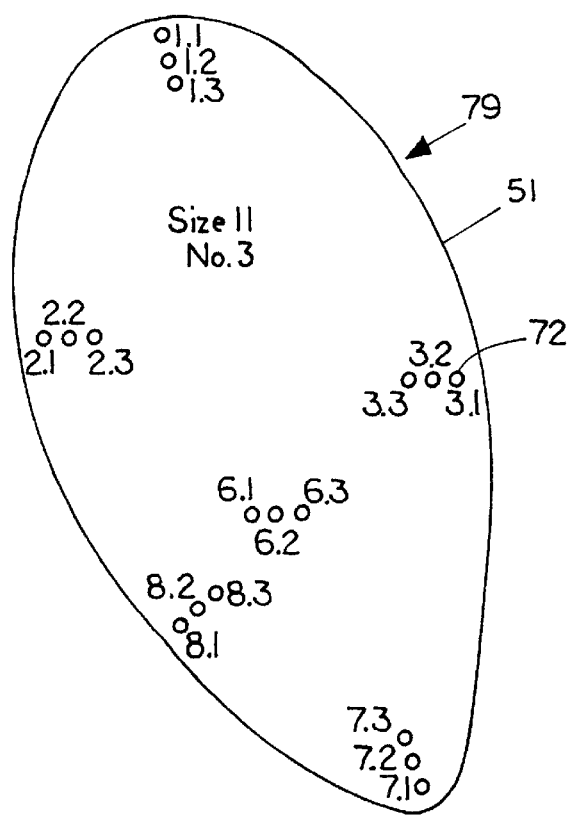
FIG. 35 is a bottom view of the inferior side of a lasting board or anterior spring element having a plurality of openings at different positions for being affixed in function relation to an upper outsole.

FIG. 35 shows a lasting board 79 for the forefoot area 58 including a plurality of openings 72, or alternately, a plurality of indications with respect to making a plurality of openings 72 for use in the present invention. These openings 72 can provide alternate positions for use in affixing portions of the upper 23 in functional relation to the lasting board 79 with the use of fasteners 29. Also shown is the use of a code for indicating each different position where a fastener 29 can be used, and also the three alternative openings 72 for possible use at each different position. The same code can also be used with corresponding parts of the upper 23 and sole 32. Accordingly, the information and intelligence created from the raw data which has been collected with respect to an individual wearer or target population can indicate the selection of a specific lasting board 79 and also a specific code indicating the openings 72 to be used in order to provide an individual wearer or target population with an optimal or preferred custom fit. For example, various lasting boards 79 having a particular size length, foot shape configuration, and size width can be given numerical and/or alphabetical identification. Further, the various different positions at which a fastener 29 can be used, and in particular, the alternate openings 72 which are present at each different position can be given an alphabetical and/or numerical identification, as shown in FIG. 35.

Accordingly, the raw data or feedback provided by an individual when transformed into information and intelligence could possibly indicate the selection a lasting board 79 having American length size 11, last or foot shape number 3 from amongst a possible selection of thirty different last or foot shape configurations, and also indicate selection of the following code with respect to utilization of the various different positions and alternate openings 72: Code 1.1/2.2/3.2/4.2/5.2/6.1/7.2/8.2. In contrast, an different individual could require the same lasting board 79 having American length size 11, last or foot shape number 3, but a different code for optimal utilization of the various different positions and alternate openings 72, e.g., Code 1.2/2.1/3.1/4.2/5.3/6.1/7.2/8.2. Obviously, a different individual could require a lasting board 79 having a different length and also a different last or foot shape, and the data and preferences of different individuals can also indicate or result in the selection of different uppers 23 having different functions, designs, styles, materials, and sizes.

Figure 36:
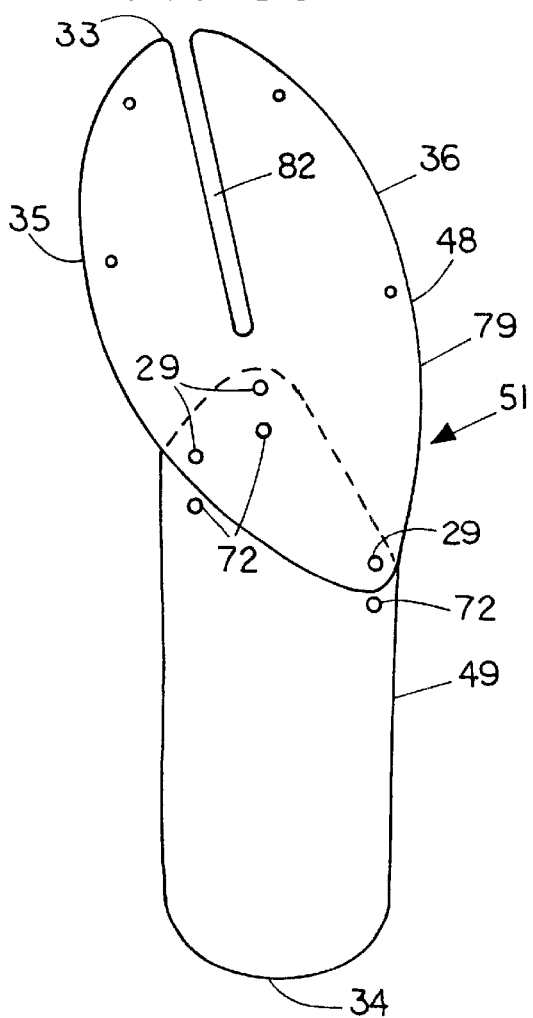
FIG. 36 is a top view of the superior side of a spring element including an anterior spring element including a longitudinal slit, and posterior spring element.

FIG. 36 shows an alternate lasting board 79 or spring element 51 for use in the forefoot area 58 of an article of footwear 22. The spring element 51 consists of a posterior spring element 49 and an anterior spring element 48 which includes a longitudinal slit 82 that at least partially separates the medial side 35 from the lateral side 36 and permits somewhat independent articulation and flexion of these two portions. It can be advantageous for the position of the longitudinal slit 82 to coincide with the space between an wearer's first and second toes and corresponding metatarsals, or alternately, with the space between an wearer's second and third toes and corresponding metatarsals. This can facilitate independent articulation of the toes and metatarsals of the foot and possibly enhance both comfort and athletic performance, as taught in U.S. Pat. No. 5,384, 973 granted to the present inventor and assigned to NIKE, Inc., previously incorporated by reference herein. The physical and mechanical properties of the anterior spring element 48 can be varied as between its anterior side and posterior side, but also as between its medial side 35 and lateral side 36.

A lasting board 79 or spring element 51 component having a given size length can also sometimes be used with articles of footwear 22 which are in the range between one to three different half sizes longer and shorter. As shown in FIG. 36, at least one alternate set of openings 72 can be included on the posterior spring element 49 for affixing the posterior spring element 49 in functional relation to the anterior spring element 48. Further, an alternate set of openings 72 can be included on the anterior spring element 48 for the same purpose. In the American sizing system, length changes of one full size approximately correspond to increments of ⅓rd of an inch, and the distances associated with other sizing systems are also known. Accordingly, two sets of alternate openings 72 spaced apart by a distance corresponding to a full size length can sometimes render a lasting board 79 or spring element 51 suitable for use with three or four sizes.

Figure 37:
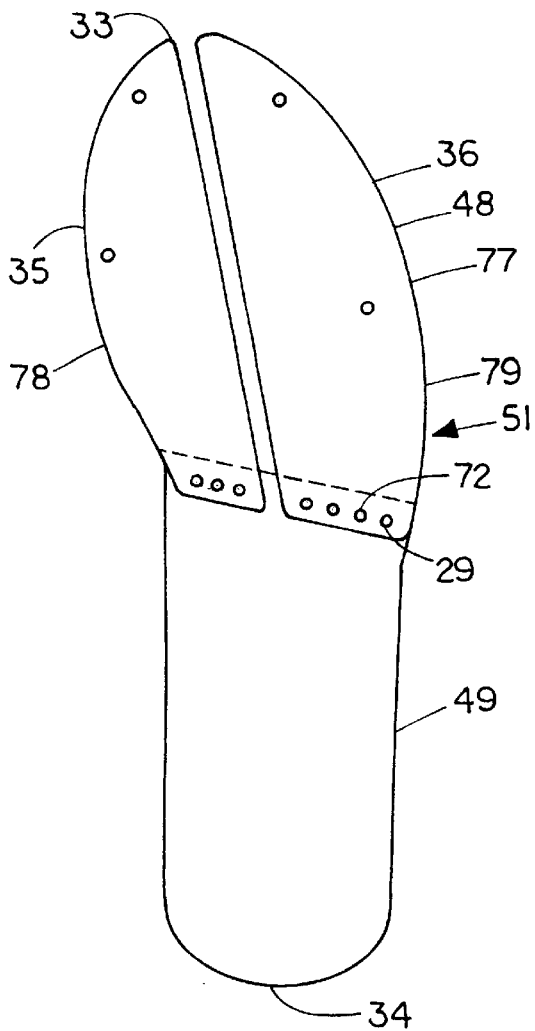
FIG. 37 is a top view of the superior side of a spring element including an anterior spring element consisting of two separate parts, a medial anterior spring element and a lateral anterior spring element.

FIG. 37 shows a different alternate lasting board 79 or spring element 51 including an anterior spring element 48 and a posterior spring element 49. The anterior spring element 48 for use in the forefoot area 58 of an article of footwear 22 consists of two separate parts, that is, a medial anterior spring element 78, and lateral anterior spring element 77. This configuration separates the medial side 35 from the lateral side 36 and permits substantial independent articulation and flexion of these two parts. It can be advantageous for the position of the longitudinal opening 72 between the medial anterior spring element 78 and lateral anterior spring element 77 to coincide with the space between an wearer's first and second toes and corresponding metatarsals, or alternately, with the space between an wearer's second and third toes and corresponding metatarsals. This can facilitate independent articulation of the toes and metatarsals of the foot and possibly enhance both comfort and athletic performance, as taught in U.S. Pat. No. 5,384, 973 granted to the present inventor and assigned to NIKE, Inc., previously incorporated by reference herein. The physical and mechanical properties of the medial anterior spring element 78 and lateral anterior spring element 77 can be varied as between their respective anterior sides and posterior sides, but also as between their respective medial sides 35 and lateral sides 36. Further, the configuration and also the physical and mechanical properties of the medial anterior spring element 78 and lateral anterior spring element 77 can be different from one another. In addition, different medial anterior spring elements 78 and lateral anterior spring elements 77 can be selected for use in an article of footwear 22.

Also shown in FIG. 37 is the possible use of a plurality of different alternate openings 72 for affixing the medial anterior spring element 78 and lateral anterior spring element 77 in different relative positions. Given American footwear sizing, if the medial anterior spring element 78 and lateral anterior spring element 77 are configured to provide a size B width when the two parts are in a closed position, that is, the two parts are adjacent to one another, then moving one of the parts ¼ inch will provide a size C width, and moving the other part ¼ inch will provide a D width, and the two parts will then be separated by ½ inch. If the medial anterior spring element 78 and lateral anterior spring element 77 are configured to provide a size A width when the two parts are in a closed position, that is, the two parts are adjacent to one another, then moving one of the parts ¼ inch will provide a size B width, and moving the other part ¼ inch will provide a C width, and so on, such that when providing an E width the two parts will be separated by one inch. The position of any potential openings 72 corresponding to half or whole size increments associated with a given sizing system which are to be made in portions of a lasting board 79, spring element 51, upper 23, or sole 32, can be indicated upon any or all of the components, or alternately, the various openings 72 can be made in stock parts intended for future use. Further, it can be readily understood that the openings 72 and any other adjustments which are made to various components of a customized article of footwear 22 can be unique to an individual wearer.

Figure 38:
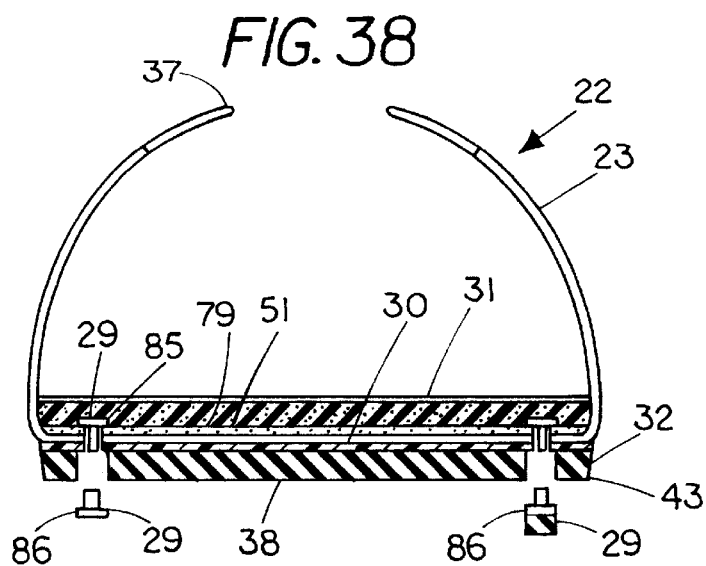
FIG. 38 is a transverse and exploded cross-sectional view of an article of footwear showing a lasting board or spring element having male mechanical engagement means affixed thereto, and also an upper, insole, sole, and female mechanical engagement means.

FIG. 38 is a transverse and exploded cross-sectional view taken along line 38—38 in FIG. 16 of an alternate article of footwear 22 showing a lasting board 79 or spring element 51 having male mechanical engagement means affixed thereto, and also an upper 23, insole 31, sole 32, and female mechanical engagement means for engaging in functional relation with the male mechanical engagement means. The male and female mechanical engagement means can consist of fasteners 29 have a male part 85 and a female part 86. Alternately, the male part 85 can be affixed to the sole 32, or the fasteners 29 can consist of loose parts. The fasteners 29 shown on the left in FIG. 38 can be visible on the inferior side 38 of the sole 32. Alternately, a fastener 29 can include a male part 85 or female part 86 which is affixed within the sole 32, and the corresponding mating part can be inserted and affixed in functional relation from the superior side within the defined space of the upper 23 of an article of footwear 22, as shown on the right in FIG. 43. Alternately, as shown on the right in FIG. 38, the fasterners 29 can include a resilient material suitable for use on the sole 32 or outsole 43 such that the fasteners 29 are hardly visible and their use does not appreciably degrade the cushioning or traction provided by the sole 32 or outsole 43. Alternately, a fastener 29 including a resilient material or other material can project from the surface of the sole and form a traction member, lug, or cleat, as shown in FIG. 23.

Figure 39:
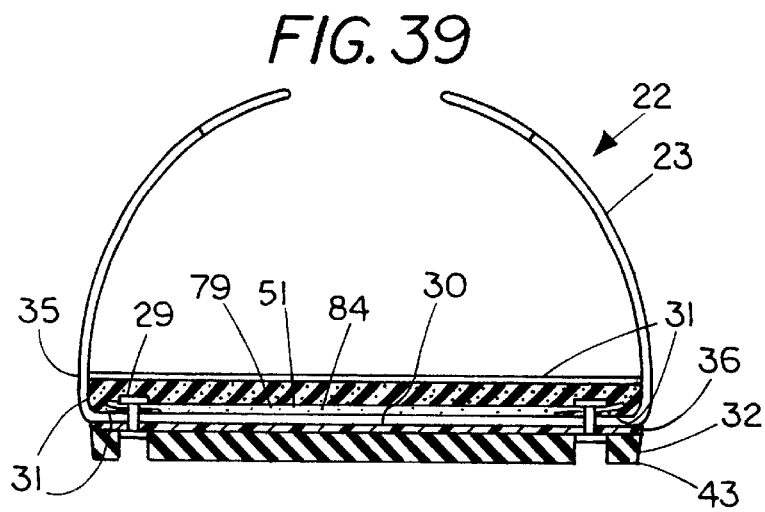
FIG. 39 is a transverse cross-sectional view of an article of footwear showing an insole overlapping medial side and lateral side of a lasting board or spring element.

FIG. 39 is a transverse cross-sectional view taken at a position consistent with line 38—38 in FIG. 16 of an alternate article of footwear 22 showing an insole 31 overlapping the superior side 38, medial side 35, lateral side 36, and a portion of the inferior side 38 of a lasting board 79 or spring element 51. The insole 31 can include a stock fit recess 84 for receiving the lasting board 79 or spring element 51. The insole 31 can be affixed by adhesive or overmolded to the lasting board 79 or spring element 51. Alternately, a portion of the insole 31 can be trapped between the inferior side 38 of the lasting board 79 or spring element 51 and the upper 23 when the article of footwear 32 is assembled, as shown in FIG. 39. This configuration can also serve to protect and cushion the edges of the lasting board 79 or spring element 51.

Figure 40:
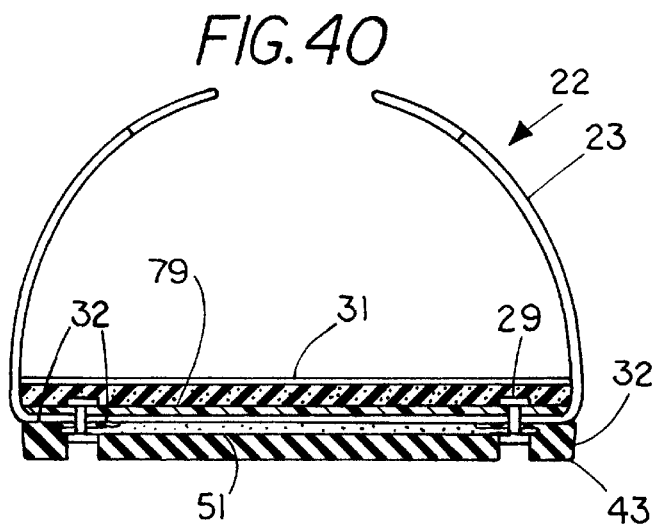
FIG. 40 is a transverse cross-sectional view of an article of footwear showing an portion of the sole overlapping the medial side and lateral side of a lasting board or spring element.

FIG. 40 is a cross-sectional view taken at a position consistent with line 38—38 in FIG. 16 of an alternate article of footwear 22 showing a portion of the sole 32 or outsole 43 overlapping the inferior side 38, medial side 35, lateral side 36, and a portion to the superior side 37 of a lasting board 79 or spring element 51. This configuration serves to cover and protect the sides of the spring element 51. The spring element 51 and outsole 43 can be affixed to the upper 23 using a separate lasting board 79 positioned within the upper 23 and secured with fasteners 29. Alternately, a backing 30 can be used and take the position of the spring element 51, and the spring element 51 can be used and take the position of the lasting board 79, that is, the spring element 51 can simultaneously serve as the lasting board 79, as previously discussed.

Figure 41:
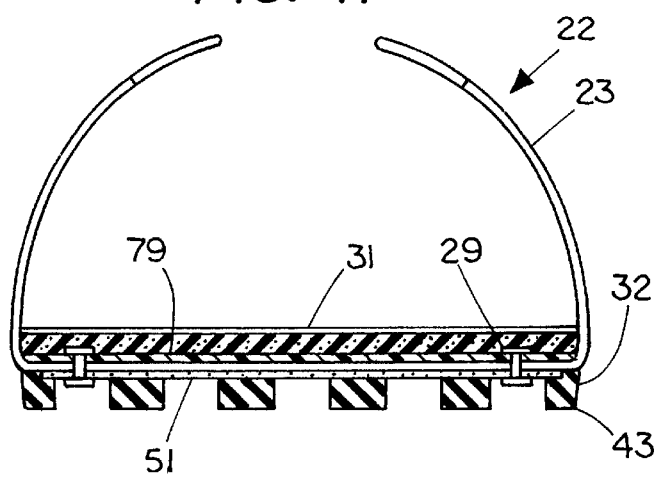
FIG. 41 is a transverse cross-sectional view of an article of footwear showing a separate lasting board and a spring element, and also an upper, insole, and outsole.

FIG. 41 is a transverse cross-sectional view taken at a position consistent with line 38—38 in FIG. 16 of an alternate article of footwear 22 showing a separate lasting board 79 and a spring element 51, and also an upper 23, insole 31, and outsole 43. In this alternate embodiment of an article footwear 22, the outsole 43 can cover, be affixed, bonded, or over-molded to the spring element 51. The spring element 51 can be completely covered by the outsole 43 on the inferior side 38, or alternately, portions of the spring element 51 can be visible and exposed.

Figure 42:
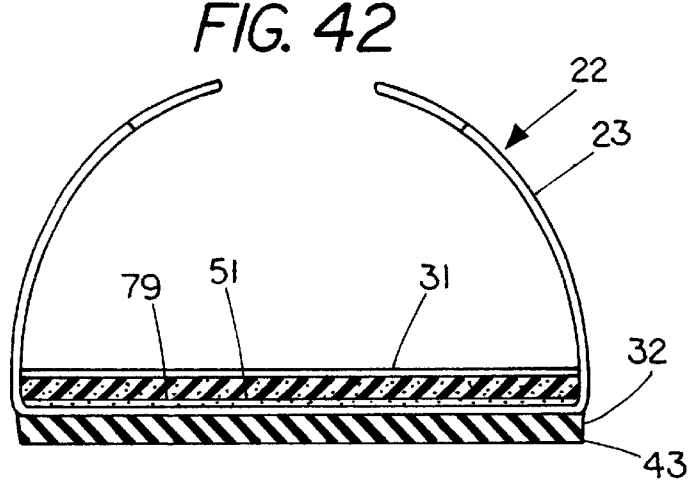
FIG. 42 is a transverse cross-sectional view of an article of footwear showing a sole affixed directly to an upper, and also a lasting board or spring element.

FIG. 42 is a transverse cross-sectional view taken at a position consistent with line 38—38 in FIG. 16 of an article of footwear 22 showing a sole 32 or outsole 43 that is directly affixed and integral to the upper 23, and also a lasting board 79 or spring element 51, and an insole 31. The upper 23 can be made at least in part of a synthetic textile or leather made of a thermoplastic material, and the sole 32 can be made of the same type of thermoplastic material, or alternatively, a different material which can be bonded to the upper 23. For example, a polyurethane material can be used for this purpose. The sole 32 can be affixed or overmolded onto the upper 23 by direct injection method. The direct injection process can be performed upon a substantially finished upper 23 into which a last 80 has been inserted, or upon an unfinished upper 23 which still has a relatively flat configuration and the upper 23 of the article of footwear 22 can then be completed using a three dimensional stitching process.

Figure 43:
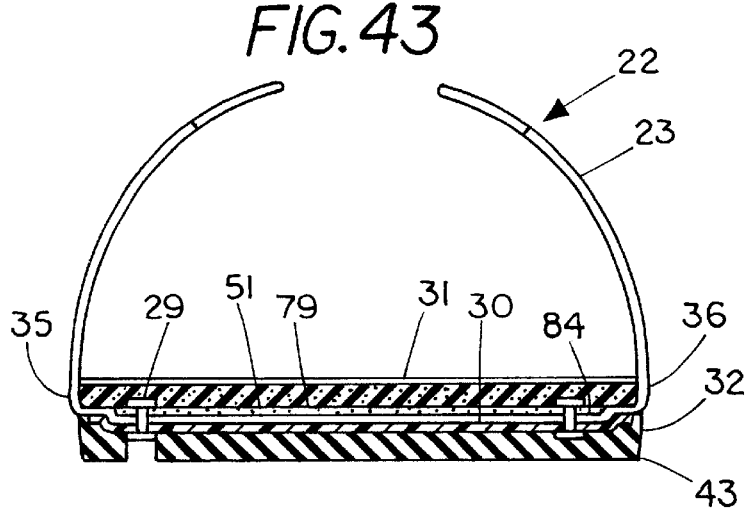
FIG. 43 is a transverse cross-sectional view of an article of footwear showing a sole affixed directly to an upper, and also a lasting board or spring element located within a recess.

FIG. 43 is a transverse cross-sectional view taken along a position consistent with line 38—38 in FIG. 16 of an alternate article of footwear 22 showing a sole 32 directly affixed to an upper 23, an insole 31, and also a lasting board 79 or spring element 51 located within a recess 84. The contours associated with the recess 84 can provide a mechanical interlock between the upper 23, spring element 51, and backing 30 of the sole 32 or outsole 43. As shown in FIG. 43, the lasting board 79 or spring element 51 does not extend to the perimeter of the upper 23 or sole 32, and this can reduce the stiffness exhibited at the perimeter or edge of the sole 32, as discussed in U.S. Pat. No. 5,921,004 granted to the present inventor, and assigned to NIKE, Inc, hereby incorporated by reference herein. It can be advantageous in an article of footwear 22 intended for use in running to extend the lasting board 79 or spring element 51 to the perimeter or edge of the sole 32 in those areas which are shown in dark shading in FIG. 24 of U.S. Pat. No. 5,921,004, but not to the perimeter or edge of the sole 32 in those areas which are not shaded. Accordingly, in the transverse cross-sectional view shown in FIG. 43, it can be advantageous to extend the lasting board 79 or spring element 51 to the perimeter or edge of the sole 32 on the medial side 35, but not on the lateral side 36. The sole 32 can be removably affixed to the upper 23 with the use of fasteners 29, and the like. As shown on the right in FIG. 43, a fastener 29 can include a male part 85 or female part 86 which is affixed within the sole 32, and the corresponding mating part can be inserted and affixed in functional relation from the superior side within the defined space of the upper 23 of an article of footwear 22. Alternately, the sole 32 can be permanently affixed to the upper 23 with the use of adhesives, or overmolded by direct injection process.

Figure 44:
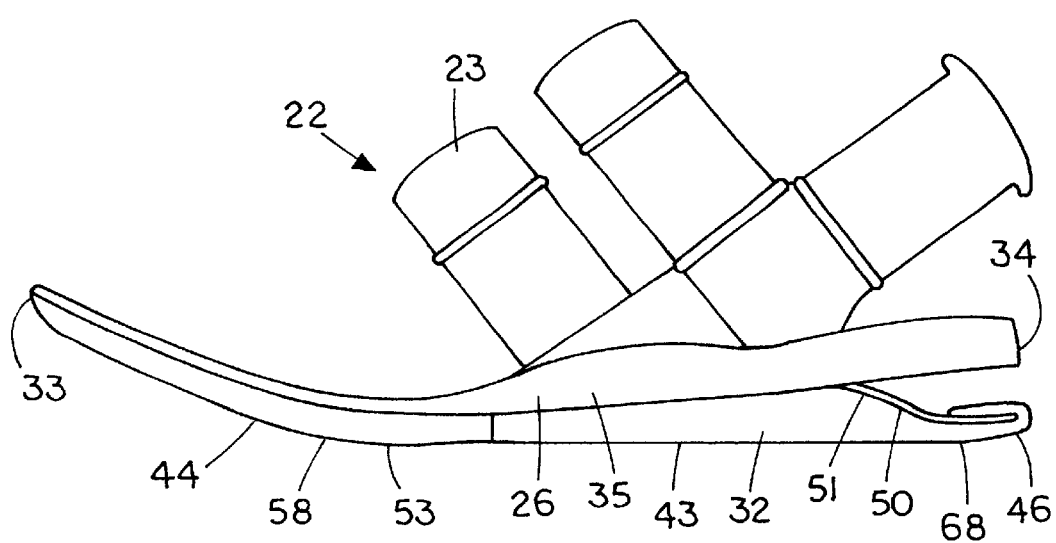
FIG. 44 is a medial side view of a sandal including a spring element.

FIG. 44 is a medial side view of an article of footwear 22 comprising a sandal which includes a spring element 51. Again, a spring element 51 can include an anterior spring element 48, a posterior spring element 49, and an inferior spring element 50 affixed together in functional relation. It can be readily understood that a plurality of different designs and configurations are possible with respect to the upper 23 of a preferred sandal. A sandal according to the present invention can be designed for high fashion, or alternately, for hiking and recreational use, as shown in FIG. 44. Further, the various components of a sandal can be affixed together with adhesive, or alternately, can be selectively and removably replaced with the use of mechanical engagement means including but not limited to fasteners 29, and the like.

The present invention teaches and makes possible not only a novel method of manufacturing articles of footwear, but also, a novel way of doing both retail and Internet business. The configuration and dimensions of a given wearer's foot and any other special needs and requirements or wearer preferences can be recorded by direct observation and measurement in a retail or medical setting, or by a wearer or other individual at their home or other remote site, and this data can be used to generate information and intelligence relating to the manufacture of an appropriate custom article of footwear for the wearer and intended end use. This information and intelligence relating to an individual wearer or target population can include a so-called soft model that is created and maintained in data storage and retrieval computer environment for present and future use.

Conventional measuring or reproduction means including but not limited to rulers, measuring tapes, Brannock devices, two or three dimensional scanners, pressure sensors, infrared thermography, stereolithography, paper, photographs, photocopies, cameras, images, tracings, video, telephone, television, FAX, computers, software, and computer screens, e-mail, lasts, lasting boards, templates, molds, models, and patterns can be used, and the like.

Given the information and intelligence created with respect to an individual wearer, and a ready and adequate stock of the various components anticipated for use in making the preferred articles of footwear, a worker and/or automated system possibly including robotics can manufacture or assemble a customized article of footwear within thirty minutes, and perhaps even less than five minutes. For example, selections can be made from a ready stock of different uppers 23, lasting boards 79, spring elements 51, insoles 31, and sole 32 components having different configurations and dimensions corresponding to a selected size length article of footwear 22, and the customized article of footwear 22 then be rapidly manufactured or assembled, as desired. This can be performed at the point of purchase or service center which can be located in a retail store, medical facility, or at a remote manufacturing facility. Accordingly, similar to the rapid delivery eyewear retail stores and service centers which presently exist, a consumer can now also be provided with a custom article of footwear within minutes.

In brief, a method of making an article of footwear according to the present invention can include the following steps, or their equivalent:

a) Collecting data relating to a wearer's preferences and the anatomical features and measurements of the wearer's foot;

b) Creating information and intelligence for selecting and making an article of footwear for the wearer;

c) Selecting a foot length;

d) Selecting a last bottom configuration;

e) Selecting a foot width;

f) Selecting girth dimensions at a plurality of positions;

g) Selecting an upper, outsole, and lasting board which can be affixed together in functional relation to provide the foot length, last bottom configuration, foot width, and girth dimensions; and, h) Removably affixing the upper, outsole, and lasting board in functional relation with the use of mechanical engagement means.

Alternately, if and when an individual's data is received from a remote site at the Website of a footwear company which practices the present invention, and is then transmitted electronically to a manufacturing or assembly center, a custom article of footwear can be made and delivered to the wearer or consumer at their home or other designated address within a selected number of working days. Within the continental United States, and many other host countries in which the present invention could be practiced, the custom article of footwear could be caused to be delivered by same day or overnight service, as desired. Accordingly, the present invention teaches a novel method of manufacturing articles of footwear, and also, a novel way of doing both retail and Internet business.

In brief, a method of conducting business including making and selling an article of footwear according to the present invention can include the following steps, or their equivalent:

a) Collecting data relating to a wearer's preferences and the anatomical features and measurements of a wearer's foot, and initiating or completing a financial transaction, thus selling an article of footwear;

b) Creating information and intelligence for making an article of footwear for the wearer;

c) Providing the information and intelligence to a physical location at which the article of footwear can be made;

d) Selecting a foot length;

e) Selecting a last bottom configuration;

f) Selecting a foot width;

g) Selecting girth dimensions at a plurality of positions;

h) Selecting an upper, sole, and lasting board which can be removably affixed together in functional relation to provide the foot length, last bottom configuration, foot width, and girth dimensions at the plurality of positions;

i) Removably affixing the upper, sole, and lasting board in functional relation with the use of mechanical engagement means, and completing the manufacture of the article of footwear; and, j) Causing the article of footwear to be delivered to a designated address.

While the above detailed description of the invention contains many specificities, these should not be construed as limitations on the scope of the invention, but rather as exemplifications of several preferred embodiments thereof. Many other variations are possible. For example, it can be readily understood that the various teachings, alternate embodiments, methods and processes disclosed herein can be used in various combinations and permutations. Accordingly, the scope of the invention should be determined not by the embodiments discussed or illustrated, but by the appended claims and their legal equivalents.

I claim:

1. A method of conducting business including making and selling a custom article of footwear comprising the steps of:

a) Collecting data relating to an individual's preferences and the anatomical features and measurements of said individual's foot;

b) Creating from said collected data information and intelligence for making said article of footwear for said individual;

c) Providing said information and intelligence to a physical location at which said article of footwear can be made;

Selecting from multiple footwear components sufficient components for making said custom article of footwear having an anterior side, a posterior side, a superior side, an inferior side, a medial side, a lateral side, a longitudinal axis, and a transverse axis, the components comprising an upper, a sole, at least one mechanical fastener, a superior spring element, and an inferior spring element, said superior spring element components each being capable of extending substantially between a posterior side and an anterior side of a selected upper and capable of being substantially positioned within said upper to secure said upper to a selected superior spring element, a selected inferior spring element being capable of being substantially positioned inferiorly and externally with respect to said selected upper, said selected inferior spring element being capable of being affixed in functional relation to said selected superior spring element and projecting rearward and downward therefrom forming a V-shape, said selected superior spring element, said selected inferior spring element, said selected upper, and said selected sole being capable of being removably secured in functional relation by said at least one selected mechanical fastener to assemble and make said custom article of footwear based upon said information and intelligence;

e) Placing said selected superior spring element within said selected upper and removably securing said selected superior spring element, said selected upper, said selected inferior spring element, and said selected sole in functional relation with said at least one selected mechanical fastener, and thereby completing the assembly and making of said custom article of footwear; and, f) Causing said custom article of footwear to be delivered to a designated address.

2. The method of conducting business including making and selling a custom article of footwear according to claim 1, wherein said selected superior spring element extends substantially completely between said posterior side and said anterior side of said selected upper, and said superior spring element further comprises an anterior spring element and a posterior spring element affixed in functional relation.

3. The method of conducting business including making and selling a custom article of footwear according to claim 2, wherein said selected inferior spring element is substantially positioned within 50 percent of the length between said posterior side and said anterior side of said custom article of footwear, and said selected inferior spring element is affixed in functional relation to said posterior spring element.

4. The method of conducting business including making and selling a custom article of footwear according to claim 2, wherein said selected anterior spring element further comprises two portions that are substantially positioned in an overlapping relationship.

5. The method of conducting business including making and selling a custom article of footwear according to claim 2, wherein said selected anterior spring element is curved and said selected anterior spring element further comprises at least one notch for creating at least one line of flexion.

6. The method of conducting business including making and selling a custom article of footwear according to claim 1, wherein said selected inferior spring element further comprises a flexural axis deviated from said transverse axis.

7. The method of conducting business including making and selling a custom article of footwear according to claim 6, wherein said flexural axis is deviated from said transverse axis in the range between 10 and 50 degrees, and posterior of said flexural axis the posterior to anterior lengths of said selected superior spring element and said selected inferior spring element are less on said medial side than on said lateral side, and the posteriormost position of said flexural axis on said medial side is in the range between 1–3 inches from said posterior side of said upper.

8. The method of conducting business including making and selling a custom article of footwear according to claim 6, wherein said selected inferior spring element comprises greater concavity downwards adjacent said flexural axis on said medial side than on said lateral side.

9. The method of conducting business including making and selling a custom article of footwear according to claim 1, said custom article of footwear further comprising a posterior spacer.

10. The method of conducting business including making and selling a custom article of footwear according to claim 1, wherein said selected spring element comprises a fiber composite material which is capable of storing and returning at least 70 percent of the mechanical energy imparted thereto.

11. The method of conducting business including making and selling a custom article of footwear according to claim 1, wherein said selected superior spring element comprises a thickness in the range between 1.0 and 4.0 mm, and said selected inferior spring element comprises a thickness in the range between 2.0 and 4.0 mm.

12. The method of conducting business including making and selling a custom article of footwear according to claim 1, wherein said selected inferior spring element comprises maximum separation from said selected superior spring element at a position anterior of the posterior side of said selected inferior spring element, and said selected inferior spring element curves upwards between the position of maximum separation and said posterior side of said selected inferior spring element.

13. The method of conducting business including making and selling a custom article of footwear according to claim 1, and providing said selected sole with a backing, an outsole, an anterior outsole element, and a posterior outsole element, and affixing said anterior outsole element in functional relation to said superior spring element, and said posterior outsole element in functional relation to said inferior spring element.

14. The method of conducting business including making and selling a custom article of footwear according to claim 1, wherein said selected superior spring element further comprises a heel counter.

15. The method of conducting business including making and selling a custom article of footwear according to claim 1, further comprising providing said selected upper with a plurality of openings on the inferior side of said upper for selectively adjusting said width and girth dimensions at a plurality of positions.

16. The method of conducting business including making and selling a custom article of footwear according to claim 1, wherein said information and intelligence is provided to said physical location comprising a retail store and thereafter completing the assembly and making of said custom article of footwear within five minutes, and said step of causing delivery of said custom article of footwear comprises delivery directly to said individual.

17. The method of conducting business including making and selling a custom article of footwear according to claim 1, wherein said collecting step comprises transmitting the collected data by electronic means to a remote physical location, and completing steps e and f within a selected number of working days.

18. The method of conducting business including making and selling a custom article of footwear according to claim 17, wherein the transmitting step comprises transmitting the collected data over a global communication network, and steps e and f are completed within one working day.

19. A method of conducting business including making and selling a custom article of footwear comprising the steps of:
  a) Collecting data relating to an individual's preferences and the anatomical features and measurements of said individual's foot;
  b) Creating information and intelligence for making said article of footwear for said individual;
  c) Providing said information and intelligence to a physical location at which said article of footwear can be made;
  d) Selecting a foot length size;
  e) Selecting a three dimensional foot shape including width and girth dimensions;
  f) Selecting a plurality of footwear components including an upper including closure means, an insole, a spring element, at least one mechanical fastener, and a sole including an anterior outsole element and a posterior outsole element which can be selectively removed and replaced using mechanical engagement means including said at least one mechanical fastener for assembling and making said article of footwear;
  g) Removably securing said plurality of footwear components including said upper including closure means, said insole, said spring element, said at least one mechanical fastener, and said sole including said anterior outsole element and said posterior outsole element in functional relation with said mechanical engagement means including said at least one mechanical fastener, and completing the assembly and making of said article of footwear; and,
  h) Causing said article of footwear to be delivered to a designated address.

20. A method of conducting business including making and selling a custom article of footwear comprising the steps of:
  a) Collecting data relating to an individual's preferences and the anatomical features and measurements of said individual's foot;
  b) Creating information and intelligence for making said article of footwear for said individual;
  c) Providing said information and intelligence to a physical location at which said article of footwear can be made;
  d) Providing a plurality of footwear components, and a plurality of variations of each footwear component, said footwear components comprising footwear uppers, footwear spring elements, at least one mechanical fastener and footwear soles which are capable of being assembled to form said custom article of footwear using said at least one mechanical fastener, and each of the components being selectively interchangeable and being removable and replaceable;
  e) Selecting a plurality of footwear components from the provided sources including at least an upper, a spring element, at least one mechanical fastener, and a sole which can be selectively removed and replaced;
  f) Removably securing said plurality of footwear components including said upper, said spring element, and said sole in functional relation with the at least one selected mechanical fastener, thereby making said custom article of footwear; and
  g) Causing said custom article of footwear to be delivered to a designated address.

* * * * *

UNITED STATES PATENT AND TRADEMARK OFFICE
CERTIFICATE OF CORRECTION

PATENT NO. : 6,601,042 B1
DATED : July 29, 2003
INVENTOR(S) : Robert M. Lyden

It is certified that error appears in the above-identified patent and that said Letters Patent is hereby corrected as shown below:

Title page,
Item [56], References Cited, U.S. PATENT DOCUMENTS, change "194,309" to
-- D194,309 --.
FOREIGN PATENT DOCUMENTS, change "WO98/07343 to -- WO98/07341 --;
change "WO01/0062A2" to -- WO01/70062A2 --; and please add
-- W002/13641AI-2/2002 H43B 3/26 --.

Signed and Sealed this

Thirty-first Day of August, 2004

JON W. DUDAS
*Director of the United States Patent and Trademark Office*